United States Patent
Halikhedkar et al.

(10) Patent No.: US 7,636,424 B1
(45) Date of Patent: Dec. 22, 2009

(54) METHOD AND SYSTEM FOR SELECTIVELY DISPLAYING ALARMS IN A COMMUNICATIONS NETWORK

(75) Inventors: Abhijith Halikhedkar, Overland Park, KS (US); Jonathan William Hermsmeyer, Atlanta, GA (US); Thomas Michael Usery, Olathe, KS (US); Gary Scott Wiles, Prairie Village, KS (US)

(73) Assignee: Sprint Comminications Company L.P., Overland Park, KS (US)

( * ) Notice: Subject to any disclaimer, the term of this patent is extended or adjusted under 35 U.S.C. 154(b) by 603 days.

(21) Appl. No.: 11/116,778

(22) Filed: Apr. 28, 2005

Related U.S. Application Data

(60) Provisional application No. 60/567,391, filed on Apr. 30, 2004, provisional application No. 60/566,907, filed on Apr. 30, 2004, provisional application No. 60/566,886, filed on Apr. 30, 2004, provisional application No. 60/567,242, filed on Apr. 30, 2004, provisional application No. 60/567,243, filed on Apr. 30, 2004, provisional application No. 60/566,663, filed on Apr. 30, 2004, provisional application No. 60/567,079, filed on Apr. 30, 2004, provisional application No. 60/566,906, filed on Apr. 30, 2004.

(51) Int. Cl.
*H04M 3/22* (2006.01)
*H04M 1/24* (2006.01)
*H04M 3/08* (2006.01)

(52) U.S. Cl. .................................. 379/15.01

(58) Field of Classification Search ............... 379/15.01
See application file for complete search history.

(56) References Cited

U.S. PATENT DOCUMENTS

| 5,392,328 | A | 2/1995 | Schmidt et al. |
| 5,864,662 | A | 1/1999 | Brownmiller et al. |
| 6,072,777 | A | 6/2000 | Bencheck et al. |
| 6,239,699 | B1 * | 5/2001 | Ronnen ................ 340/517 |
| 6,330,601 | B1 * | 12/2001 | French et al. .......... 709/223 |
| 6,701,459 | B2 | 3/2004 | Ramanathan et al. |
| 6,813,634 | B1 * | 11/2004 | Ahmed ................. 709/224 |
| 2007/0156656 | A1 * | 7/2007 | Pather et al. ............. 707/3 |
| 2007/0198695 | A1 * | 8/2007 | Engelmann et al. ..... 709/224 |

OTHER PUBLICATIONS

"Telcordia NMA System Generic Transport Network Element Interface Support", Telcordia Technologies Special Report, Issue 7, May 2003.
"The Leading Solution for Network Monitoring and Fault Management", Telcordia Technologies.

\* cited by examiner

*Primary Examiner*—Alexander Jamal

(57) ABSTRACT

A method and system for processing network trouble alerts is provided. A most important alert is presented, with the ability to view other status indications related to it. The method includes receiving a status indication, identifying a network resource associated with it, determining whether the resource is subordinate to another resource, which is associated with at least a second status indication, and if the resource is not subordinate another, then evaluating the status indication to determine if it should be presented to a user. If so, then automatically presenting the status indication to the user without user intervention.

17 Claims, 34 Drawing Sheets

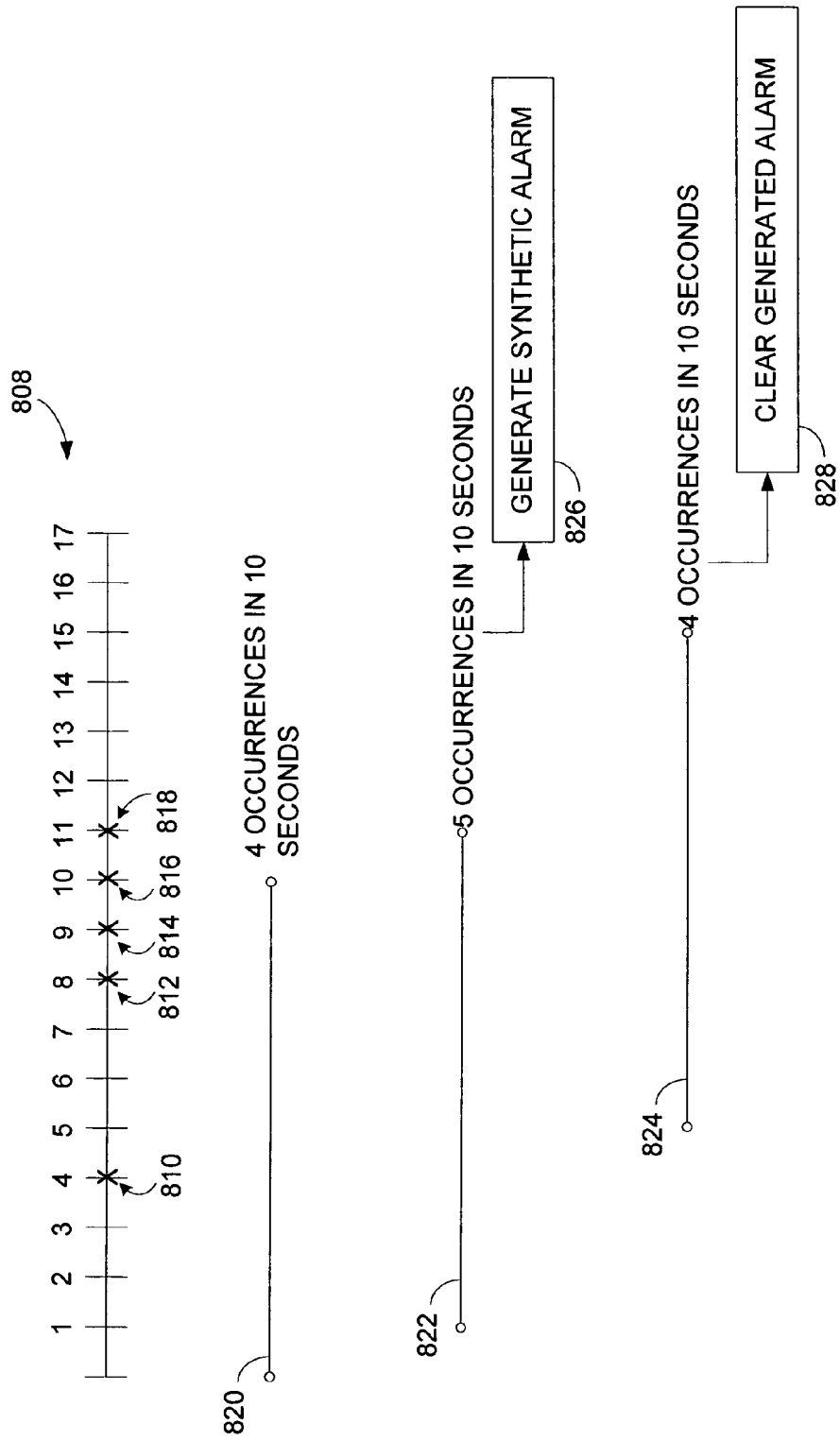

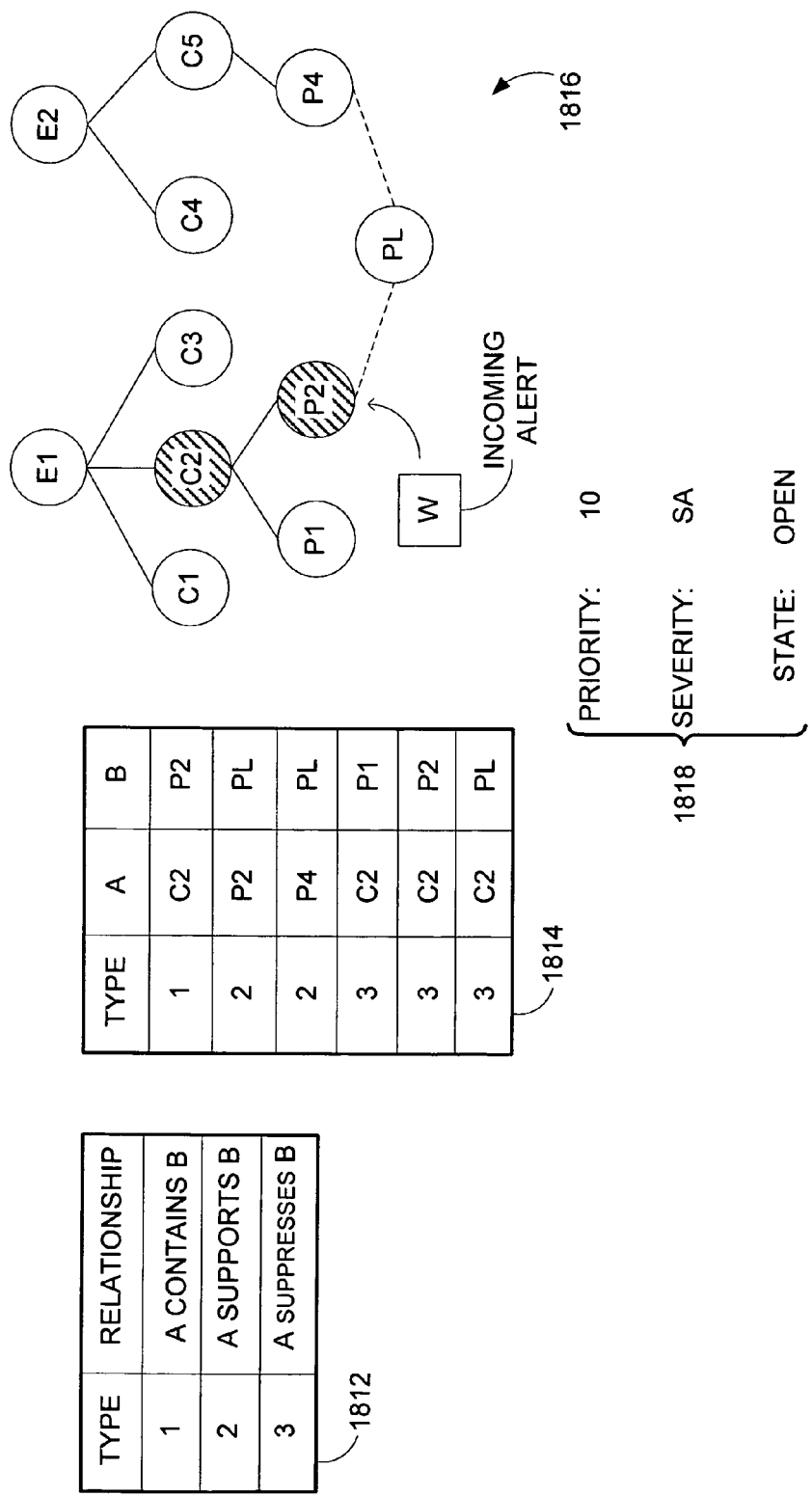
FIG. 18A
IN OR ABOUT TO ENTER AN ALARM STATE

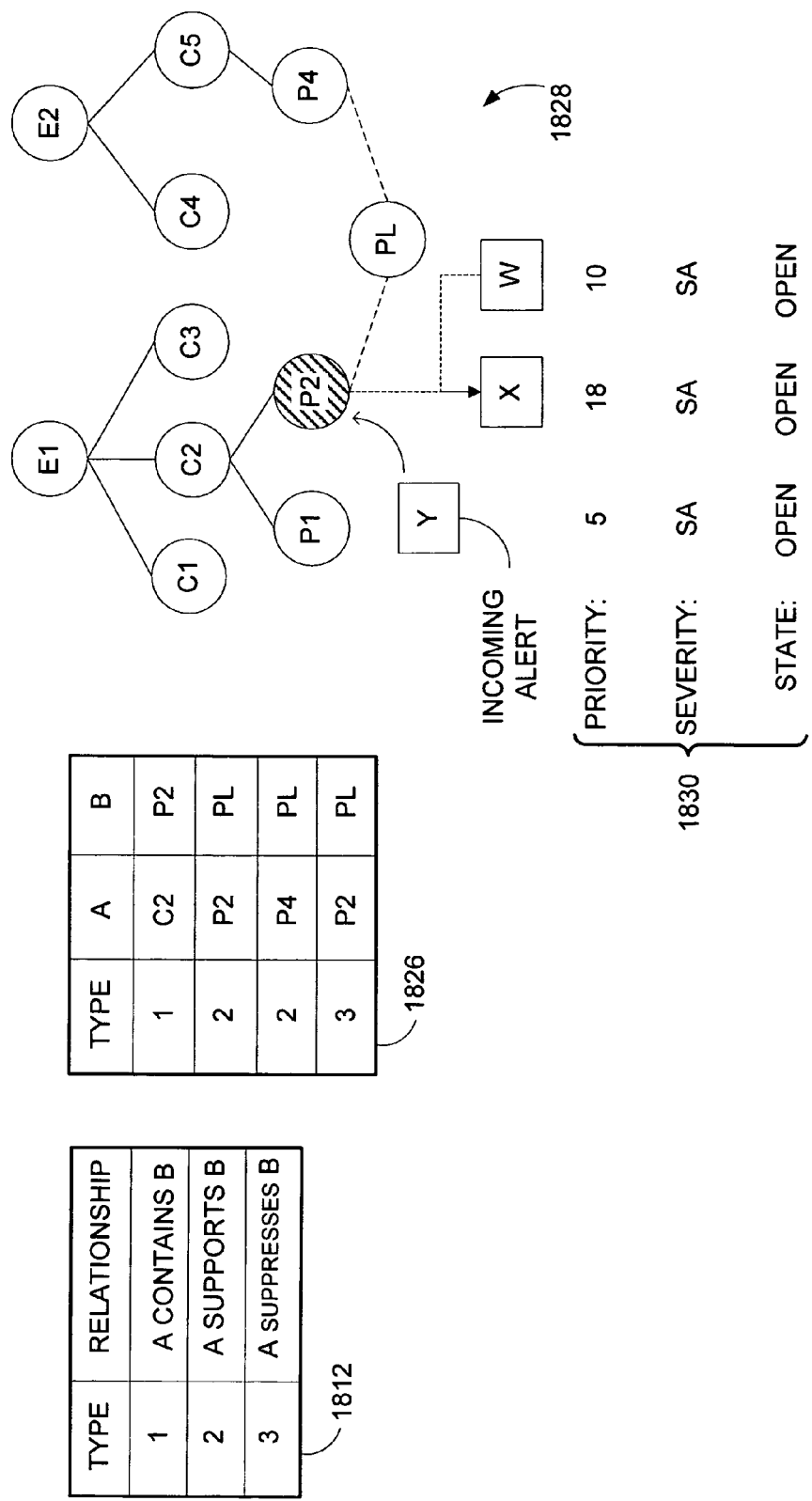
 IN OR ABOUT TO ENTER AN ALARM STATE
FIG. 18C

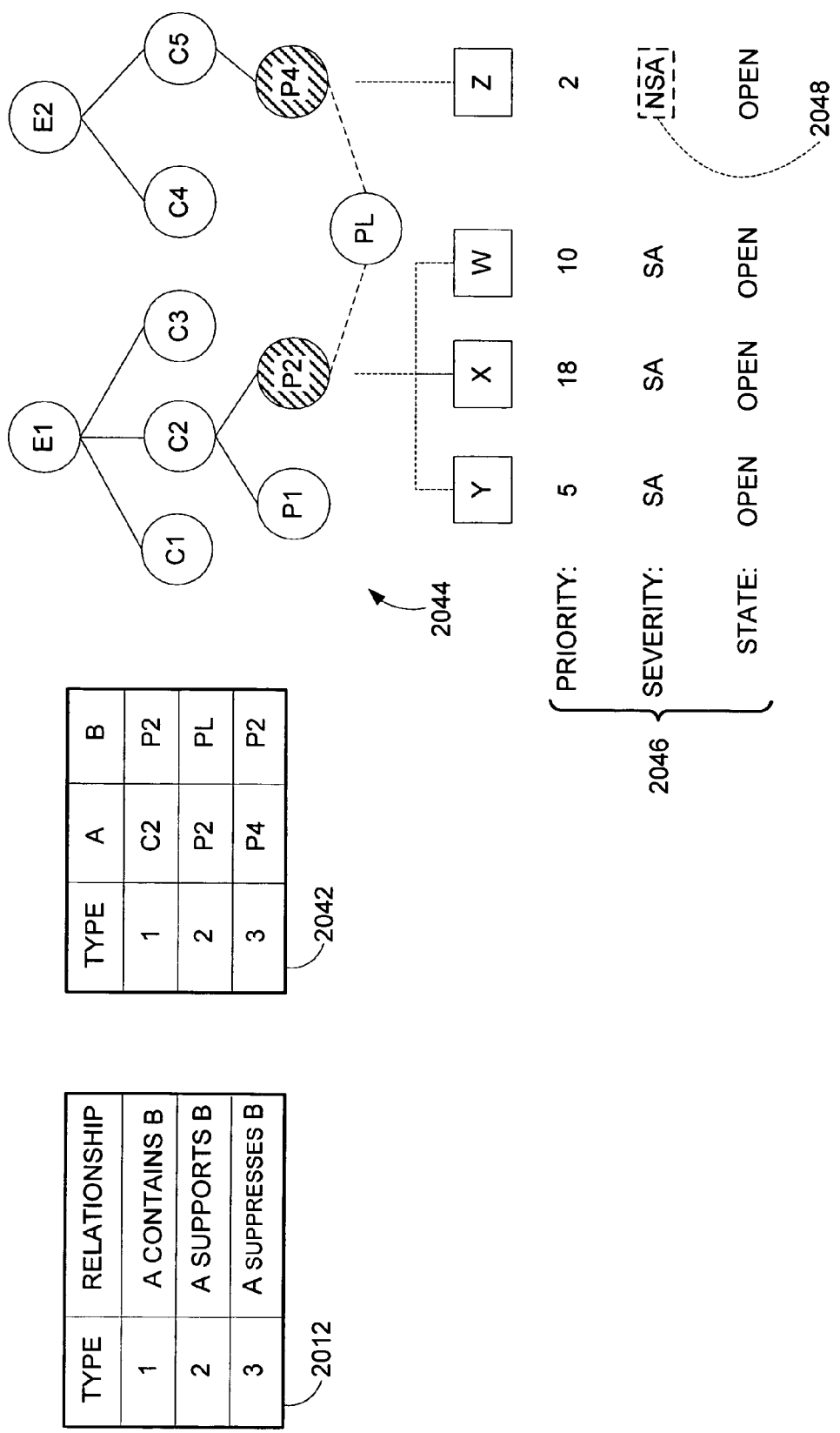
 IN OR ABOUT TO ENTER AN ALARM STATE
FIG. 20

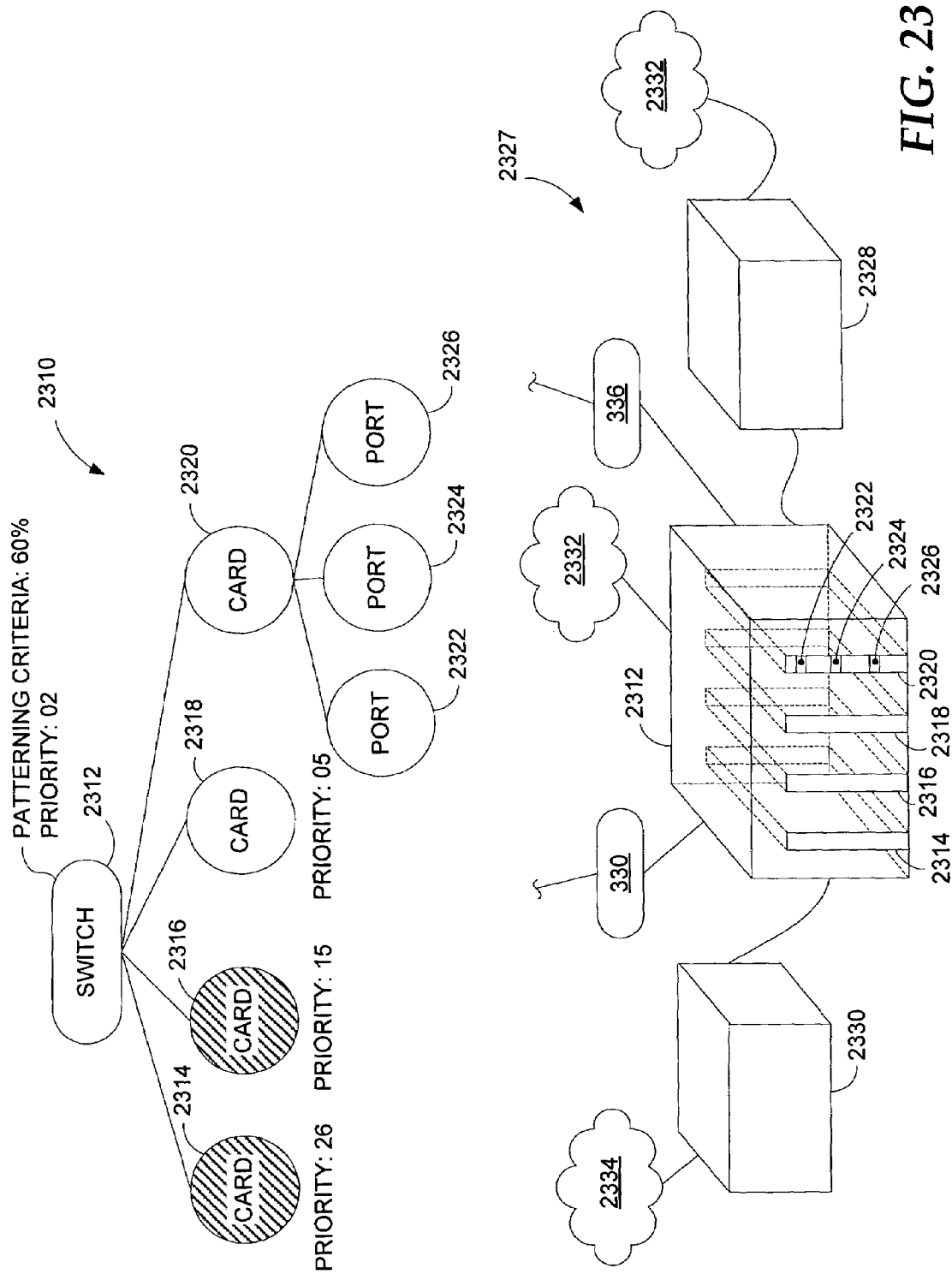

FIG. 24

| RESOURCE ID | RSC. TYPE | LOCATION | PRIORITY | DESC. | TICKET |
|---|---|---|---|---|---|
| 2314 | CARD | KC | 26 | T.E. | N/A |

2414A  2414B  2414C  2414D  2414E  2414F

2414 → 2412

| RESOURCE ID | RSC. TYPE | LOCATION | PRIORITY | DESC. | TICKET |
|---|---|---|---|---|---|
| 2316 | CARD | KC | 15 | L.O.S. | T_413 |

2416A  2416B  2416C  2416D  2416E  2416F

2416 → 2412

| RESOURCE ID | RSC. TYPE | LOCATION | PRIORITY | DESC. | TICKET |
|---|---|---|---|---|---|
| 2312 | SWITCH | KC | 2 | PWR | T_414 |

2418A  2418B  2418C  2418D  2418E  2418F

2418 → 2412

METHOD AND SYSTEM FOR SELECTIVELY DISPLAYING ALARMS IN A COMMUNICATIONS NETWORK

CROSS-REFERENCE TO RELATED APPLICATIONS

This application claims the benefit of U.S. Provisional Application No. 60/567,391; having the same title, and filed on Apr. 30, 2004.

This application is also related by subject matter to the invention disclosed in the following seven copending and commonly assigned applications, each of which was filed on even date herewith, and each having titles and serial numbers as follows: METHOD AND SYSTEM FOR MANAGING ALARMS IN A COMMUNICATIONS NETWORK, Ser. No. (11/116,742); METHOD AND SYSTEM FOR AUTOMATICALLY GENERATING NETWORK TROUBLE TICKETS, Ser. No. (60/566,886); METHOD AND SYSTEM FOR DEDUPLICATING STATUS INDICATIONS IN A COMMUNICATIONS NETWORK, Ser. No. (60/567,242); METHOD AND SYSTEM FOR DISPLAYING STATUS INDICATIONS FROM COMMUNICATIONS NETWORK, Ser. No. (60/567,243); METHOD AND SYSTEM FOR DETERMINING WHEN TO TRIGGER AN ALARM EVENT IN A COMMUNICATIONS NETWORKING ENVIRONMENT, Ser. No. (60/566,663); METHOD AND SYSTEM FOR AUTOMATICALLY RECOGNIZING ALARM PATTERNS IN A COMMUNICATIONS NETWORK, Ser. No. (11/117,115); METHOD AND SYSTEM FOR DETERMINING ROOT CAUSES OF COMMUNICATIONS NETWORK ALARMS, Ser. No. (11/117,190). All of the aforementioned applications are incorporated by reference herein.

STATEMENT REGARDING FEDERALLY SPONSORED RESEARCH OR DEVELOPMENT

Not applicable.

TECHNICAL FIELD

The present invention relates to providing root-cause analysis of problems that occur in association with operating a communications network.

BACKGROUND OF THE INVENTION

The difficulty of managing a communications network is directly proportional to its complexity. As networks grow in complexity, so too does the difficulty of managing it. Managing a network includes one or more of the following: retrieving historical performance, observing that the network is currently functioning properly, and ensuring that the network will function properly in the future. To accomplish each of these functions, feedback from the network is necessary. The most widely relied upon feedback are alarms.

Alarms provide feedback that element interaction or network elements themselves are not functioning as intended. But a complex communications network may produce on the order of thousands of alarms per hour or millions of alarms per day. An alarm may be referred to in the art as a message, alert, event, warning, or other data indication. Being able to maintain awareness of the potential barrage of alarms, as well as troubleshooting the source of the alarms has historically been a resource-intensive process that plagues network administrators.

At least three aspects contribute to the difficulty of managing a communications network: vendor diversity, geographic disparity, and disparate equipment roles. The larger a network grows, the more likely it is that components will be provided by various vendors rather than by a single vendor. For example, a communications network may include Nortel switches, Cisco routers, Lucent network devices, etc.

Different vendors often indicate similar real-world happenings using different protocols, terms, phrases, or notifications. Consider two persons meeting. In western culture, a handshake is common. In eastern culture, bowing to each other is common. But in both cases, each is greeting one another. If a person from another foreign country witnesses both events, then it would be beneficial for a translator to explain that each course of action corresponds to the same event: a greeting. The problem is that, without an interpreter, the foreign witness will not realize that both courses of conduct correspond to the same happening, just with a different format.

A similar problem exists when disparate vendor components are used to communicate information corresponding to similar fault states, such as for example a loss of signal. If a Nortel device communicates a loss-of-signal notification in a first manner, but a Cisco device communicates a similar loss-of-signal notification in a second manner, then a scheme should be implemented so that each manner of communication is mapped to the same network ailment; here, loss of signal. In both cases, a loss-of-signal alarm should be conveyed to an analyst. Such mapping is wanting in the prior art.

Geographic challenges also contribute to the complexity of a network. A carrier should be able to identify what elements are present on its network, the location of those elements, and what functionality is offered by those elements. When problems occur, a carrier would preferably be able to identify the location of faulty devices. If a carrier does not know the location of a device that is causing an alarm, then responding to that alarm will be exceedingly difficult. The present invention addresses this need.

Different network devices perform different roles. Switching and routing components help determine where and how to direct data across a communications network. A network may be composed of several hundreds of different types of devices that perform different types of activities. When a specific type of component fails, then the functionality that the component was offering will be compromised. Describing or understanding the nature of what functionality has been compromised is also difficult but desirous.

A failed communications device can be queried or tested to help identify the nature of its problem. But the method of interrogation itself may vary across components. Moreover, no generic alarm set exists. Specific devices provide specific alarms in specific ways, which can make interpreting those alarms difficult. Unlike a physician treating a new patient, a network controller cannot simply ask all network devices a common question in a universal format, such as "what is wrong?" Rather, a troubleshooter must know which questions to ask and in what manner to retrieve troubleshooting data. For example, consider a routing device that is routing data to the wrong address. The device may be queried to determine a list of destination addresses. But such a query request would be wholly inappropriate to submit to a power supply that is providing power beyond acceptable tolerance levels.

Because of the briefly described complexities along with a myriad of other factors, identifying relevant alarms and addressing them is difficult. As previously mentioned, an alarm can assume many forms, from a warning to an indication of a severe problem. Historically, no distinction is made with respect to displaying the various alarms. Rather, each alarm is displayed on a user interface, which can get crowded and confused quickly. Moreover, the only information provided are the alarms themselves. And after they are remedied, they are deleted. No sort of root-cause analysis is performed on the alarms. The arduous task of determining the respective underlying causes of each alarm has historically been relegated to a human being. Trying to determine the various causes that gave rise to the plethora of alarms is a difficult task for a person to work on.

Consider the situation where a first alarm gives rise to multiple subordinate alarms. Without the benefit of root-cause analysis, a technician may begin allocating resources to resolving the subordinate alarms when resolution of the primary problem would solve the propagated problems. For example, consider a device that loses power. The loss of power would propagate other alarms related to whatever functionality the device was supposed to perform. The other alarms, as well as the power-loss alarm, would all be displayed for viewing in a control room. At this point, troubleshooting begins. Without the benefit of the present invention that will be described below, an analyst is not provided direction as to how to begin addressing each alarm. Although this simplistic example appears to be a relatively easy problem to solve by an experienced analyst, a carrier cannot rely on the subjective experience of an analyst nor upon such a simplistic example. Even if a carrier were to rely on such benefits, it would have to address such issues as a steep learning curve related to deciphering network alarms and the risks of losing personnel who have mastered a sense and feel for addressing primary alarms.

Still worse, some primary alarms can give rise to sympathetic alarms, which are alarms associated with otherwise properly functioning devices. In such a scenario, ultimate problem resolution can be prolonged because troubleshooting subordinate-alarm devices will yield results associated with the device working properly. Consider a telephone user who cannot make outgoing calls because, unbeknownst to him, his telephone line has been inadvertently cut. A substantial amount of time could be wasted if a technician were dispatched to troubleshoot the telephone. All of the tests initiated on the telephone would yield results consistent with a properly functioning telephone. The root cause does not lie within the telephone device itself, but rather with a compromised communications line. This coarse example provides an illustrative example of how resources can be wasted while attempting to resolve a child alarm that stems from a parent cause, wherein resolution of the parent cause would eliminate the child alarm.

During a network "firestorm," an operations center may be bombarded with thousands or even hundreds of thousands of alarms. The nature of receiving such a large number of alarms from heterogeneous resources makes resolving the problems associated with the alarms difficult. It is very difficult to identify the most important alarms. Alarms are manually tracked down to laboriously attempt to determine any relationships between them. An experienced network specialist may be able to eventually track down and focus in on some of the causes, but such a process is manual, labor intensive, and time consuming. Such a problem is compounded when a new or less experienced specialist is charged with resolving the problems associated with the alarms and would generally become overwhelmed and intimidated by the circumstances.

Currently, problem solving and maintaining a telecommunications network is dependent on the knowledge and experience of the people monitoring the alarms. Dependency on one or more particular persons becomes a problem if one or all of the people were to quit their job. Another issue that carriers face is the inability to enrich topology information that equipment providers supply for determining the location of the component within the network. Currently, there no system is known of that provides a root-cause analysis capable of deciphering a top level event among a plurality of equipment providers.

What is needed is a robust message-enriching system that allows alarms from disparate network-element vendors to be received and troubleshooted using techniques that incorporate deduplication, thresholding, pattern-recognition, root cause analysis, and display management.

SUMMARY OF THE INVENTION

The present invention addresses at least a portion of the aforementioned problems by providing by providing a system and method for selectively displaying alerts in a communications network. The present invention has several practical applications in the technical arts, not limited to reducing the amount of alerts presented to a network operations specialist, and intelligently deciding what alerts are most important, and thereby should be displayed.

In a first aspect, the present invention includes a method for presenting an alert in a communications network. The network includes many network resources, such as switches, routers, signal-transfer points, etc. The method includes receiving an alert associated with a network resource, identifying all alerts associated with the network resource, determining which of the alerts are most important, and automatically presenting it to a user without user intervention. The user can click on the alert or some other point to see the other alerts that were determined to be subordinate to it.

In a second aspect, one or more computer-readable media are provided that have computer-useable instructions embodied thereon for performing a method determining whether to present an indication of a status of a resource in a communications network. The method includes receiving the status indication (which can be a message, alert, alarm, or other term used in the art), identifying a resource associated with the status indication, determining whether the resource is subordinate to a second resource (which is associated with at least a second status indication), and if the resource is not subordinate to a second resource, then evaluating the status indication to determine if it should be presented to a user. If the status indication should be presented, then the present invention automatically presents the status indication to the user without user intervention.

In a final illustrative aspect, the present invention includes a method for filtering alerts to display. The method includes storing in a first data structure (such as a table or database) a set of records related to network resources in an alert condition, querying the data structure to determine whether a first resource is subordinate to at least a second resource and a third resource, which are in an alert condition. The second, third, and other resources are evaluated to determine the most important alert, which is automatically displayed to a user without user intervention, but other alerts associated with the other resource are not displayed unless a request to present them is received. The request may be clicking on the identified most important alert for example.

BRIEF DESCRIPTION OF THE SEVERAL VIEWS OF THE DRAWINGS

The present invention is described in detail below with reference to the attached drawing figures, which are incorporated in their entirety by reference herein and wherein:

FIG. 8 depicts a timeline and illustrates an example of meeting and not meeting threshold requirements in accordance with an embodiment of the present invention;

FIGS. 18A-18D are composite diagrams depicting progressive stages of alarms and are provided to explain illustrative examples of manipulating status indications in accordance with an embodiment of the present invention;

FIG. 20 is substantially identical to FIG. 18D, but depicts a change in a key attribute;

FIG. 23 depicts an exemplary network element; and

FIG. 24 depicts a portion of an illustrative alarm-presentation interface.

DETAILED DESCRIPTION OF THE INVENTION

Figure 1:
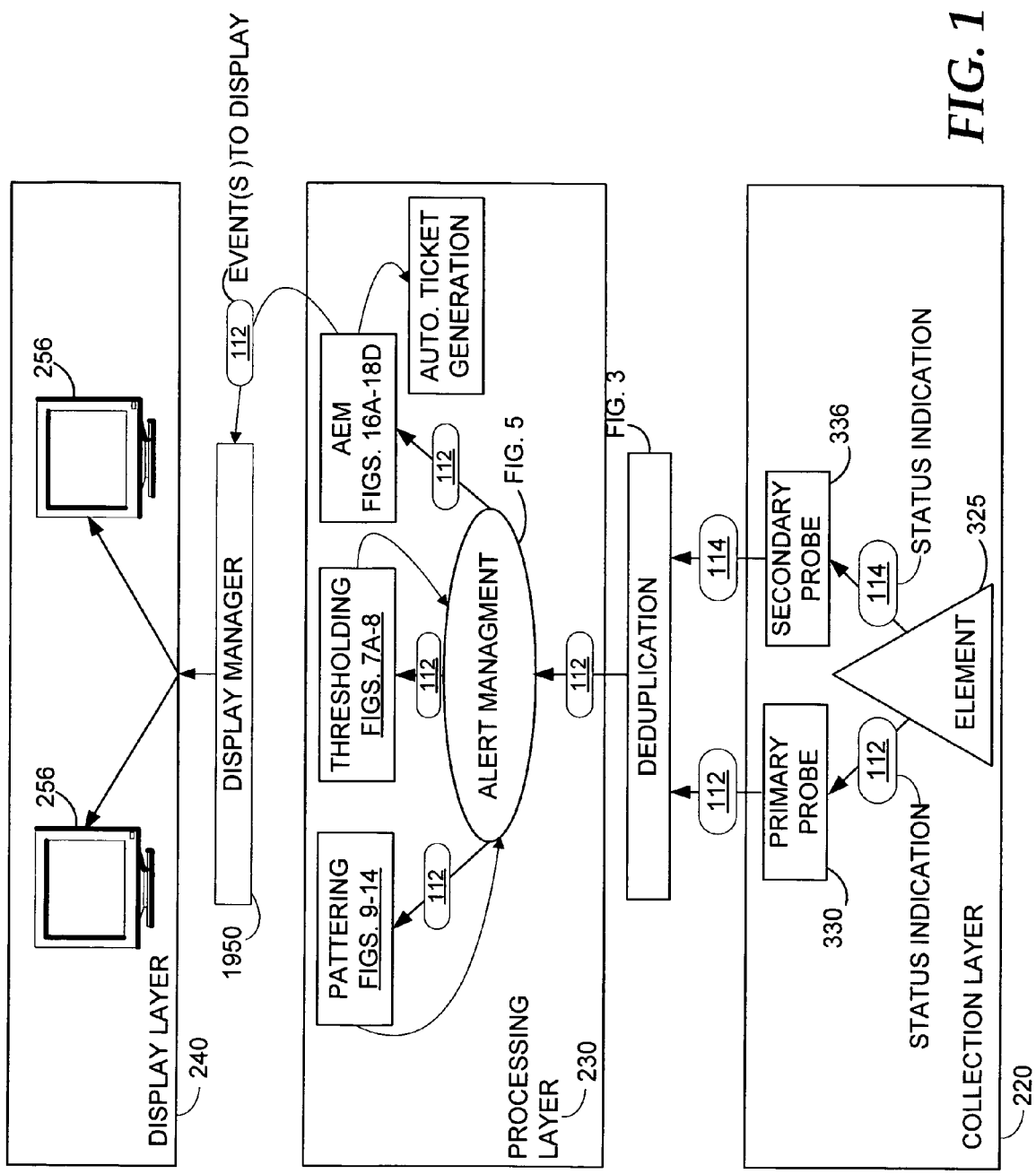
FIG. 1 is a block diagram illustrating an exemplary architecture in accordance with an embodiment of the present invention.

The present invention provides a method and system for determining the root causes of one or more alarms in a communications network and troubleshooting problems associated with the same.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, gateways, workstations, and other machines may be connected to one another across a communication medium including, for example, a network or networks.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention.

Further, various technical terms are used throughout this description. A definition of such terms can be found in Newton's Telecom Dictionary by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed by the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to, RAM, ROM, EEPROM; flash memory or other memory technology; CD-ROM; digital versatile discs (DVD); holographic media or other optical disc storage; magnetic cassettes; magnetic tape; magnetic disk storage; and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media. What follows is a description of one or more preferred embodiments. The present invention is not limited to the following explanations.

Overview

Turning now to FIG. 1, a block diagram illustrating an exemplary architecture in accordance with an embodiment of the present invention is provided. Each of the aspects depicted in FIG. 1 will be explained in significantly greater detail below. The reference numerals of FIG. 1 are numbered to correspond to the figures that discuss the various elements in greater detail. The following comments are introductory in nature and intended to help provide a high-level overview of certain aspects of the present invention. Because of the high-level of abstraction depicted in FIG. 1, it should not be construed as limiting in nature. That is, the elements, relationships, and flows of FIG. 1 are illustrative in nature and should not be construed as limitations of the present invention.

In collection layer 220, in element 325 experiences some happening that causes it to emit a status indication. Because of redundancies, a first status indication 112 as well as a second status indication 114 will both be emitted from element 325. Although duplicate status indications is beneficial from a redundancy standpoint, the potential exists for each to ripen into an alarm that has ultimately displayed on display device 256. Both status indications are enriched with desired data attributes by primary probe 330 and secondary probe 336.

To prevent each status indication 112 and 114 from ripening into a displayed alarm event, they are subjected to a deduplication process, which it will be described with reference to FIG. 3. As shown in FIG. 1, only one of the status indications emerges and is sent to an alert management process, which is described with reference to FIG. 5. The alert manager evaluates one or more attributes associated with status indication 112 to determine whether it should be examined for patterning (FIGS. 9-14), thresholding (FIGS. 7A-8), or sent to directly to associative event manager (AEM), which is described with reference to FIGS. 16A-18D. Ultimately, the present invention includes technologies to determine whether a ticketing report should be automatically generated. The associative event manager performs vertical and horizontal root-cause analysis to determine which alarm events to display and which alarm events to suppress. Events to be displayed are forwarded to display manager 1950, which ultimately passes data into display layer 240 for a display on display device 256. Alarms can also be presented to users in an audio format. With this brief overview, we now begin explaining these and other aspects in greater detail.

Figure 2:
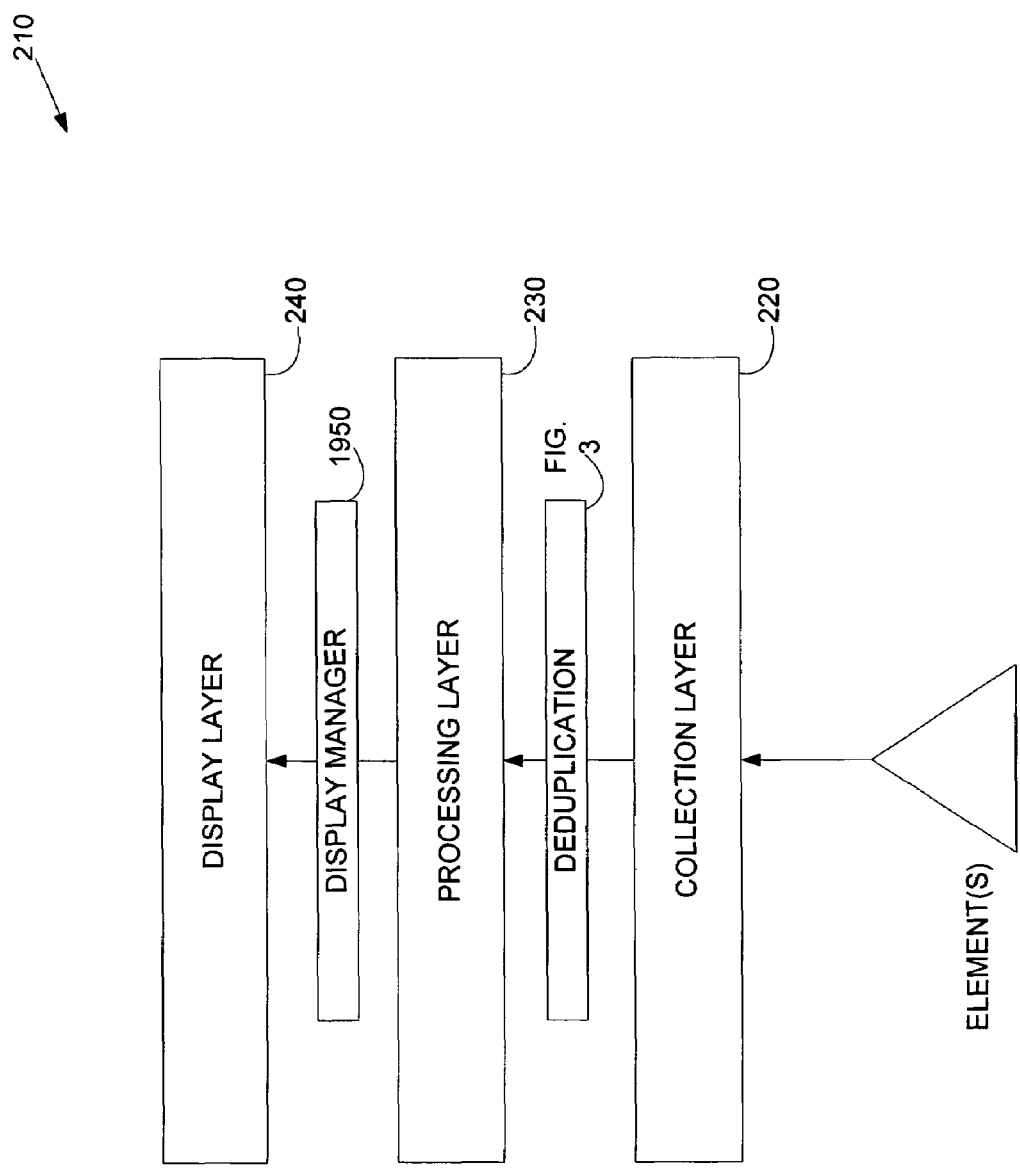
FIG. 2 is a block diagram illustrating an exemplary layer topology in accordance with an embodiment of the present invention.

Turning now to FIG. 2, an illustrative layer architecture according to an embodiment of the present invention is provided and referenced generally by the numeral 210. In one embodiment, the present invention assumes a three-layer architecture: a collection layer 220, a processing layer 230, and a display layer 240. Greater detail will be provided below, but a cursory overview of each of these layers here will place the present invention in context for explanation.

In collection layer 220, network-element messages are received from multiple vendors via multiple protocols. A network-element message can be any data or stream of data communicated from a network element that relates to its status. In a preferred embodiment, a uniform format is applied to the messages to develop formatted alerts, which are passed on to processing layer 230. In processing layer 230, alerts are processed and events are created. Thresholding as well as patterning are both performed in processing layer 230. Horizontal root-cause analysis as well as vertical root-cause analysis is also performed in processing layer 230. Top-level events are forwarded to display layer 240, which displays events and manages user interactions.

The architecture 210 depicted in FIG. 2 should not be construed as a limitation of the present invention. Boundaries that form the various layers are gray and broad, not black and narrow. They are provided to explain the present invention. The three layers depicted in FIG. 2 help conceptualize the functionality offered by the present invention. Events happen at the boundaries and between boundaries of the layers depicted in FIG. 2, which is why the boundaries are amorphous rather than hard and fast.

Figure 2A:
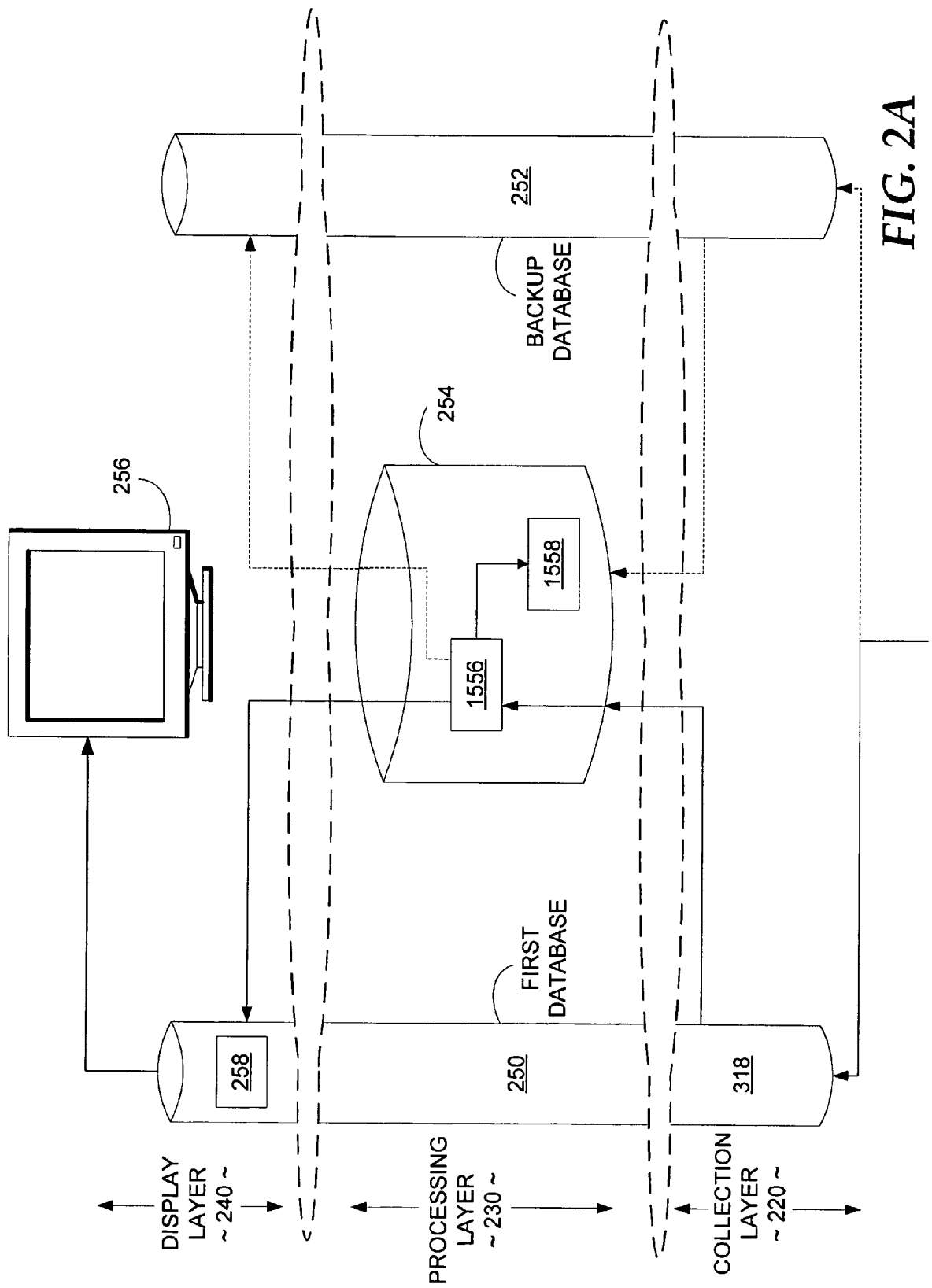
FIG. 2A is an additional architecture diagram and depicts various relationships between the illustrative layers of FIG. 2 and one or more databases in accordance with an embodiment of the present invention.

Turning now to FIG. 2A, an additional architecture diagram is depicted that shows the relationship between the illustrative layers of FIG. 2 and one or more databases. A database is a collection of records that are logically related to various other records. A first database can be composed of multiple databases, each of which is commonly composed of tables and relationships between those tables. Accordingly, the diagram of FIG. 2A is illustrative in nature. As such, the present invention should not be construed as limited to nor requiring the all components shown. For example, a backup database is not necessary, and each database could span multiple layers. But in a preferred embodiment, as data enters collection layer 220, it is stored in a first database 250 as well as a backup database 252.

Deduplication, described in greater detail below, occurs near the boundary between collection layer 220 and processing layer 230. In a preferred embodiment, data flows from first database 250 in collection layer 220 to a database 254, which preferably resides in processing layer 230. Database 254 includes a summary-alert table 1556 and an alert table 1558, which will both be described in greater detail below. Database 254 provides data to display layer 240 to display data on an exemplary device 256. An input table 318 resides in first database 250 in the collection layer 220.

Deduplication

Figure 3:
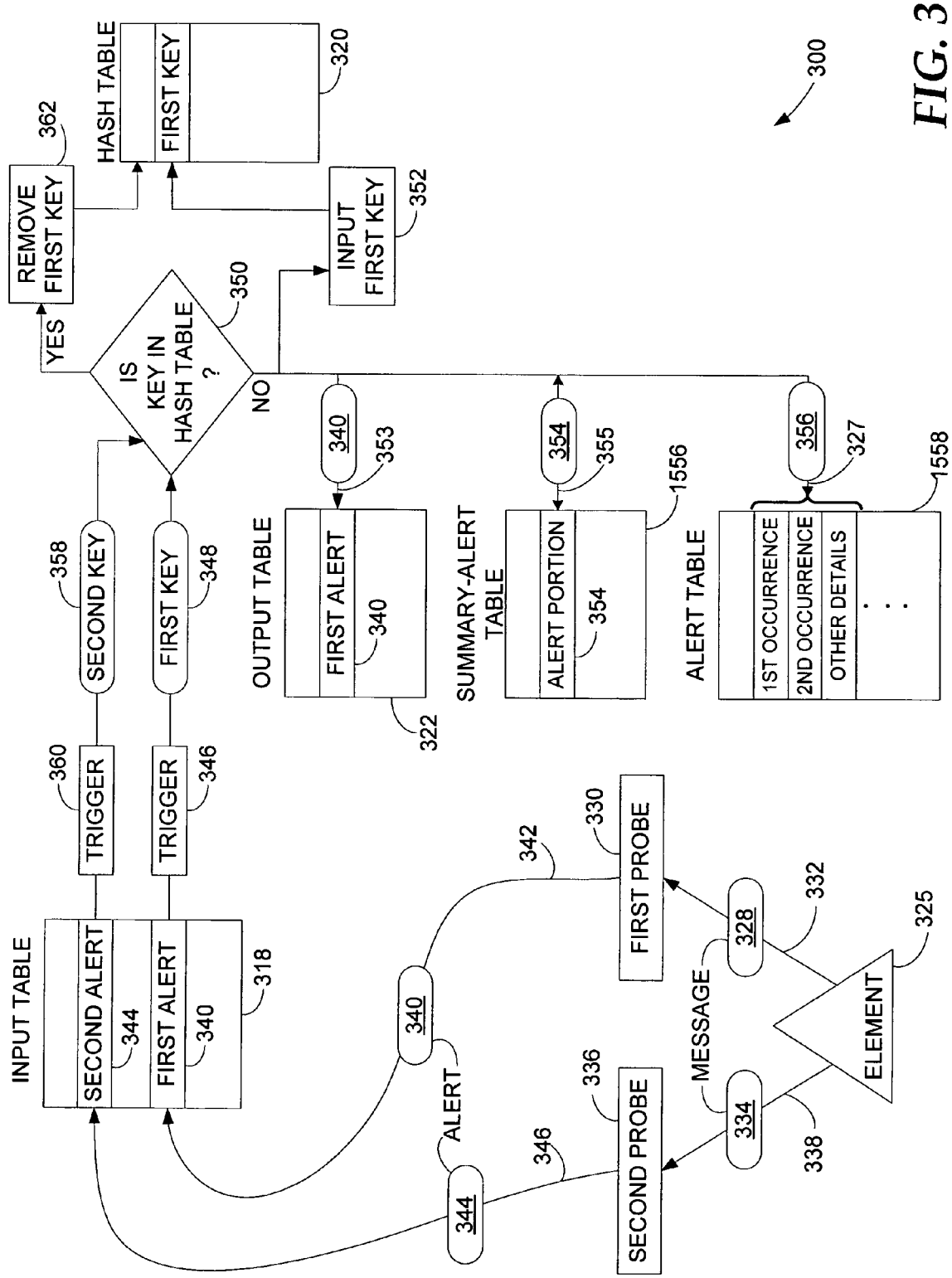
FIG. 3 is a combination block and flow diagram depicting an exemplary deduplication process in accordance with an embodiment of the present invention.

Turning now to FIG. 3, an illustrative process for deduplicating messages is provided according to an embodiment of the present invention and referenced generally by the numeral 300. Alerts are deduplicated in both space (spatial deduplication) and time (temporal deduplication). Spatial deduplication prevents multiple instances of a single message to be misconstrued as separate alarms. Temporal deduplication prevents multiple occurrences of the same alarm to be construed as distinct alarms.

Figure 3A:
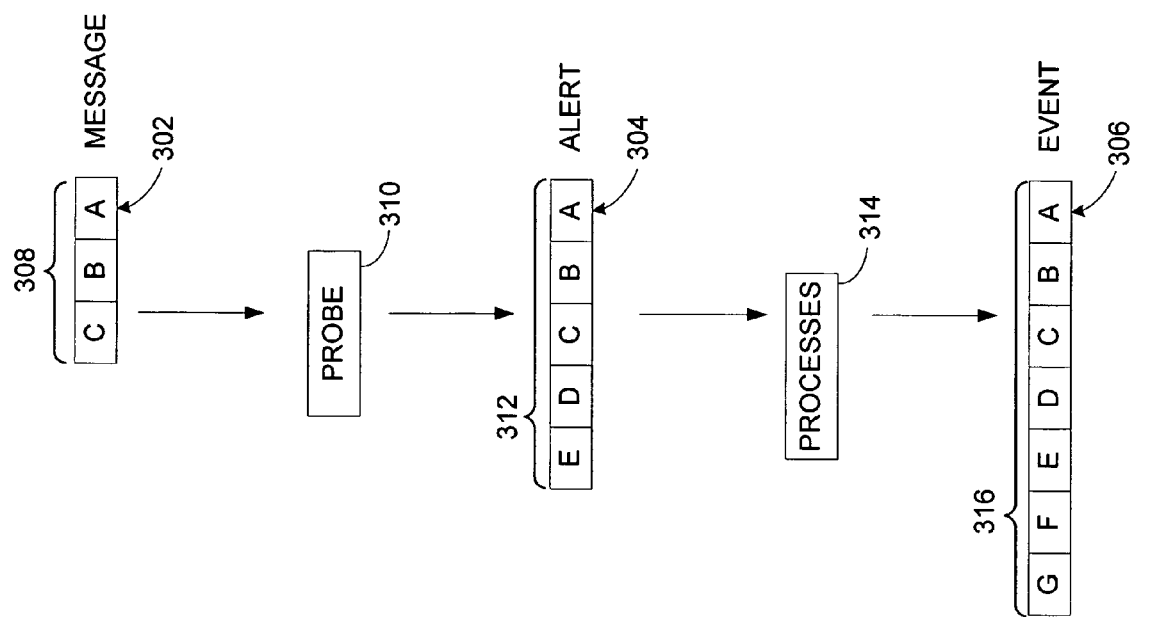
FIG. 3A is a block diagram depicting illustrative attributes of messages, alerts, and events in accordance with an embodiment of the present invention.
Figure 3B:
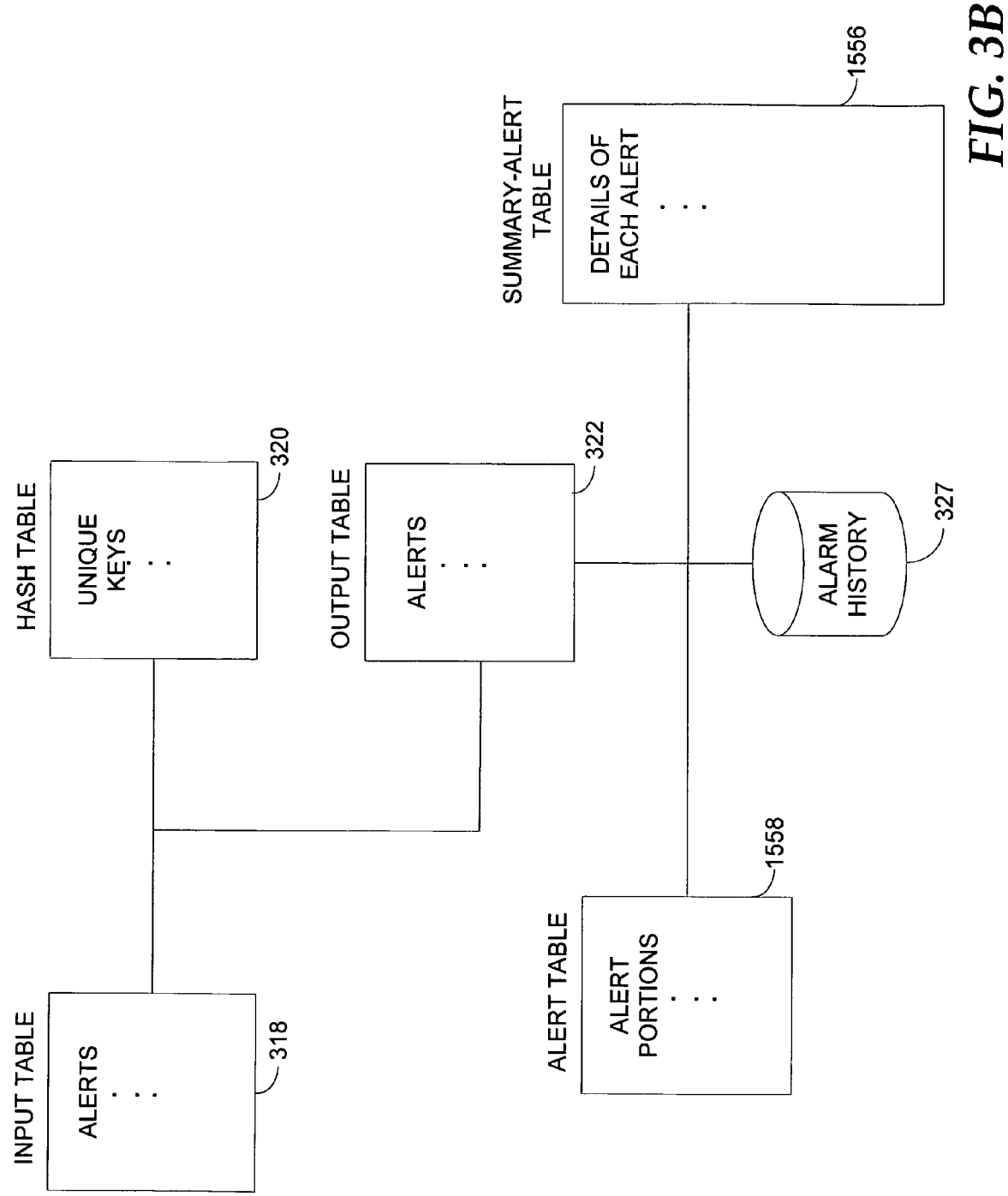
FIG. 3B is a block diagram representing a high-level overview of an illustrative schema related to deduplication in accordance with an embodiment of the present invention.

Before explaining FIG. 3 in detail, reference is made first to FIGS. 3A and 3B, which depict components in greater detail that will be referenced in FIG. 3. FIG. 3A depicts a message 302, an alert 304, and an event 306. The terms "message," "alert," and "event" are used so as not to obscure the present invention and are provided for explanatory purposes. They should not be construed as limitations of the present invention. What applicants refer to as a message, others, even those skilled in the art, may refer to as an alert, an event, or an alarm. Similarly, what applicants refer to as an alert, others may refer to as a message, an event, or alarm, etc.; same with "event." So as to not obscure the present invention, specific names are attributed to data items as they progress through various processes and are useful in explaining the present invention. The term "status indication" is intended to include all types of "alarms" and more. Any union or intersection of term meanings attached to "message," "alert," or "event" is circumscribed "status indication." "Alarms" is intended to include any data associated with conveying a message generated by a network element. Thus, an alarm is a message, an alert, or an event. Similarly, a message, alert, and event are all included within the meaning of "alarms" as well. And even though applicants refer to certain data items as "messages," for example, they do not intend to attach a special meaning to that data item beyond the explanatory purposes used in this reference.

Another potential source of term confusion will also be briefly addressed here with respect to the terms "instances" and "occurrences." Consider a single element or part of an element, such as a port, that enters into a problem state. Incident to entering such a problem state, a first instance of a status indication will be sent from the element. Depending on the number of layers of redundancy, other "instances" of the same status indication will also be communicated. With two layers of redundancy, two copies of the status indication will be sent from the network element. Each copy is identical. The first copy is referred to as a first instance, and the second copy is referred to as a second instance. But all instances relate to a single occurrence. One occurrence of a problem will spawn multiple instances of a status indication. If the device corrects itself, then that would be an occurrence or a correction. If the device then entered into a problem state again, then that would correspond to another occurrence of potentially the same alarm. To illustrate, consider a hypersensitive garage-door opener. The door closes, opens, closes again, and finally opens again. Here we see four occurrences of an event, each of which may give rise to multiple instances of status indications. But these events may be mapped to one or two alarms, such as a door-open alarm and a door-close alarm.

Returning now to FIG. 3A, a set of message attributes 308 is associated with message 302. Message attributes 308 may include information such as an element identifier, a port identifier, a message type, etc. A probe 310 is a software component that listens for messages. When a message is sent from an alarm, probe 310 receives that message and determines a course of action according to message attributes 308. Alert 304 emerges from probe 310. Alert 304 includes a set of alert attributes 312. Alert attributes 312 may be different from message attributes 308. Probe 310 may supplement message 308 with additional data. Alert 304 then passes through a series of processes 314 (which will be discussed in greater detail below) to ripen into an event 306, which includes a set of event attributes 316. Event attributes 316 may be different from alert attributes 312. Throughout the different processes 314, alert attributes 312 may be supplemented with additional data, captured in event attributes 316.

Turning now to FIG. 3B, a portion of a database schema in accordance with the embodiment of the present invention is provided. An input table 318 receives alerts that stem from faulty network elements. A hash table 320 includes a listing of unique keys, each of which is respectively associated with an alert. Output table 322 receives unique alerts. Summary-alert table 1556 receives a portion of the data delivered to output table 322. Data in summary-alert table 1556 include information such as an element identifier, a timestamp, a first-occurrence timestamp, a last-occurrence timestamp, an indication as to whether the alert is service-affecting, a count of the alert occurrence, as well as other alerts and other alert groups.

Summary-alert table 1556 is associated with an alert table 1558, which includes unique data associated with each alert stored in summary-alert table 1556. Exemplary data stored in alert table 1558 includes an alert priority, an alert type, and all alert timestamps. A relationship is established between input table 318, 320, and 322, which is associated with summary-alert table 1556 and alert table 1558. Those skilled in the art of database design will appreciate that indirect relationships also exist between the various tables shown.

Returning now to FIG. 3, an exemplary process for deduplicating alarms will be explained. Because a communications network must be reliable, redundancies are built into the network. Integrating redundancies into a communications network increases its reliability but presents other problems, especially with respect to alarm generation and addressing. Because of these integrated redundancies, an element 325 replicates its messages to be transmitted along at least two different communications paths to two different destinations. The same data is sent to multiple devices so that if one path goes down, then the data exists in an alternative location. Thus, a first instance 328 of the message is sent to a first probe 330 at a step 332. A second instance 334 of the same message is sent to a second probe 336 at a step 338. Messages 334 and 328 are identical but are sent to different physical locations. Steps 332 and 338 preferably occur substantially at the same time but may differ based on network conditions.

First message 328 gives rise to first alert 340, which emerges from first probe 330 at a step 342. Similarly, second alert 344 is based on second message 334 and emerges from second probe 336 at a step 346. Both alerts are then preferably entered into input table 318. Incident to receiving first alert 340, a first trigger 346 generates a first key 348. First key 348 is generated based on the alert attributes, such as alert attributes 312, associated with first alert 340. An algorithm is applied to alert attributes 312 to generate first key 348. Thus, all alerts having identical alert attributes will have identical keys (generated identifiers). In a preferred embodiment, first key 348 is a hash. At a step 350, a determination is made as to whether first key 348 is in hash table 320. If first key 348 is not in hash table 320, then first key 348 is inputted into hash table 320 at a step 352. Also, if first key 348 is not in hash table 320, then first alert 340 is inputted into output table 322 at a step 353. A first alert portion 354 (preferably data common to multiple alert occurrences) is inputted into summary-alert table 1556 at a step 355, and a second alert portion 356 (preferably details related to the alert) is inputted into alert table 1558 at a step 327. An exemplary set of details associated with alert 340 may be multiple occurrences of the same alert type.

Returning to determination step 350, if first key 348 is in hash table 320—which would be the case when second key 358 generated by second trigger 368 arises at determination step 350—then that key 348 is removed from hash table 320 at a step 362. Hash table 320 will no longer store the key associated with either first alert 340 or second alert 344. Such a scheme prevents hash table 320 from becoming a large table and greatly reduces the time associated with searching hash table 320. New occurrences of the same alarm type will initiate new triggers, which will then be able to write at least the first instance of the new key (which is the same as the key that was deleted) into hash table 340. The first instance 348 will be allowed, indicating another occurrence of the same alarm.

Figure 4:
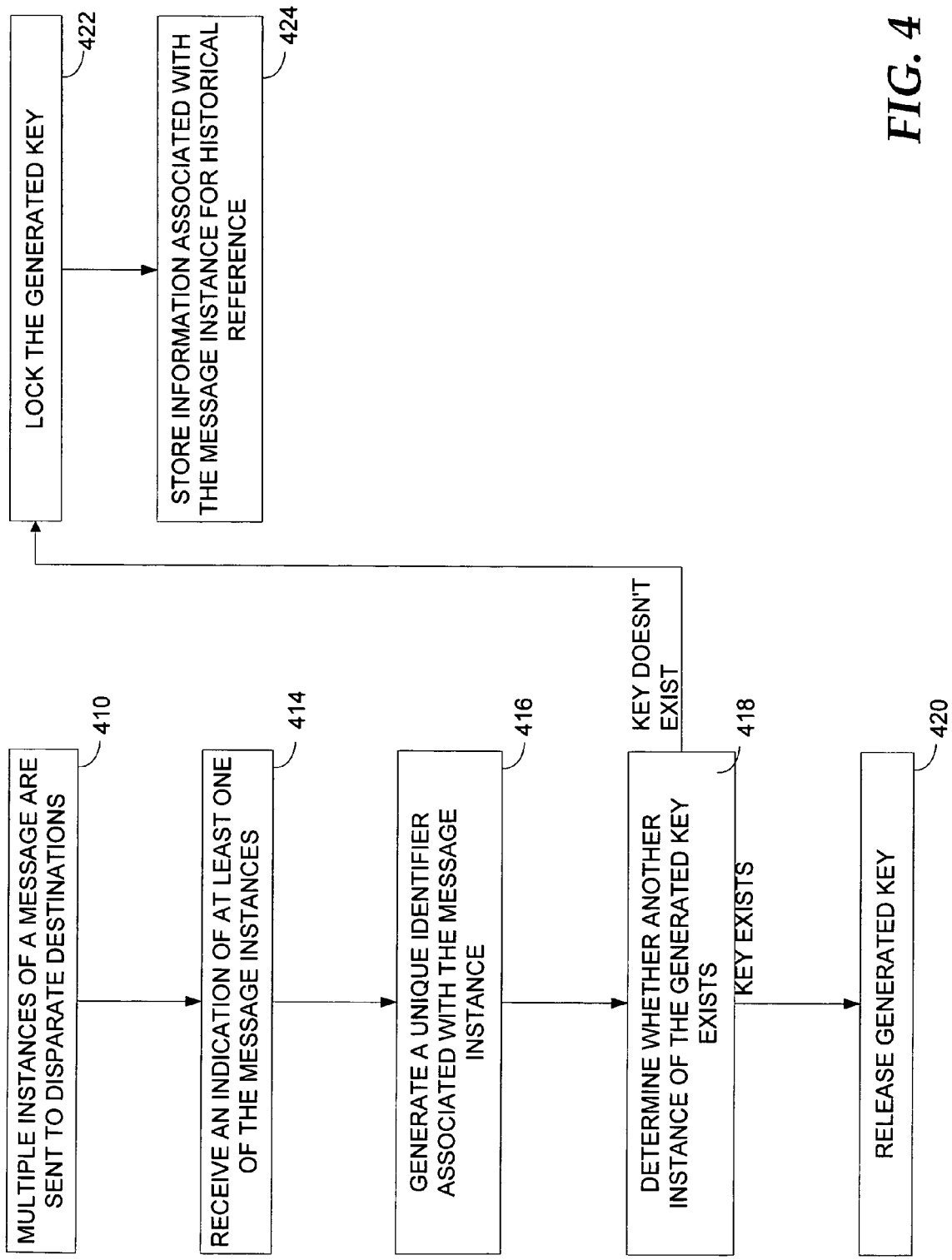
FIG. 4 is a flow diagram depicting an illustrative deduplication process in accordance with an embodiment of the present invention.

Turning now to FIG. 4, a flowchart is provided that illustrates a method for deduplicating alarms in a communications-networking environment in accordance with an embodiment of the present invention. The illustrative embodiment depicted in FIG. 4 may be followed in the context of FIG. 3. At a step 410, multiple instances of a message are sent to disparate destinations. As previously mentioned, redundancy requirements mandate that when a message is generated by a network element, multiple instances of that message must be sent to different, redundant locations. Sending a message to multiple locations increases the likelihood that at least one instance of the message will be available in the event of a communications failure. Although FIG. 3 illustrates that two instances of a network-element message are communicated, it should be understood that more than two instances of the message may be communicated. The more copies that exist, the more robust will be a networking scheme, but the network will also increase in complexity.

Absent any form of deduplication, each instance of a single message generated would undesirably be reflected as an independent alarm when the respective element enters into an alarm state. Thus, if four layers of redundancy are included in a networking environment, and a network element enters into an alarm status, then a control-room operator would receive four separate indications of alarms if no form of deduplication were instantiated. The present invention prevents this from happening.

At a step 414 each of the message instances are received. In a preferred embodiment, an indication of at least one of the message instances is received at a step 414. In a preferred embodiment, this indication takes the form of an alert being inputted into input table 318. An alert, similar to a rose, may be associated with many names by those skilled in the art. Receiving each indication of every message instance is not necessary, but will happen in the vast majority of cases. Storing the message indications in a table should not be construed as a limitation of the present invention, but rather one embodiment. The steps that follow could be carried out without the intervening step of storing alerts in input table 318. But storing the alerts in input table 318 offers the advantage of being able to historically reference the alerts for a desired time.

At a step 416, a unique identifier is associated with the message instance. Many different ways exist to generate a unique identifier, but in a preferred embodiment a trigger fires an algorithm to generate a key. This key is generated based on the attributes of the message indication, such as alert attributes 312 (see FIG. 3A). As previously described, this generated key would be the same for each data item that had the same attributes. To illustrate, consider several members of the same household, who are associated with a single address and telephone number. A unique identifier generated by the address and phone number may be associated with each member of the household. Thus each household member (alarm occurrence) would have the same unique identifier. But a member of a different household (different alarm type from the same device or same alarm type from a different device) would have a different unique identifier. Here, each identical instance of the same alarm will be associated with the same unique identifier, such as first key 348. But a different alarm, such as an alarm generated for a different reason or a by different device or by a different port of the same device, etc., will have a different unique identifier.

A determination is made at a step 418 as to whether another instance of the key exists. Preferably this determination is made quickly. In a preferred embodiment, a hash table is used that does not allow duplicate entries to be written to it. If the numeral "10" already exists in the hash table, then an attempt to write "10" into the table will fail. The success or failure of a write attempt into hash table 320 is observed to determine whether the key exists. If first key 348 is allowed to be written into hash table 320, then a determination is made that the key does not exist. But if the key is not allowed to be written into hash table 320, then the key must already exist in hash table 320. Because the key already exists, and each key is unique with respect to each alarm, then the present invention recognizes that the data at issue corresponds to a duplicate instance of a single alarm. Thus, at a step 420 the key is released.

In a preferred embodiment, the relevant key is released by removing it from hash table 320. With the key removed from hash table 320, a subsequent write attempt will succeed, indicating a new alarm. The scenario just described contemplates two layers of redundancy, such that only two write attempts are necessary. One method of extending the illustrative example beyond two layers of redundancy would be to provide a counting step for each failed write attempt. Once the count attempt equals one less than the number of layers of redundancy, then the respective instance of that key may be removed from hash table 320. Here, two layers of redundancy imply a count of one (two minus one). Because the count of one is used, there is no need for a counter at all—the determination step 350 serves as a counter. But if ten layers of redundancy are used, such that ten instances of an element message were propagated, then a counter can be used to count nine failed write attempts. After the ninth failed write attempt, that key would be deleted from hash table 320.

If at a step 418, a determination was made that the respective key did not exist in hash table 320—meaning that what has been received is the first instance related to the element message—then that key is locked. This key remains locked until the requisite number of failed write attempts occur, or a default requirement is met. Here, a default write attempt of one is implemented.

At a step 424, various information portions related to the alarm are stored in various locations. In a preferred embodiment, all of the data associated with the alarm is stored in output table 322. A first data portion 354 is written into summary-alert table 1556. The summary-alert table records data common to each instance of an alert or alert group. An exemplary alert group would be a link-up/link-down indication, which corresponds to a data link iteratively losing signal and then regaining signal. Until the problem is fixed, alternating messages will be received corresponding to when the link receives a signal and loses a signal and then receives a signal, etc. This alert group can be ultimately displayed as a single alarm and stored as a single row in summary-alert table 1556. Data such as the first instance and the last instance can be included in summary-alert table 1556, but historical tracking is provided by alert table 1558, where a second data portion 356 is archived. First data portion 354 and second data portion 356 are portions of first alert 340. Although the two alert portions may be identical, second data portion 356 preferably provides a greater amount of detail than does first portion 354.

Between summary-alert table 1556 and alert table 1558, no information related to any occurrence of any alert is lost. This offers the tremendous benefit of being able to access comprehensive historical alarm data 356 stored in alert table 1558. The data stored in alert table 1558 allows historical analysis to be performed that uncovers potential trends or other indications of network-problem areas. The triple-write technology employed by the present invention allows an instance of the alert to be written in output table 322, summary data to be entered into summary-alert table 1556, and details associated with respective alerts to be stored for future retrieval in alert table 1558.

Alert Manager

Figure 5:
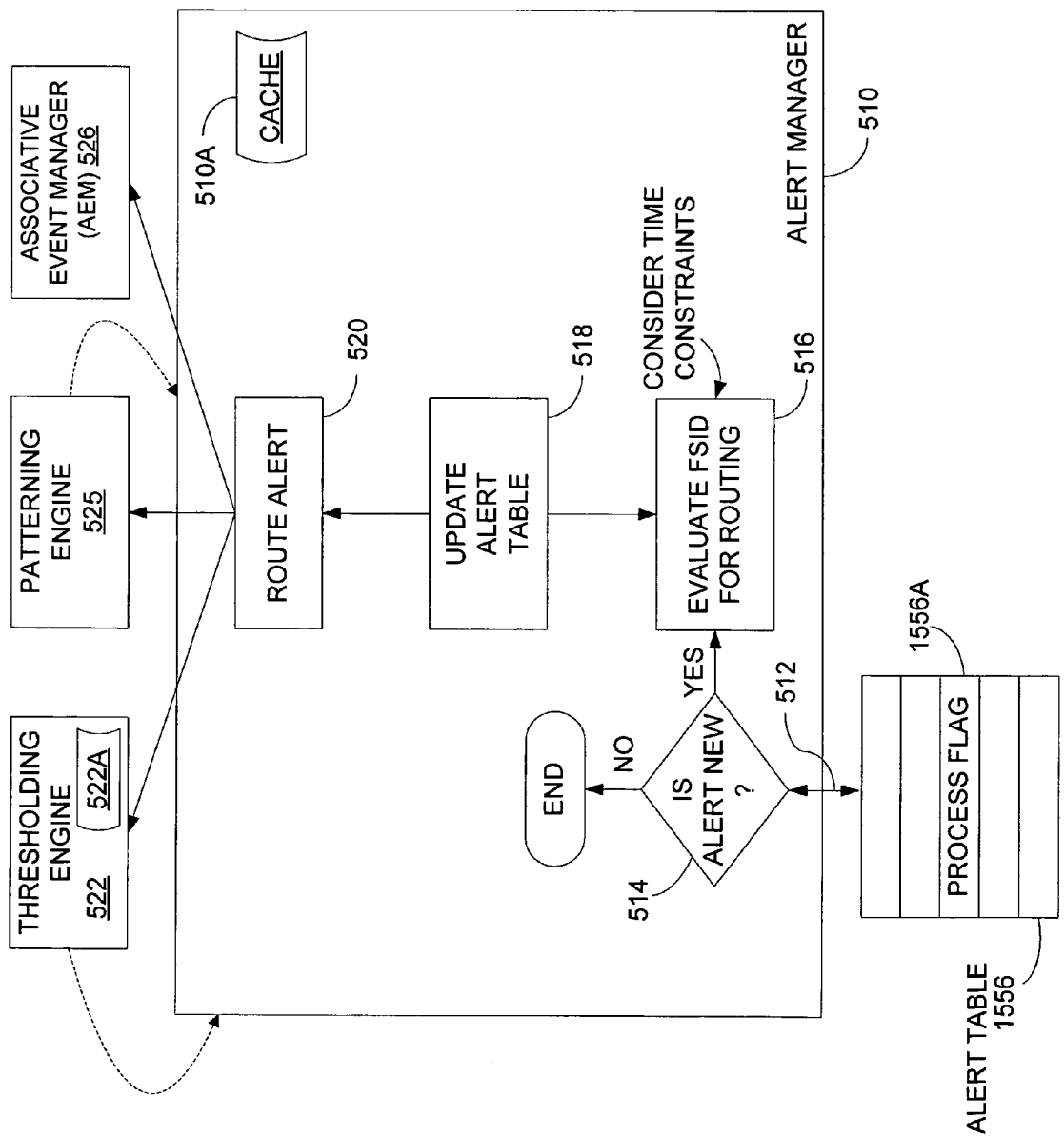
FIG. 5 a block diagram illustrating an exemplary method for managing alerts in accordance with an embodiment of the present invention.

As previously mentioned, the present invention facilitates receiving and analyzing hundreds of alarms per second. Turning now to FIG. 5, a block diagram illustrating an exemplary method for managing alerts in accordance with an embodiment of the present invention is provided. An alert manager 510 communicates with summary-alert table 1556. For illustrative purposes, summary-alert table 1556 is depicted as including a process flag 1556A and a count variable 1556B.

Process flag 1556A preferably indicates whether a specific alert has been processed; that is, evaluated for routing or propagated through alert manager 510. Count indicator 1556B indicates the number of occurrences of the alert at issue. Recall that an alert can occur more than once, such as in the case of a recurring signal loss. If an alert has the same alert attributes 312 as prior alerts except for a timestamp, then the corresponding data portion 354 will be updated to reflect an increased count. At an ongoing step 512, alert manager 510 periodically references summary-alert table 1556 to determine whether an unprocessed alert exists. This process can assume various forms.

In a first embodiment, alert manager 510 scans summary-alert table 1556 for a process flag that has not been set. For example, all new alerts are preferably inputted into summary-alert table 1556 with their corresponding process flag 1556A set to an initial value, such as zero. After the alert is processed by alert manager 510, process flag 1556A can be set to one for example. Those skilled in the art will appreciate alternative ways of indicating that an alert has been addressed by an alert-managing component. Toggling a bit is merely one example. For this example, alert manager 510 locates an alert with process flag 1556A indicating that it has not been processed. Alert manager 510 then fetches the unprocessed alert. In a preferred embodiment, a single-threaded fetching scheme is employed to prevent in-process alerts, alerts being processed by alert manager 510.

Alert manager 510 receives the alert, whereby a determination is made at a step 514 as to whether the alert is a new alert. An exemplary method for determining whether the instant alert is a new alert, is to evaluate count variable 1556B. If the count 1556B indicates that the instant alert is the first occurrence of the alert, then a determination can be made, then the alert is a new alert. Preferably, all alerts are inputted into summary-alert table 1556 with a count value 1556B of zero, indicating that the alert is a new alert. But if an alert arrives that is a subsequent occurrence of a prior alert, then the respective count value 1556B will be incremented. Thus, in a preferred embodiment, if a status indication (message, alert, alarm, etc.) has a count value greater than zero, then that status indication is not new.

Returning to step 514, if the alert is a new alert, then processing continues to a step 516 where an FSID is evaluated for routing purposes. An FSID is merely a variable, preferably a number, such as a byte. The term "FSID," which stands for Field Set Identifier, is used herein so as to not obscure the present invention and to distinguish this identifier from the many other identifiers referenced in this disclosure. But it is worth stressing that although an acronym is used, the FSID is merely an identifier such as a number and is not a limitation of the present invention. The FSID is generated according to user-defined rules based on attributes associated with alert 304. A graphical user interface is provided to create the rules that dictate how an FSID is generated based on all or a portion of alert attributes 316. The GUI also allows a user to configure assigning an FSID based on an alert's attributes 312.

Figure 6:
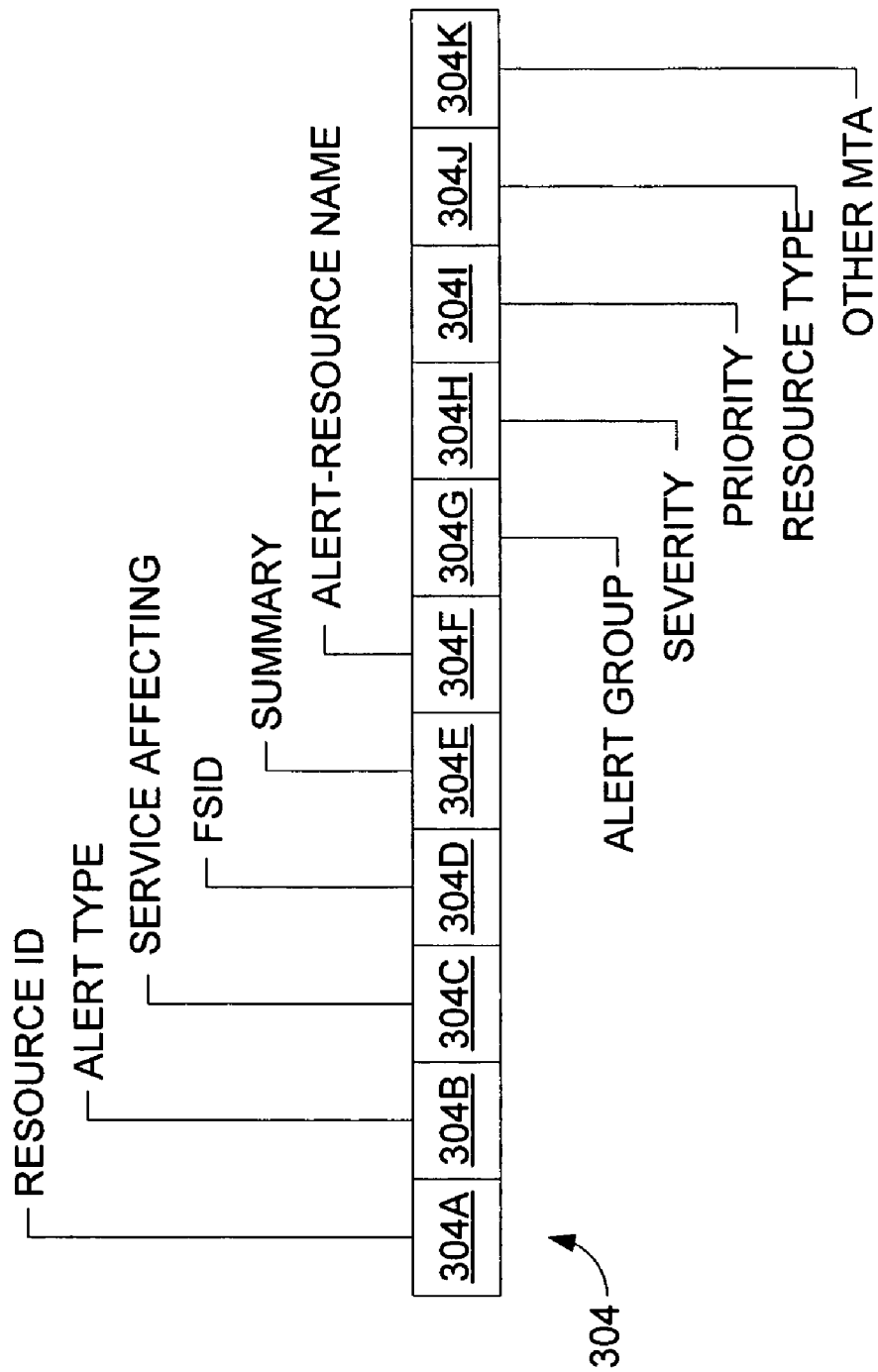
FIG. 6 is a block diagram that illustrates attributes of an alert in greater detail.

We will now provide a more comprehensive explanation associated with specific attributes that are preferably associated with an alert with reference to FIG. 6. FIG. 6 illustrates the alert 304 of FIG. 3A in greater detail. As shown, alert 304 includes several fields (304A-304K) that compose alert attributes 312. In a preferred embodiment, the various fields depicted in FIG. 6 compose a data array. The order of the fields shown is not relevant and should not be construed as a limitation of the present invention. As depicted in FIG. 6, alert 304 preferably includes a resource identifier 304A, an alert type 304B, a service-affecting indicator 304C, an FSID 304D, a summary 304E, an alert-resource name 304F, an alert-group indicator 304G, a severity indicator 304H, a priority indicator 304I, a resource type 304J, and an optional area for other data 304K.

Resource ID 304A identifies the specific network element, such as element 325, or subcomponent with which an alarm is associated. Consider a routing device that has several cards and several ports. If a general alarm occurs in the routing device, then the resource identifier will indicate that the routing component itself has a problem. If a card within the routing device goes bad, then the resource identifier will be associated with the card within the routing component. Similarly, if a port in the routing device goes bad or issues a warning, then the resource identifier 304A will be associated with the port on a specific card within the specific routing component.

Alert type 304B indicates what type of alert a given alert is. In a complicated communications network, an alert may assume thousands of different types. Exemplary alarm types include a loss of signal, a threshold breach, a transmission error, a routing error, etc. Service-affecting indicator 304C indicates whether the alert at issue actually affects service. For example, a card may be in use, but have several ports that are not being used to actually communicate real data on the network. In such a case, the ports may be used for testing purposes or merely sit idle. If one of these unused ports enters into alarm status, then although the alarm may need to be addressed, it is beneficial to know that this alarm is not actually affecting service that should be offered by the network. Such an indication is provided by service-affecting indicator 304C. FSID 304D is generated by probe 310 (see FIG. 3A), which evaluates one or more of the alert attributes 312 to set its value. In a preferred embodiment, probe 310 performs an algorithm on resource ID 304A, service-affecting indicator 304C, alert group 304G, severity indicator 304H, and resource type 304J. These values are referenced to generate an FSID 304D. An alert with identical values for the aforementioned fields will have identical FSIDs.

Summary field 304E provides space to include data streams that help describe the alert in greater detail. Alert-resource name 304F is a human-readable name associated with resource ID 304A. Alert group 304G identifies an alert group to which alarm 304 belongs. In a preferred embodiment, all alerts are associated with an alert group. An alert group allows individual alerts to be referenced together. An exemplary alert group is an "up/down" set of alarms. For example a card may go up and then down and then up and then down. Whenever the card goes up or down, the respective alert is associated with the "up/down" alert group.

Severity indicator 304H indicates a severity associated with alert 304. In a preferred embodiment, five different levels of severity are possible: critical, major, minor, warning, and clear. Those skilled in the art will appreciate that alternative schemes for representing various types of severity levels can also be included without departing from the spirit and scope of the present invention. Priority indicator 304I indicates a priority associated with alert 304. Preferably, priority indicator 304I assumes one of one hundred possible values, the higher, the greater the priority. Thus an alert with a priority of "ninety-nine" deserves much more attention than an alert with a priority of only "two."

Resource type 304J indicates the type of resource to which the alert is associated. As previously mentioned, a communications network can include a variety of resources such as routing components, switching components, signal-providing components, switches, hubs, computers, etc. Resource type 304K indicates which type of resource went into an alarm state. Finally, field 304K represents that other data can also be included without departing from the scope of the present invention as desired.

Again the fields illustrated in FIG. 6 may be known in the art by various names, but provide different levels of functionality that one skilled in the art would appreciate. The order that the fields are shown is for illustrative purposes, and should not be construed as a limitation of the present invention.

Returning now to step 516 of FIG. 5, alert manager 510 evaluates FSID 304D for routing purposes. In a preferred embodiment a list of Field Set IDs is loaded within or in a memory component such as a cache 510A. The Field Set ID of the specific alert is compared to the cache's FSID values to ultimately route the alert. During step 516, resource ID 304A can be evaluated to determine the status of the network element that gave rise to the alert. If such a check is made, and if a resource status is not active, then the alert will not be processed; meaning that it will not be routed. In this situation, process flag 1556A will be toggled to indicate that the alert has been processed, and the system will automatically purge the alert.

Also during evaluation step 516, any applicable time constraints are also preferably considered. Time constraints are times of the day during which an alarm is valid. An illustrative time constraint may be a business's operating hours. For instance, consider a door alarm that indicates an open door within a facility. Although such an alarm is valuable for identifying open doors after hours, it would generate little more than a headache to have to deal with such an alarm during business hours. Thus, if alert manager 510 receives an open-door alert during business hours, then during step 516 such an alert will be caught and prevented from ripening into an alarm event by evaluating the alert's attributes against one or more time constraints. Additional time-constraint applications can also be included. Preferably, a check is made on each alert to determine whether an applicable time constraint exists. But in an alternative embodiment, only certain types of alerts would be evaluated to determine whether an applicable time constraint exists.

At a step 518, alert table 1558 is updated. In a preferred embodiment, updating alert table 518 includes toggling process flag 1556A from a "not processed" status to a "processed" status. Here, that would mean transitioning process flag 1556A from zero to one incident to alert manger 510 evaluating the alert for routing. At a step 520, the alert is actually routed. In a preferred embodiment the alert is routed to one of three components: a thresholding engine 522, a patterning engine 525 or an associative event manager 526. Each of these will be explained in greater detail below, but in summary fashion: thresholding engine 522 monitors alerts to determine if they reach some sort of threshold value. For example, after an alert that occurs a certain number of times in a certain span of time. As another example, an alert may persist beyond a threshold period of time.

Patterning engine 525 observes patterns that may develop among alerts. For instance, if four out of ten ports on a given card enter into alert status, then patterning engine 525 may generate a synthetic alarm indicating that the card is bad. Associative event manager 526 performs various events associated with different alerts. Again, each of these will be explained in greater detail below.

Returning now to determination step 514, if it was determined that the alert was not a new alert, then processing ends.

It should be stressed that alert manager 510 can route to more than three destinations, but the three target engines listed are employed in a preferred embodiment. Additional targets, however, could receive various types of alerts. Alerts can be routed to tens or hundreds of different destinations, individually or simultaneously, in various embodiments depending on working conditions.

After the alert is routed, a set of deletion rules are applied to keep alert table 1558 small, and thereby searching it fast. Any alerts with process flags set and with no events associated with it and that have been written to alarm history database 327 are deleted. Alarm data from summary alert table 1556 and/or alert table 1558 is archived in alert-history database 327 so that it can be referenced to perform historical analysis upon it.

Thresholding

One of the aspects of the present invention is that it more efficiently depicts alarms. In furthering this aspect, the present invention does not merely display every alarm (although it could if desired). Some alarms may not merit display unless they reach a certain severity, occur a certain number of times, persists for a certain duration, etc. That is, the alarm(s) must cross some threshold or satisfy a set of prescribed rules. Thresholding engine 522 provides this functionality.

Thresholding engine 522 receives incoming network alerts routed to it by alert manager 510 and determines if the alert has exceeded a predetermined threshold. Users (such as network-operations specialists) can configure the threshold values and rules criteria. Thresholding engine 522 analyzes the alert according to a certain processing type. Exemplary processing types include a duration processing type and/or a frequency-of-occurrence processing type.

The duration processing type is used in connection with determining whether a certain status indication has persisted for a certain amount of time or during a certain time interval. When the first alert for a particular problem is received, threshold engine 522 stores the alert and begins monitoring it. If after a prescribed interval, such as a certain number of seconds, the alert has not cleared, then thresholding engine 522 will generate a synthetic alert, which is sent to alert manager 510 for further processing.

In another processing type, thresholding engine 522 monitors an alert to determine whether it occurs a certain number of times within a certain interval. When the first alert for a given problem is received, thresholding engine 522 stores that alert and watches for subsequent alert occurrences. If the number of alert occurrences meets a predetermined level within a specified time frame, then the threshold is reached, and a synthetic alarm will be generated.

If a prescribed threshold is not reached or if the network returns a resolution for the alert, then thresholding engine 522 clears the alert. Thresholding engine 522 also employs two watching components that increase the robustness of the present invention: a database watcher and short-term watcher. If a thresholding rule has a long time frame, then thresholding engine 522 stores the alert in database 254 in a preferred embodiment. A database watcher scans the alerts in database 254 to see if any of them are within a prescribed final time frame, such as within a final minute. If the database-watching component finds an alert within the last minute of monitoring for example, then a short-term watcher is evoked.

The short-term watcher stores the alert(s) in a memory unit, such as thresholding cache 522A. After storing the alert in thresholding cache 522A, thresholding engine 522 monitors for a clear message from the network that would clear the stored alert as a result of no longer meeting the threshold criteria. If the threshold is reached, then thresholding engine 522 creates a synthetic alarm and sends it to alert manager 510 for further processing.

The aspect of injecting a synthetic alarm from thresholding engine 522 into alert manager 510, where it can be evaluated along with all other alarms is a desirous advantage offered by the present invention. Thresholding engine 522 provides multiple features within the context of network-fault management. As will be explained in the forthcoming illustrative example, thresholding objects are stored in a database to facilitate a recovery feature whereby if a power or some other failure occurs, then processing can resume at the state where power was lost. Thresholding engine 522 provides a feature-rich approach to managing alerts that lend themselves to thresholding rules.

Figure 7A:
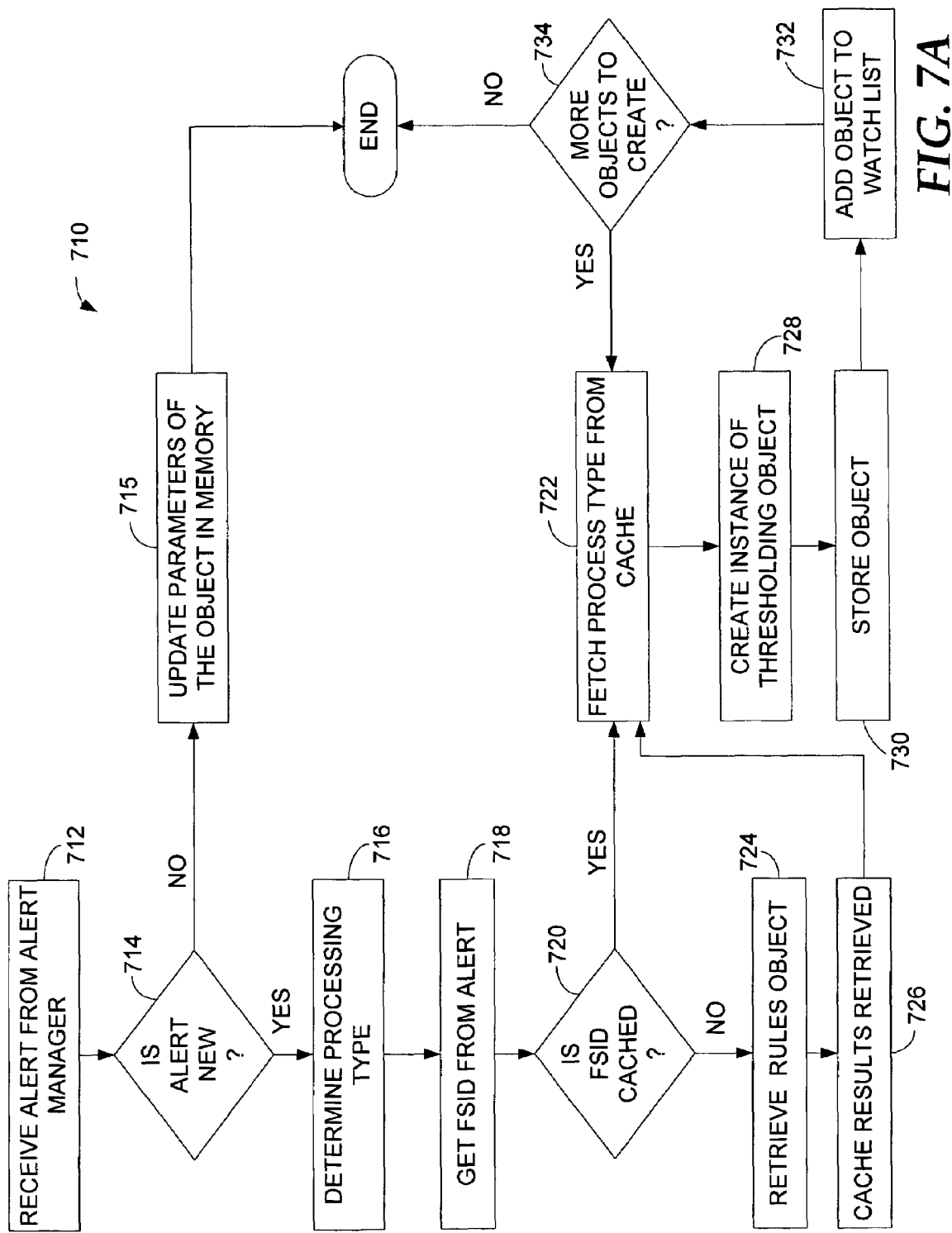
FIGS. 7A-7B depict an illustrative method implemented by thresholding engine 522 in accordance with an embodiment of the present invention.

Turning now to FIG. 7A, an illustrative method implemented by thresholding engine 522 in accordance with an embodiment of the present invention is provided and referenced generally by the numeral 710. The method 710 should not be construed as limiting in nature, but is provided to illustrate various functional aspects made available by thresholding engine 522 and how that functionality is provided. Thresholding engine 522 provides the ability to delay or prohibit displaying an alarm until some threshold value is met. The method of FIG. 7A will be made more clear in connection with an illustrative example.

Consider the case where a port is trying to establish a remote connection but cannot for some reason. Such an example is commonplace in a communications networking environment when a remote destination is not accepting signals. Thus, for this example a port will attempt to make a connection and then go down, and then attempt to reestablish a connection, and then go down, etc.

At a step 712, an alert is received from alert manager 510. Threshold engine 522 begins to act as an intelligent buffer that ultimately limits displaying alarms according to a set of user-defined configuration rules. At a step 714, threshold engine 522 determines whether the alert is a new alert. This determination can be carried out in a variety of ways. In a preferred embodiment, thresholding engine 522 begins to evaluate whether the alert it received is new by reading the attributes associated with the alert. Exemplary attributes include alert attributes 304 (see FIG. 6). As previously mentioned, thresholding engine 522 is associated with a thresholding cache 522A. A cache is an area of memory, typically volatile memory, that facilitates rapid processing execution. Instructions and data are stored in thresholding cache 522A to increase performance but are also persisted to database 254 in a preferred embodiment so that the instructions and data are available if normal operation is interrupted.

Thresholding cache 522A is queried to determine whether an alert with certain attributes that are identical to the alert received from alert manager 510 is already present in the cache. In a preferred embodiment, the alert attributes used to query include resource ID 304A, alert group 304G, and FSID 304D. If this query finds a match, then the respective FSID 304D is retrieved, and the alert is determined to not be new at step 714.

If the alert is not new, then the appropriate parameters of the thresholding object in memory are updated. For example, the number of occurrences for the cached alarm will be updated along with any applicable timestamp(s). Another illustrative parameter that may be updated includes a status parameter. Proceeding with our illustrative example, the status of the received alert may be changed from "up" (attempting to connect) to "down" (connection failed). These parameters are updated at a step 715.

In one embodiment, maintaining the various thresholding objects in memory includes creating a list of thresholding objects. After the parameters are updated at step 715, no further action needs to be taken because thresholding cache 522A is automatically monitored by a process that will be explained with reference to FIG. 7B below.

Returning to step 714, if the determination is made that the alert is new, then thresholding engine 522 determines the processing type associated with the alert at a step 716. As previously mentioned, exemplary processing types include a "durational" processing type or "frequency of occurrence" processing type among others. A preferred method of determining a type of processing is to evaluate the alert's FSID 304D. Accordingly, the FSID is retrieved from the alert at a step 718. To determine the best way to retrieve FSID 304D, a determination is made at a step 720 as to whether the respective FSID is cached in thresholding engine 522A.

Part of an initialization process associated with starting alert manager 510 is to populate an alert-manager cache 510A with information that alert manager 510 is aware. Thus, as alerts are received, alert attributes 304 associated with those alerts can be stored in alert-manager cache 510A. In a preferred embodiment, this is the area of memory that is checked to determine whether FSID 304D is cached at step 720.

If the FSID 304D is cached in alert-manager cache 510A, then the processing type is retrieved from cache 510A at step 722. In a preferred embodiment, the processing type is determined by referencing the FSID. The FSID is assigned to convey the processing type. Those alerts with certain FSIDs will be attributed a certain processing type and those with other FSIDs may be associated with the same or a different processing type. An alert may be associated with more than one processing type. This association is preferably provided by probes 330 and/or 336.

Returning to determination step 720, if the respective alert's attributes are not cached, then a rules object is retrieved at a step 724. In a preferred embodiment, the rules object is retrieved from database 254. The rules object is composed of several items, for example: a processing type ("open for,"

or "X in Y")—that is, durational or frequency of occurrence—parameters that satisfy the processing type, details for any synthetic alarm, and alert attributes that will be used to generate or update synthetic alarms. Processing-type parameters are values used to satisfy the actual thresholding conditions.

For example a durational alarm, such as an alarm that is open for a certain amount of time, would include a parameter corresponding to the amount of time that the alarm must remain active to be presented to a user. For example, if a user wishes to require a notification that a door has been open for nine seconds, then a processing-type would be "duration" and have at least one parameter of value of "9." If an alarm is to be triggered when a certain event happens five times in ten seconds, then processing-type parameters would be "5" and "10," corresponding to frequency and time interval respectively.

The rules object also indicates which alert attributes will be used to create a synthetic alert, or synthetic status indication. Exemplary alert attributes include a summary, and a priority, etc. After the rules object is retrieved, the results are preferably cached for future reference at a step 726. Processing then reverts to step 722, where the processing type is fetched from cache memory. At a step 728, thresholding engine 522 creates an instance of a thresholding object from the parameters and data associated with the alert. This object is preferably stored in database 254 at a step 730 so that it can be recalled in the event of a power loss or other failure. The thresholding object is added to a watch list at a step 732.

The watch list is constantly monitored by a process that will be described with reference to FIG. 7B. At a step 734, thresholding engine 522 checks to determine whether there are other objects to create. Multiple thresholding objects can be generated based on a single alert. This is because an alert may have multiple processing types, such as both a duration processing type and an frequency-of-occurrence processing type. If additional objects do need to be created, then processing reverts to step 722 to fetch the information from cache memory in a preferred embodiment. If no more objects need to be created, process 710 is complete, and thresholding engine 522 will wait to receive additional alerts. As just described, the watch list generated in step 732 is continually monitored (or monitored according to prescribed intervals) to determine whether any items on the list meet the respective threshold criteria, and thereby lead to triggering an alarm event, such as generating a synthetic alarm. An exemplary process for monitoring the threshold-object watch list will now be described with reference to FIG. 7B.

Figure 7B:
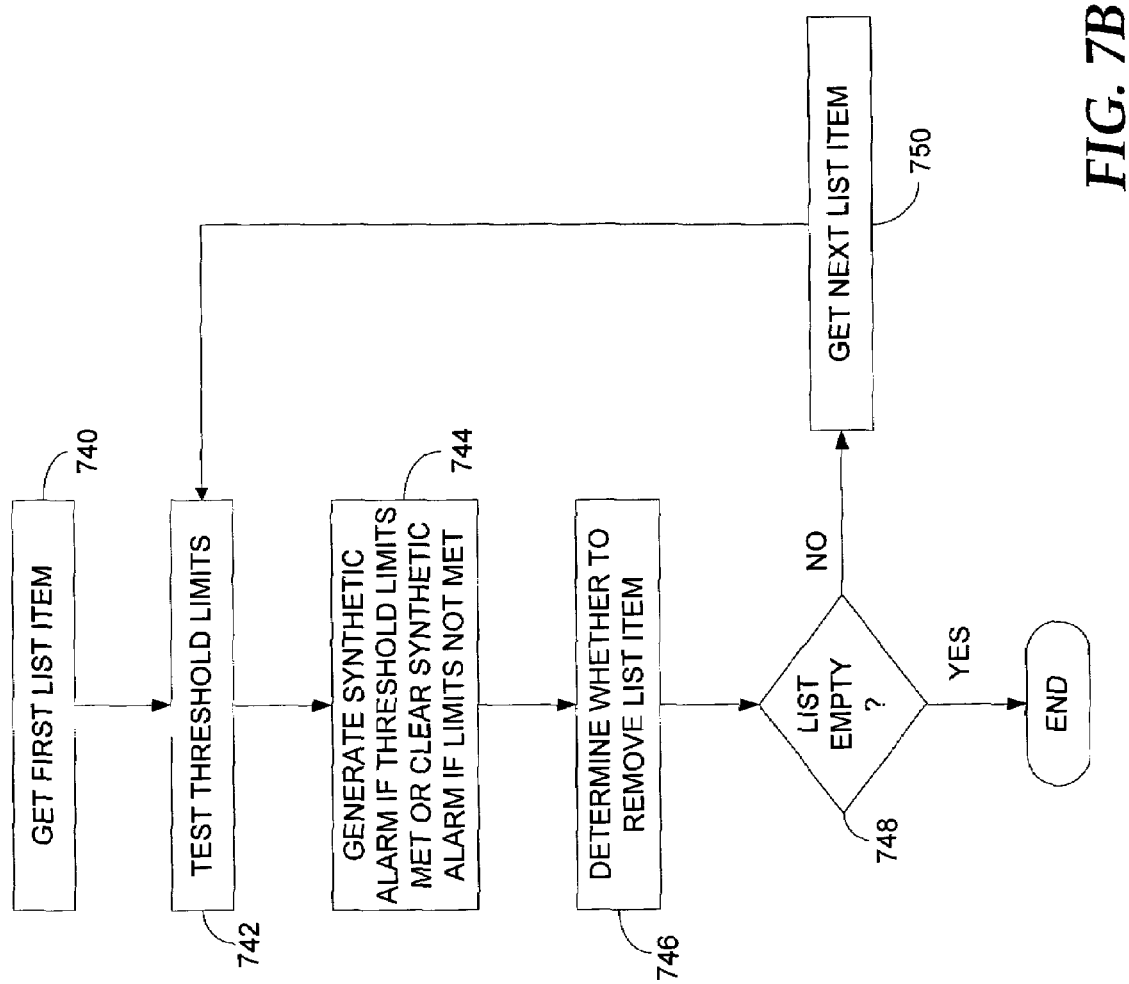

Turning now to FIG. 7B, at a step 740, the first item is retrieved from the watch list. At a step 742 the threshold limits are tested. For an occurrence-type object, an evaluation is made as to whether the instant alert has occurred the prescribed number of times within a prescribed interval. For a duration-type alert, the object is evaluated to determine whether the alert has persisted for a prescribed duration. If the thresholding limits are met, then a synthetic alarm is generated at a step 744. Similarly, if the threshold limits associated with a previously generated synthetic alarm fall below the respective threshold values, then that alert will be cleared at a step 734.

A determination is made at a step 746 as to whether the thresholding object should be removed from the watch list. If the alert should no longer be monitored, then it is removed from the watch list. But if the thresholding object should remain on the list, such as an occurrence-type alarm that has not yet met the threshold number of occurrences, then the object will remain on the watch list. At a step 748, the list is evaluated to determine whether it is empty. If it is empty then no further processing is necessary. But if the list is not empty then the next list item is fetched at a step 750 and processing reverts to step 742 where the instant object's threshold limits are tested.

In a preferred embodiment, another process contemporaneously runs with that of FIG. 7B. This second process continually monitors deadline times associated with the alerts on the thresholding-object watch list. As a deadline approaches, a determination is made as to whether the instant thresholding object should be monitored by a short-term watcher. For example, if an occurrence-type alert is configured to be synthetically generated after five occurrences in ten seconds, and four occurrences have occurred then a determination may be made to register that alert with the short-term watcher. The short-term watcher is a software component that monitors database 254 so that feedback can be provided immediately upon the happening of an event that gives rise to the alert meeting its threshold limits. In the example just given, the short-term watcher would monitor database 254 for the fifth and final occurrence to happen within the exemplary ten seconds allotted. As soon as that last occurrence happens, a synthetic alert will be generated and injected into alert manager 510.

The technical aspect of generating a synthetic alert based on a set of threshold limits and reinjecting that alert back into the system vis-à-vis alert manager 510 is a particularly useful feature of the present invention. Once introduced into alert manager 510, the synthetic alert can be evaluated just like an original alert. It can be directed to thresholding, patterning, event association, or any other technology. The synthetic alert can be entered into the summary-alert table 1556 as well as alert table 1558. As previously mentioned, entering data into alert table 1558 enables historical tracking. Alert table 1558 provides an input area to receive data associated with every alert generated. Periodically, data in summary-alert table 1556 or alert table 1558 is offloaded into alarm-history database 327 for long-term storage.

An illustrative example of a series of alert happenings that would be handled by thresholding engine 522 is provided with reference to FIG. 8 to more fully explain the present invention. FIG. 8 depicts a timeline 808 composed of seventeen seconds. The example provided in FIG. 8 is provided merely for illustrative purposes and should not be construed as a limitation of the present invention. Timeline 808 depicts five occurrences of events—each denoted as an "X"—that gives rise to alerts and are respectively denoted by numerals 810, 812, 814, 816, and 818. These happenings occur at the fourth second, eighth second, ninth second, tenth second, and eleventh second.

A sliding-window algorithm is preferably employed to determine whether thresholding limits are met. First window 820, second window 822, and third window 824 each span ten seconds but have different starting points. Assume four alerts are received in seconds one through ten. This case is reflected by first window 820. For purposes of this example, the threshold limit is five occurrences in ten seconds, a frequency-of-occurrence processing type. During first window 820, the thresholding limits are not met and no action will be taken.

After the next second, however, second window 822 includes all five alerts 810-818, which have occurred in ten seconds. Thus, the threshold criteria is met. Accordingly, a synthetic alarm will be generated at a step 826. Advancing another second, third window 824 spans seconds five through fifteen, moving beyond first alert 810. The threshold limits are no longer met, so the synthetic alarm that was generated in step 826 will be cleared in step 828.

In an alternative embodiment, a post-alarm value can be set so that an alert is cleared only if its corresponding attributes fall below the post-alarm value. Thus, the set and clear values are different. This technology would be employed to prevent unnecessary alarm oscillation and is somewhat akin to a thermostat that is configured to begin heating a room at seventy degrees and continue heating the room until a certain number of degrees beyond seventy is reached. Here, thresholding engine 522 can be configured to generate a synthetic alarm when five occurrences happen within ten seconds, but to not clear the alarm unless the number of occurrences in ten seconds drops to three, for example—that is, a value less than five.

Those skilled in the art will appreciate other uses and ways to implement the aforementioned thresholding functionality without departing from the scope of the present invention.

Topology Patterning

Patterning engine 525 receives incoming network trouble alerts routed to it by alert manager 510 to determine if those alerts represent a pattern within a network's configuration (topology). Typically, a parent's children are evaluated to determine if an alert associated with the parent should be generated. For example, a set of patterning criteria may be established that triggers a synthetic alarm if x-percent of total components are alarming. A synthetic alarm is a type of alarm that is generated and introduced into the system, but does not directly stem from a physical network element. Synthetic alarms can be generated by thresholding engine 522 and patterning engine 525. In a real-life scenario, the above situation may correspond to x-percent of ports on the network element's card in an alarm state, indicating the potential development of a pattern that requires addressing. Patterning engine 525 would then generate a synthetic alert associated with the respective parent node.

As briefly mentioned in the summary, topology patterning provides various practical applications in the technical arts related to network fault management. Patterning engine 525 analyzes alerts to determine if a pattern of problems exist. It creates synthetic alerts in the same format as network-generated alerts, enabling alert manager 510 to manage all alerts seamlessly regardless of origin. A network-operations user defines a set of rules for evaluating patterns of alerts from a communications network. An advantage of employing the topology-patterning technology is that a user does not need to know all of the various relationships between topological nodes of a communications network. This will be illustrated in greater detail below. By implementing a topology-patterning-recognition scheme, patterning engine 525 automatically detects potential sources of problems that would otherwise be discovered only through a laborious, manual, resource-intensive process.

Without the benefit of a patterning scheme, a user may waste time attempting to diagnose the child of a parent problem. For example, consider the situation where a network card has several ports. If the network card itself enters into an alarm state, then each of its corresponding ports may also enter into an alarm state. A user may receive an indication of the various ports in alarm condition. Without the benefit of patterning, a user may then begin to troubleshoot each port individually, unbeknown to him that the port problems really stem from a faulty card.

If the problems associated with the network card were resolved then the corresponding problems associated with the respective ports would also be solved. In many situations, however, a card may not issue an alarm even though in actuality there is a problem associated with the card. An exemplary reason may be that the card's vendor does not provide the ability to issue an alarm. In such a situation, patterning offers the ability to introduce a level of intelligence into a fault-management system, whereby administrators can provide a set of rules to trigger alarms based on the performance of a communications network. Patterning engine 525 evaluates a number of alerts from child components to determine if there is a problem with the parent component. The synthetic alerts generated by patterning engine 525 are subject to the same problem-severity evaluation performed on alerts received from network elements.

Figure 9:
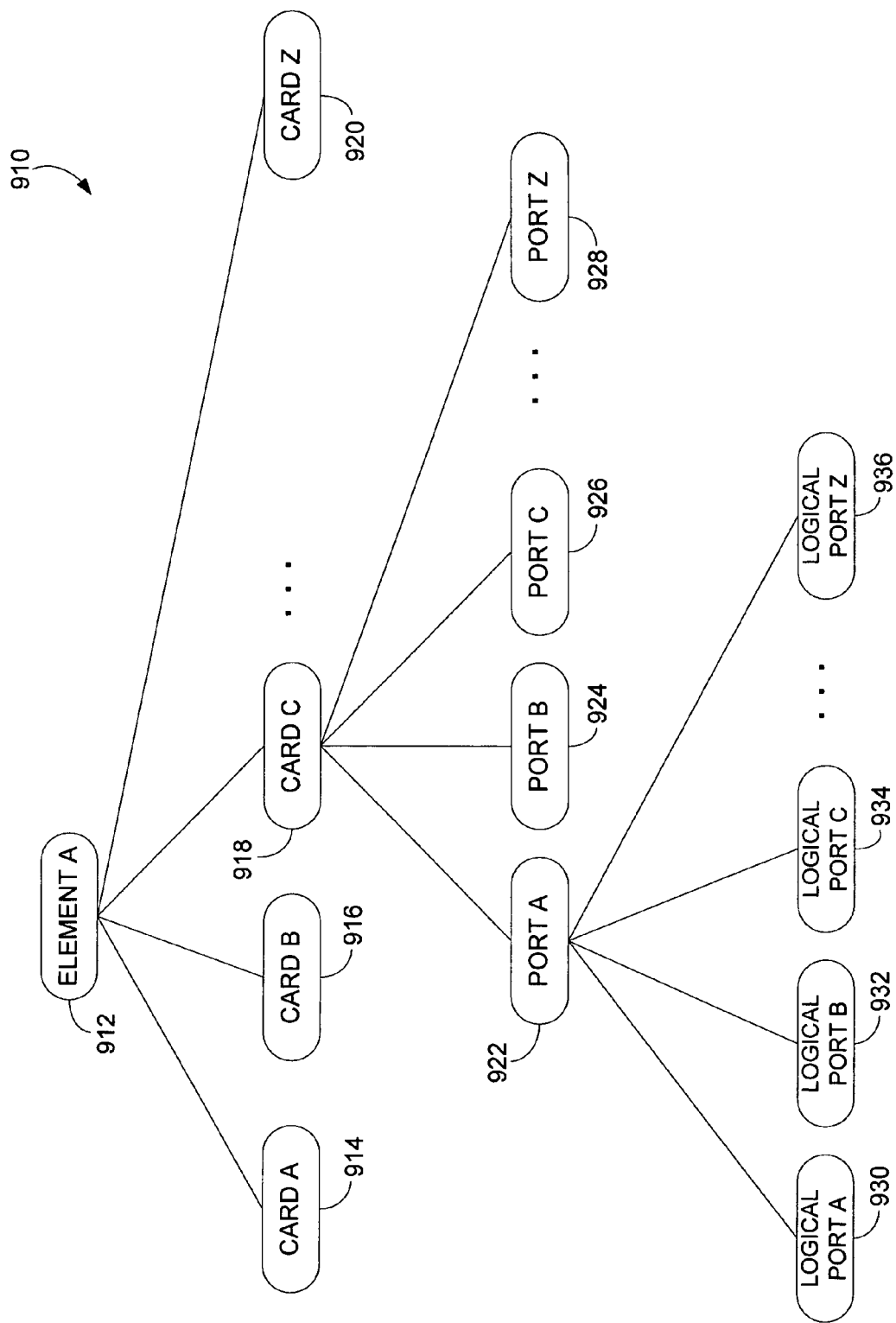
FIG. 9 depicts an illustrative topological tree diagram and depicts various exemplary network resources on various topological levels.

Turning now to FIG. 9, an abstract topological diagram is provided and referenced generally by the numeral 910. Illustrative diagram 910 represents an illustrative topological hierarchy that is commonly found in a network environment. As shown, a top-node element A 912 is associated with three child nodes, card A 914, card B 916, card C 918, and card Z 920. This diagram 910 depicts an element that has several cards, each of which has several ports, which may in turn be associated with several logical ports. For example, card C 918 is shown as having four illustrative children, port A 922, port B 924, port C 926, and port Z 928. Port A 922 is shown as having multiple child logical ports associated with it, indicated by reference numerals 930, 932, 934, and 936. Each of these components is considered a resource.

Patterning engine 525 provides such functionality as generating a synthetic alarm on element A 912 if cards A, B, and C enter into an alarm state. Similarly, if two or three logical ports enter into an alarm status, then patterning engine 525 can be configured to generate a synthetic alarm associated with port A 922.

Figure 10:
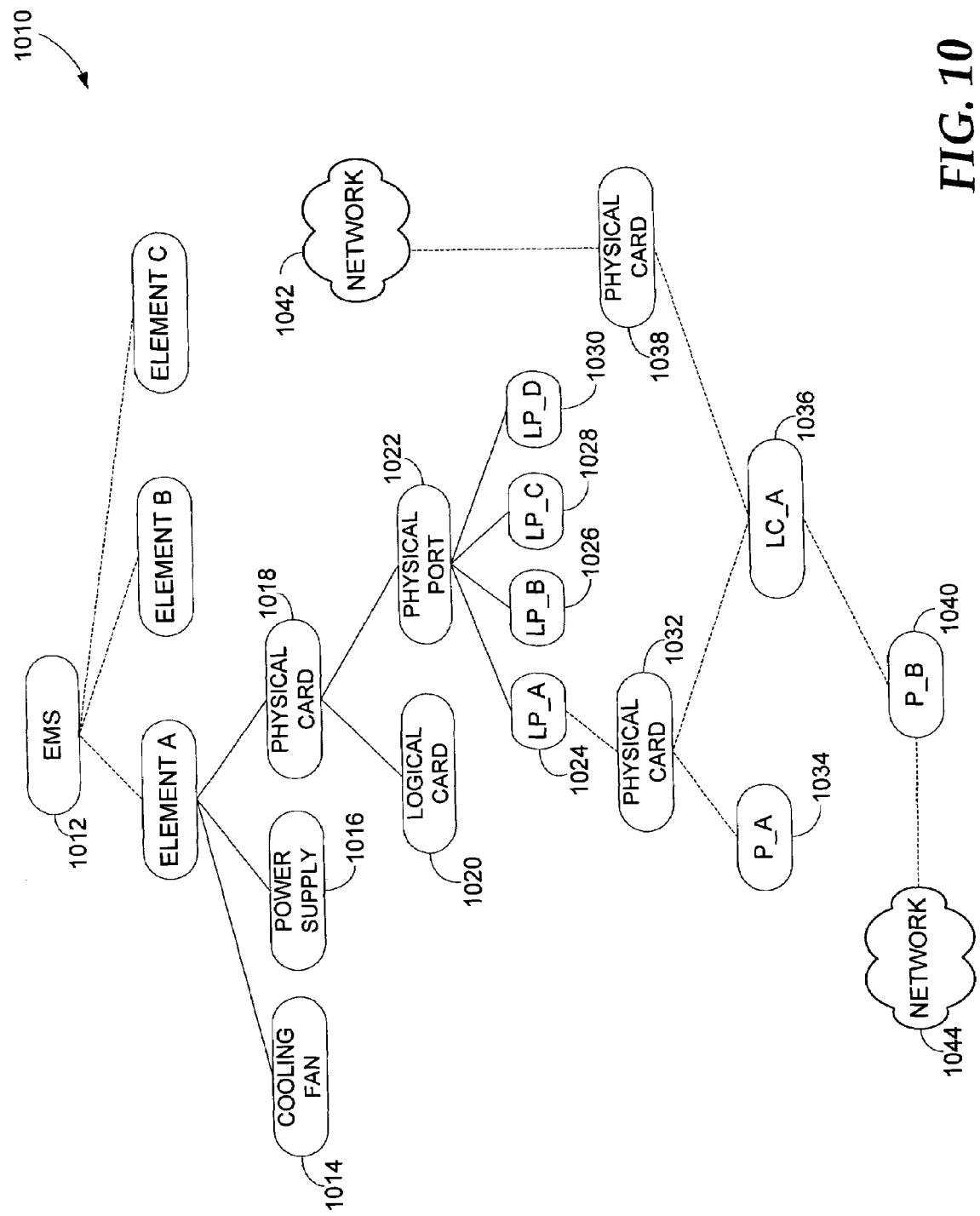
FIG. 10 a depicts more complicated exemplary topological communications-network structure.

Turning now to FIG. 10, a more complicated exemplary topological structure is shown and referenced generally by the numeral 1010. An element management system (EMS) 1012 is represented as the parent of three elements: element A, element B, and element C. An element may have several child components associated with it. Exemplary child components include a cooling fan 1014, a power supply 1016, and a physical card 1018. One skilled in the art would appreciate that an element may have additional child components and that the exemplary child components shown are illustrative in nature.

The diagram of FIG. 10 is vastly simplified so as not to obscure the present invention. Physical card 1018 is associated with two child nodes, logical card 1020 and a physical port 1022, which is associated with four child nodes, logical port A 1024, logical port B 1026, logical port C 1028, and logical port D 1030. Other relationships between network components may also exist, such as when a first network component provides necessary data to a second network component. In such a relationship, if the source data component fails, then the target component may enter into alarm status. Such a relationship is illustrated between logical port A 1024 and physical card 1032, and is represented as a dashed line. As shown, logical port A 1024 provides data to physical card 1032, which is the parent of a port 1034 and a logical card 1036. A logical card is a software representation of a physical card that offers similar functionality as a physical card. Logical card 1036 is depicted as the child of still another physical card 1038 and the parent of a port 1040, both of which may be connected to various other elements through networks 1042 or 1044.

Patterning engine 525 detects relationships between resources and generates alarms based on user-defined rules subject to user-defined or computer-generated criteria. For example, if cooling fan 1014 and power supply 1016 both enter into an alarm status, then the user-defined rules may dictate that a synthetic alarm be generated for element A in FIG. 10. Similarly, if logical ports 1024, 1026, and 1028, for example, enter into alarm status, then a synthetic alarm associated with physical port 1022 may be generated.

Patterning engine 525 can also function across multiple topological levels. For instance, if logical ports 1024, 1026, and 1028 enter into alarm status, then a synthetic alarm associated with physical port 1022 may be generated. If logical card 1020 was in an alarm status, and physical port 1022 is attributed a synthetic alarm, then patterning engine 525 can automatically generate a synthetic alarm associated with their parent, physical card 1018. If one or more siblings to physical card 1018 are in alarm status, then patterning engine 525 can continue up the tree to generate a synthetic alarm associated with element A.

Figure 11:
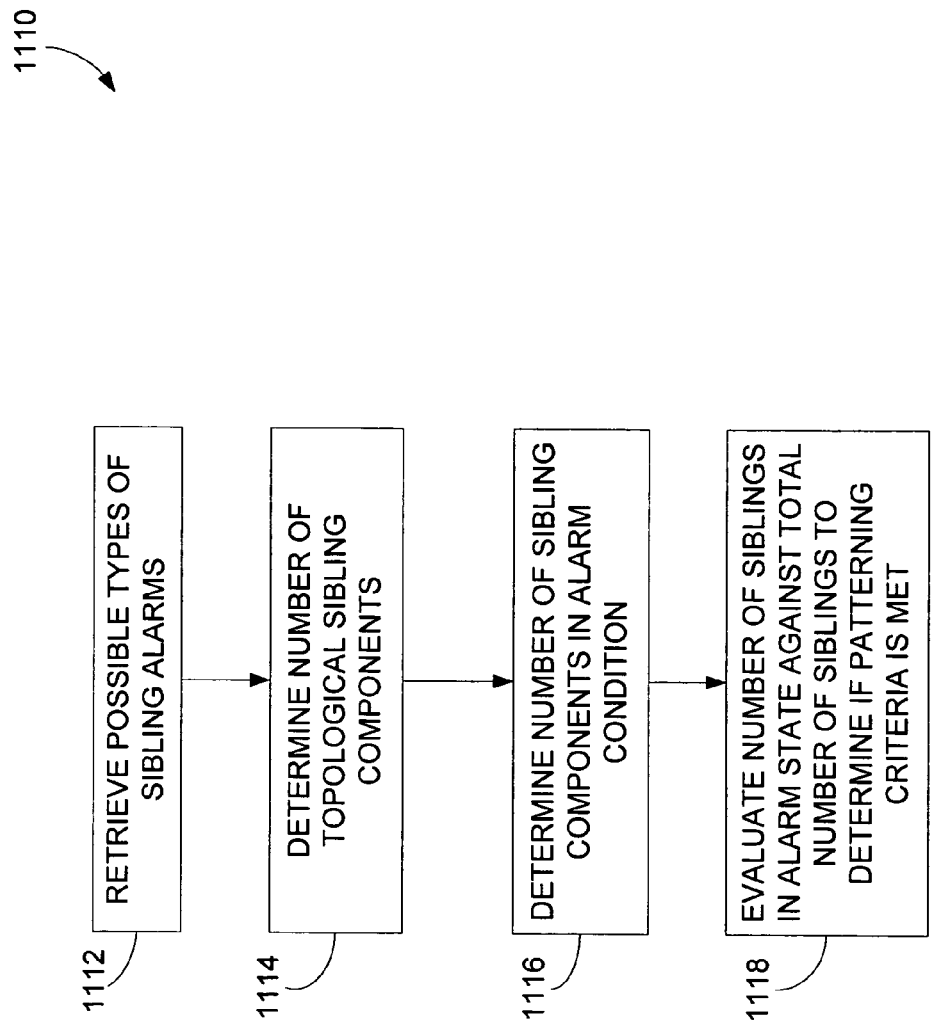
FIG. 11 depicts an illustrative process for detecting one or more patterns of alarms to generate one or more synthetic alarms in accordance with an embodiment of the present invention.

Turning now to FIG. 11, an illustrative process for detecting one or more patterns of alarms to generate one or more synthetic alarms is provided and referenced generally by the numeral 1110. At a step 1112, patterning engine 525 retrieves possible types of sibling alarms. When a network element enters into an alarm state, its siblings are evaluated to determine whether they too are in alarm condition. Thus, at a step 1114, patterning engine 525 determines the number of topological sibling components associated with the network element that entered into alarm status in step 1112. At a step 1116, patterning engine 525 determines the number of sibling components in alarm condition. At this point, patterning engine 525 has determined the total number of sibling components and the number of sibling components that are in an alarm condition.

At a step 1118, patterning engine 525 evaluates the number of siblings in an alarm state against the total number of siblings to determine if patterning criteria is met. For example, if five out of twenty five ports are in an alarm condition, and a user-defined rule stipulates that an alarm is to be generated if at least 20% of a parent's children are in alarm status, then an alarm will be generated and associated with the respective parent network element. A more detailed explanation of employing the patterning technology of the present invention will be described with reference to FIG. 12.

Figure 12:
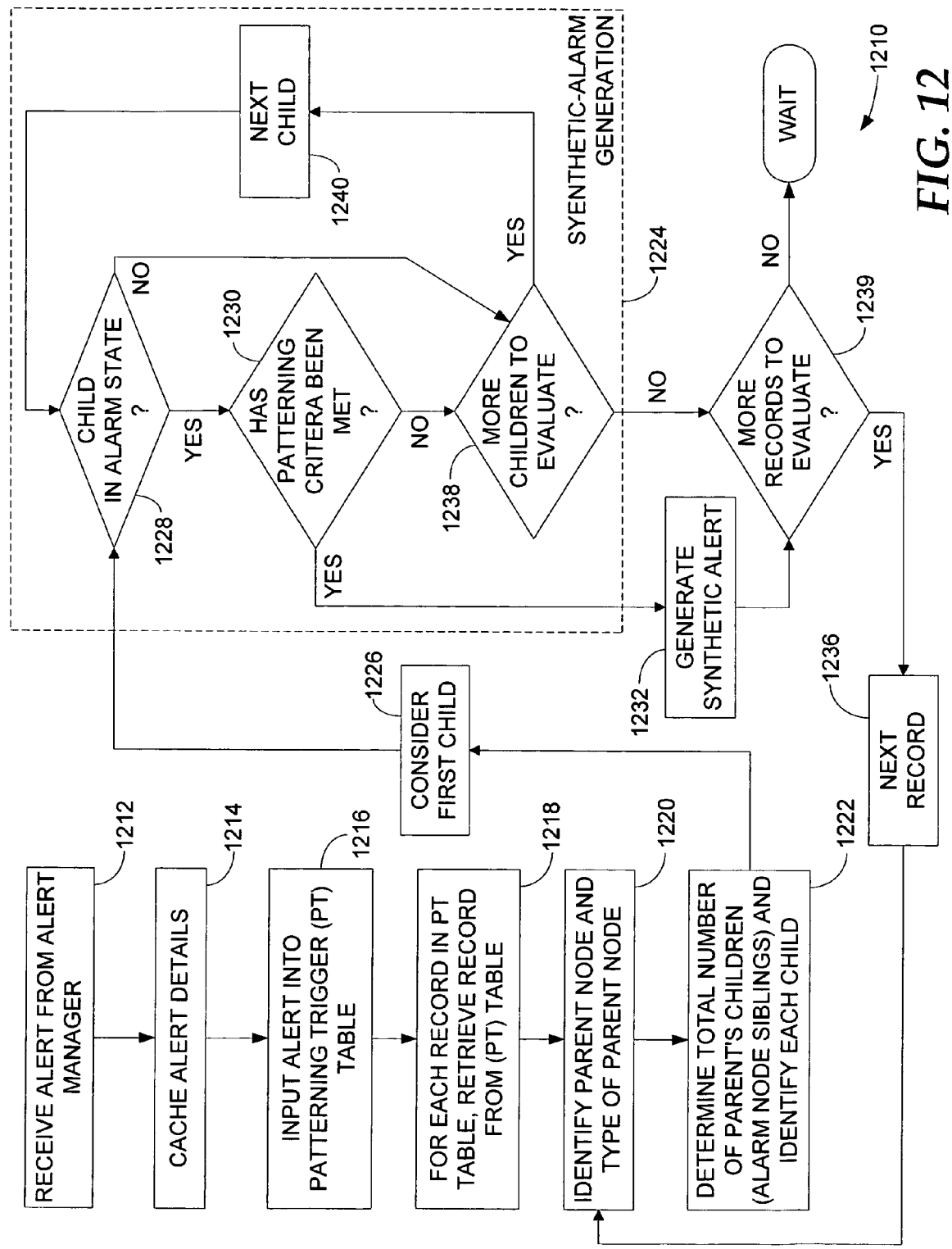
FIG. 12 depicts a more detailed flow diagram that illustrates an exemplary process for employing the described patterning technology in accordance with an embodiment of the present invention.
Figure 13:
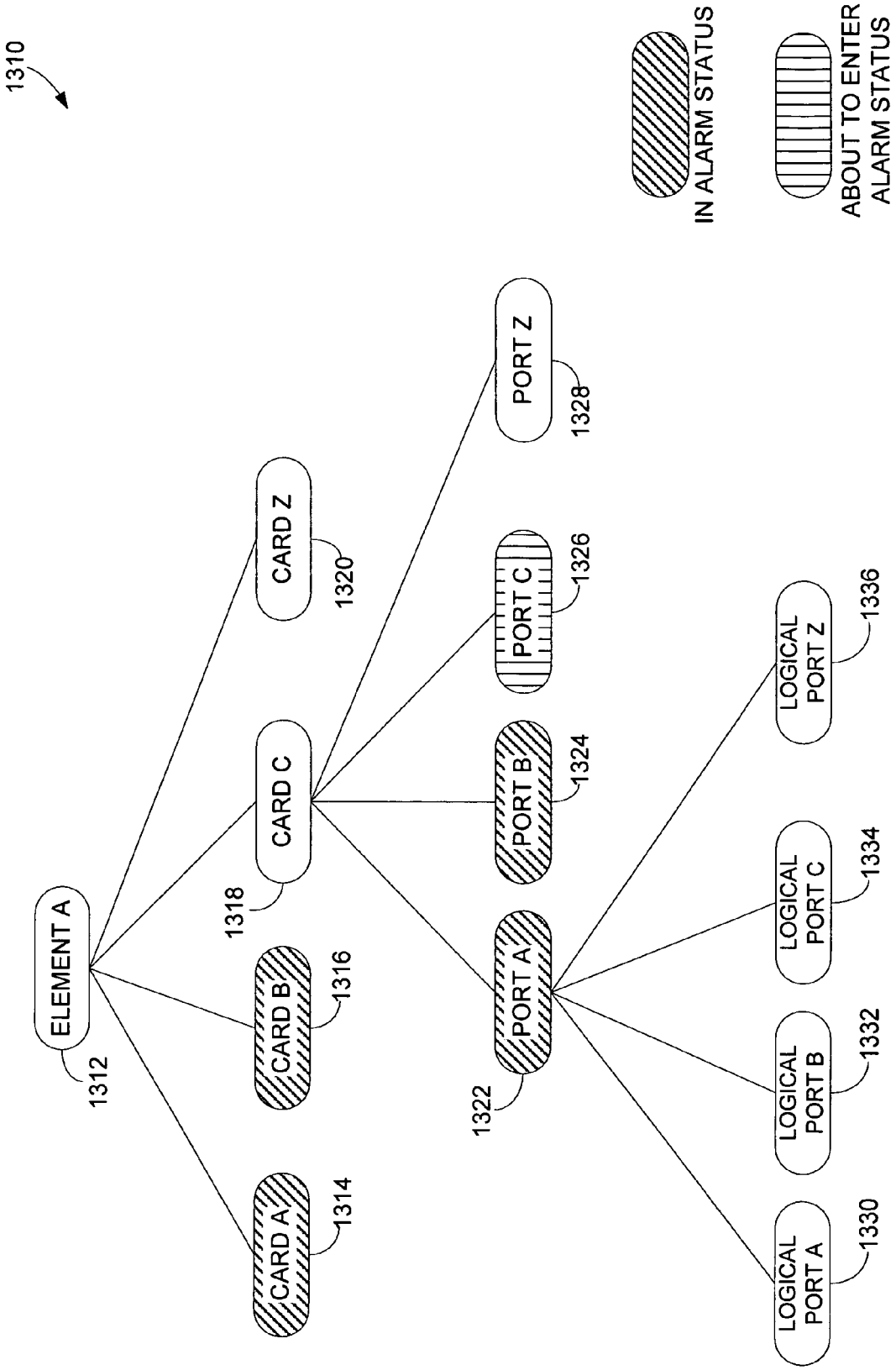
FIG. 13 depicts a topological tree similar to that of FIG. 9 and is used to help explain patterning in accordance with an embodiment of the present invention.

Turning now to FIG. 12, a more detailed flow diagram is provided that depicts an illustrative process for employing the patterning technology of the present invention and is referenced generally by the numeral 1210. To further help explain the patterning process, the steps of FIG. 12 will be explained in connection with the topological tree depicted in FIG. 13. FIG. 13 depicts a topological tree similar to that of FIG. 9 and wherein like reference numerals correspond to like nodes. But in FIG. 13, certain network elements are shaded (hashed) to indicate that they are in alarm status. For example, card A 1314, card B 1316, port A 1322, and port B 1324 are already in alarm status. Port C 1326 is about to enter into alarm status.

For the illustrative method of FIG. 12, assume that a general user-defined rule exists that if at least 75% of a parent's child elements enter into alarm status, then a synthetic alarm shall be generated on the parent. Returning now to FIG. 12, patterning engine 525 receives an alert from alert manager 510 at a step 1212. For this example, the alert will be the alert associated with Port C 1326. At a step 1214, the details associated with the alert received are cached at a step 1214. At a step 1216, the alert is inputted into a table, referred herein for referential purposes as a patterning-trigger table. The patterning-trigger table may be stored in database 254 and composed of a set of fields that are populated based on the alert of interest. Exemplary threshold patterning-trigger-table fields include a threshold number, a processing type, an alarm type, an alert key, etc.

At a step 1218, the beginning of a loop is represented whereby each record in the patterning-trigger table is retrieved. In a preferred embodiment, each record of the threshold patterning-trigger table corresponds to an alert. Each alert is evaluated to determine whether sibling alerts exists and whether a synthetic alert should be generated and associated with the alert's parent component. In this illustrative example, records in the patterning table would exist for Card A 1314, Card B 1316, port A 1322, port B 1324, and a newly entered alert corresponding to port C 1326. The parent node would be identified as well as the type of parent node at a step 1220. Here, the parent of port C 1326 would be identified as card C 1318. Component 1318 would be identified as a card at step 1220.

At a step 1222, patterning engine 525 identifies and counts the total number of the parent's children. The network component that entered into alarm status in this example is port C 1326. Its parent was identified as card C 1318 at step 1220. Now, patterning engine 525 determines that card C has four child components, which are identified as port A 1322, port B 1324, port C 1326, and port Z 1328. Patterning engine 525 can determine the total number of a parent's child components and identify each of the child components by referencing a topological database, which is a database that stores topology information of a communications network. Topology information may be stored in database 254 or stored in a separate database that is coupled to database 254.

The method continues to a process 1224, whereby a determination is made as to whether to generate a synthetic alarm based on receiving a particular alert from alert manager 510. In our example, the issue would be whether patterning engine 525 should instantiate a synthetic alarm incident to receiving the alert associated with port C 1326. At a step 1226, patterning engine 525 considers the first child identified in step 1222. At a step 1228, patterning engine 525 determines if the first child is in an alarm state. If so, patterning engine 525 determines whether the user-defined patterning criteria has been met at a step 1230.

Although a technologically useful aspect of the present invention is to allow a user to define patterning criteria, the present invention is not limited to receiving only user-defined patterning criteria. Rather, the present invention itself can automatically generate rules or patterning criteria that should serve as benchmarks to be tested against. If the patterning criteria has been met, then patterning engine 525 will generate a synthetic alarm associated with the child's parent at a step 1232. In the instant example, child node 1326 will be evaluated to determine if it is in an alarm state at step 1228. This determination will preferably happen first (before evaluating port A 1322 or port B 1324) because port C 1326 most recently entered into an alarm condition.

The patterning criteria associated with the parent of port C 1326 will be evaluated at step 1230. To evaluate a resource is to at least determine a state (normal, warning, error, alarm, etc.) of the resource. As previously mentioned, for this illustrative example, the patterning criteria is whether at least 75% of child components enter into an alarm condition. Here, that criteria is met by port C 1326 entering into an alarm condition. Three out of the four child components are in alarm condition. That is ports A, B, and C are all in alarm condition and are all children of card C 1318. Thus, patterning engine 525 will generate a synthetic alarm on card C 1318 at step 1232. This synthetic alarm will be introduced into alert manager 510, which will redirect it into patterning engine 525, which will eventually cause an alarm to be generated on element A 1312 because the synthetic alarm associated with card C 1318 places three out of four child components into an alarm condition.

Returning now to the simplified example and to step 1232, processing advances to a determination step 1239 where a determination is made as to whether there are additional records to evaluate in the patterning-trigger table. Patterning-trigger table can be any table or other data structure used to store data. As just described, a new record will be entered incident to the generation of the synthetic alarm of step 1232. This next record will be selected at a step 1236, and processing will revert to step 1220 to continue through the outer-loop process.

Returning to step 1228, if the respective child is not in an alarm state, then processing advances to a step 1238, whereby a determination is made as to whether there are more children components to evaluate. These children are the child components of the parent identified in step 1220. Step 1238 is also reached if the patterning criteria of step 1230 is not met. If there are no more children components to evaluate, then processing advances to step 1239, which was previously described. But if there are more children to evaluate, then the next child is selected at a step 1240 and processing reverts to step 1228 to determine if the next child is in alarm condition and then evaluate whether the respective patterning criteria is met.

The illustrative process of FIG. 12 as well as the specific example provided illustrate merely one embodiment of the present invention and should not be construed as a limitation of the present invention. The steps shown do not necessarily need to be performed in the precise order illustrated, and some steps that would be apparent to one skilled in the art are not shown for the sake of clarity. Patterning engine 525 greatly simplifies and reduces the time associated with determining the root cause of an alarm. The more complicated the network, the more valuable is the patterning technology described herein. For example, consider the illustrative topological diagram of FIG. 14.

Figure 14:
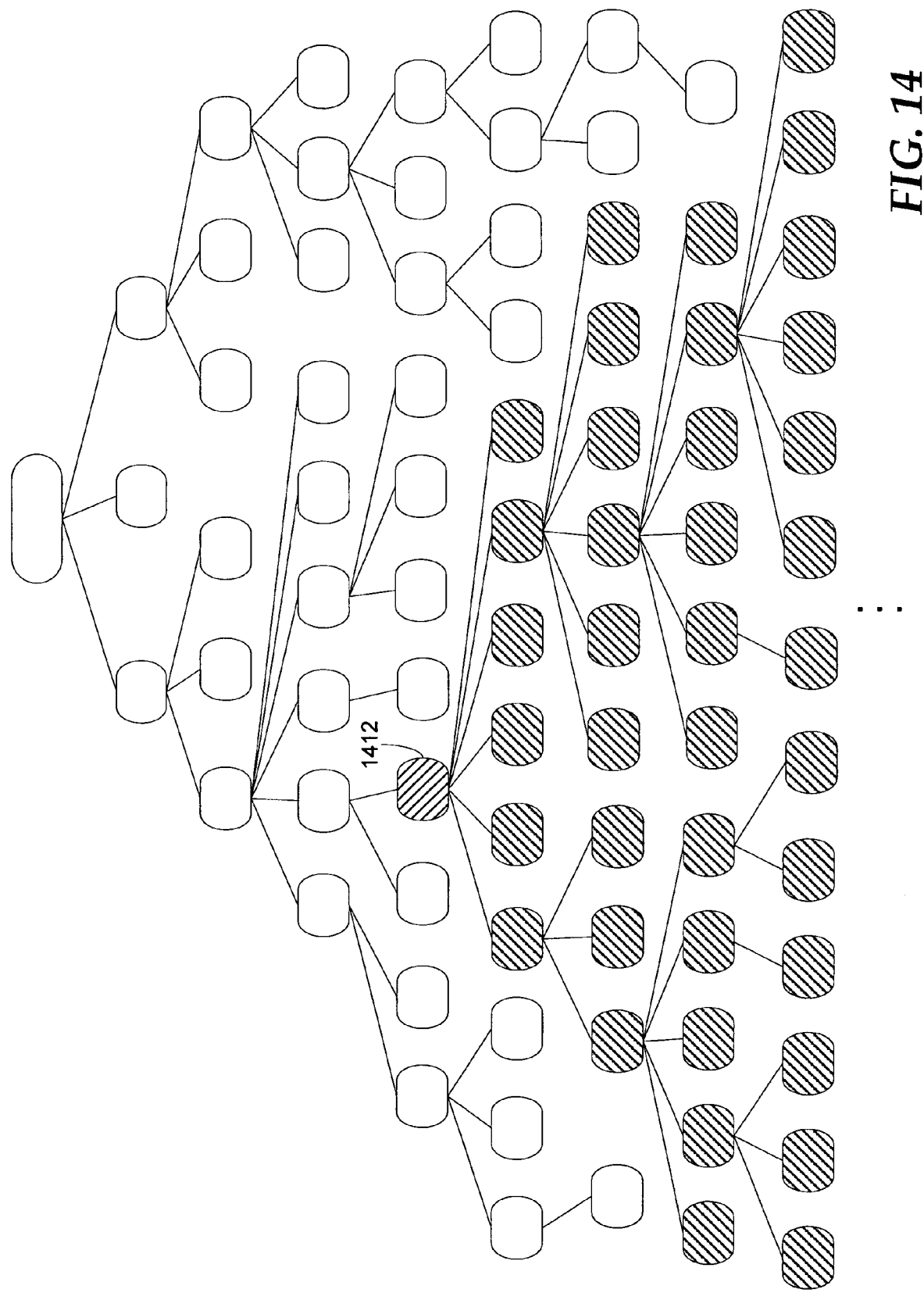
FIG. 14 depicts an abstract and somewhat more complicated topological diagram to better illustrate a portion of the practical applications of the patterning technology described herein.

FIG. 14 shows a somewhat more complicated topological diagram but still pales in comparison to the actual complexity of a real communications network. The hashed nodes represent nodes that are in an alarm condition. But notice that each of the nodes in alarm condition ultimately stem from node 1412, which is in alarm condition. Absent the present invention, a user may receive indications of alerts of all of the hashed nodes, but no intelligence indicating that the individual problems associated with each node may share a common problem component. Thus, absent the present invention, a user would perhaps begin troubleshooting the last row of nodes. But such efforts would represent an exercise in futility because there may not be any real problems associated with the most bottom row of network components. Patterning engine 525 however would utilize the processes of FIGS. 11 and 12 to work its way up each level of the tree to ultimately provide a synthetic alert associated with node 1412. Other aspects of the invention would then sift through the various child alerts and designate that the alert associated with node 1412 is the root cause of all the problems associated with the various child alerts.

Associative Events Manager

A preferred embodiment of the functionality offered by the associative event manager (AEM) component 526 will now be described in greater detail. AEM 526 receives incoming network trouble alerts (messages, warnings, alarms, data—collectively "status indications") routed to it by alert manager 510 and processes those alerts to create what we refer to as "network events," such as event 306 (see FIG. 3A). Network events are then displayed on one or more display devices for users to review, research, and take further action. AEM 526 alert processing and event creation involves processing an event, horizontal root-cause analysis (RCA), vertical RCA, and suppression of subordinate events. In a preferred embodiment, each displayed event is associated with a single resource (although a resource may be associated with multiple events that are not displayed, but could be displayed if a user drilled down on the corresponding displayed event).

When processing an event, AEM 526 determines whether the event is a new event or if it is associated with an already existing event. New events are processed for root-cause analysis (horizontal and vertical correlation and suppression). Updates to an already existing event are evaluated, and the event's state is recomputed.

As used herein, "horizontal root-cause analysis" refers to a process of evaluating each network alert coupled with its resource (which can be a physical or logical network component) and determining the impact that the alert has on the network as compared to other alerts received from associated resources across network elements. That is, horizontal RCA relates to determining alert priorities associated with resources on a common topological level, such as communications cards within a processing component. Horizontal RCA determines the relationships between alarming components and determines which alarm should be addressed first. This alarm becomes a top-level alarm and is associated with a network event. Although there is a one-to-one correspondence between resources and a displayed network event, a single event may, and often does, have multiple alarms associated with it.

To illustrate horizontal root-cause analysis, consider the situation when a card in an element fails. Typically, all circuit connections will be dropped. Horizontal RCA addresses the various alerts from across the network that indicate a loss of signal from the failed card. The failed card becomes the top-level event with which a user (such as an operations-center specialist) can address in greater detail as the case may be.

As used herein, "vertical root-cause analysis" refers to the evaluation of alerts associated with components that are on disparate topological levels to determine which alarm is the most critical. This evaluation is completed in connection with applying suppression algorithms that evaluate network alerts to determine if they are candidates for presentation (visually, via audio, etc.) to a user or if they should be suppressed under a top-level event, in which case they would not be presented.

The suppression feature helps ensure that the most critical alert among a set of related alerts will be displayed. The related alerts may be related in a parent/child relationship ("contains," or "is contained by") or a supporting relationship (e.g., a power supply supports a network element). Suppressed alerts can still be viewed by users during research activity and resolution activity if they wish to drill down via a user interface. Ports are on a topological level lower than a card.

To briefly illustrate a vertical RCA example, consider a card in a network element that fails. The port alarms that are received from the same element would be suppressed and the card-level alarm would be displayed as a top-level event, automatically without user intervention. Such a scheme greatly reduces the time associated with troubleshooting a communications network by presenting to a user the root cause of many other alerts. Resolving the root cause of multiple alarms may result in the resolution of corresponding child alerts.

In a preferred embodiment, alarms are processed through horizontal and vertical RCA, whereby the alarm's importance is determined based upon its placement in the topology (the physical and logical network) and its relationship to other alarms in the network. A suppression process determines what events will be top-level events for display to a user. Updates to existing events initiate a recalculation of alerts associated with an event to determine whether the currently displayed event should be replaced with an event associated with the new alert received.

AEM 526 helps maintain functionality in the processing layer. When an event reaches a "clear" state, it is preferably removed from the processing-layer database 254 and stored in a historical-data database, such as alarm history database 327. Events that are not cleared, but have no new activity, can also be removed after a predetermined time to keep the display current in a preferred embodiment.

Figure 15A:
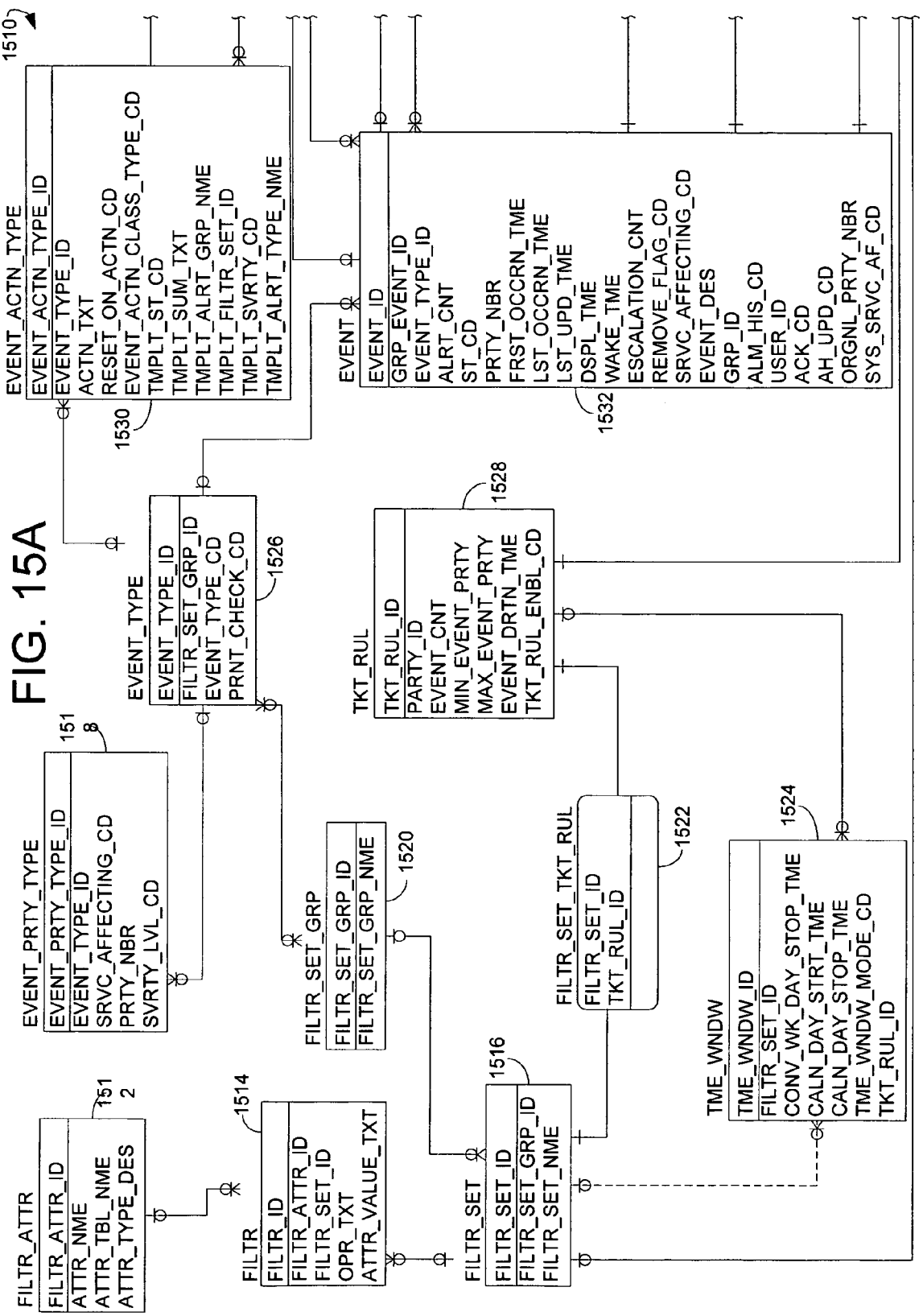
FIGS. 15A & 15B are flow diagrams that provide a more detailed depiction of an illustrative portion of a database schema suitable for use in an embodiment of the present invention.
Figure 15B:
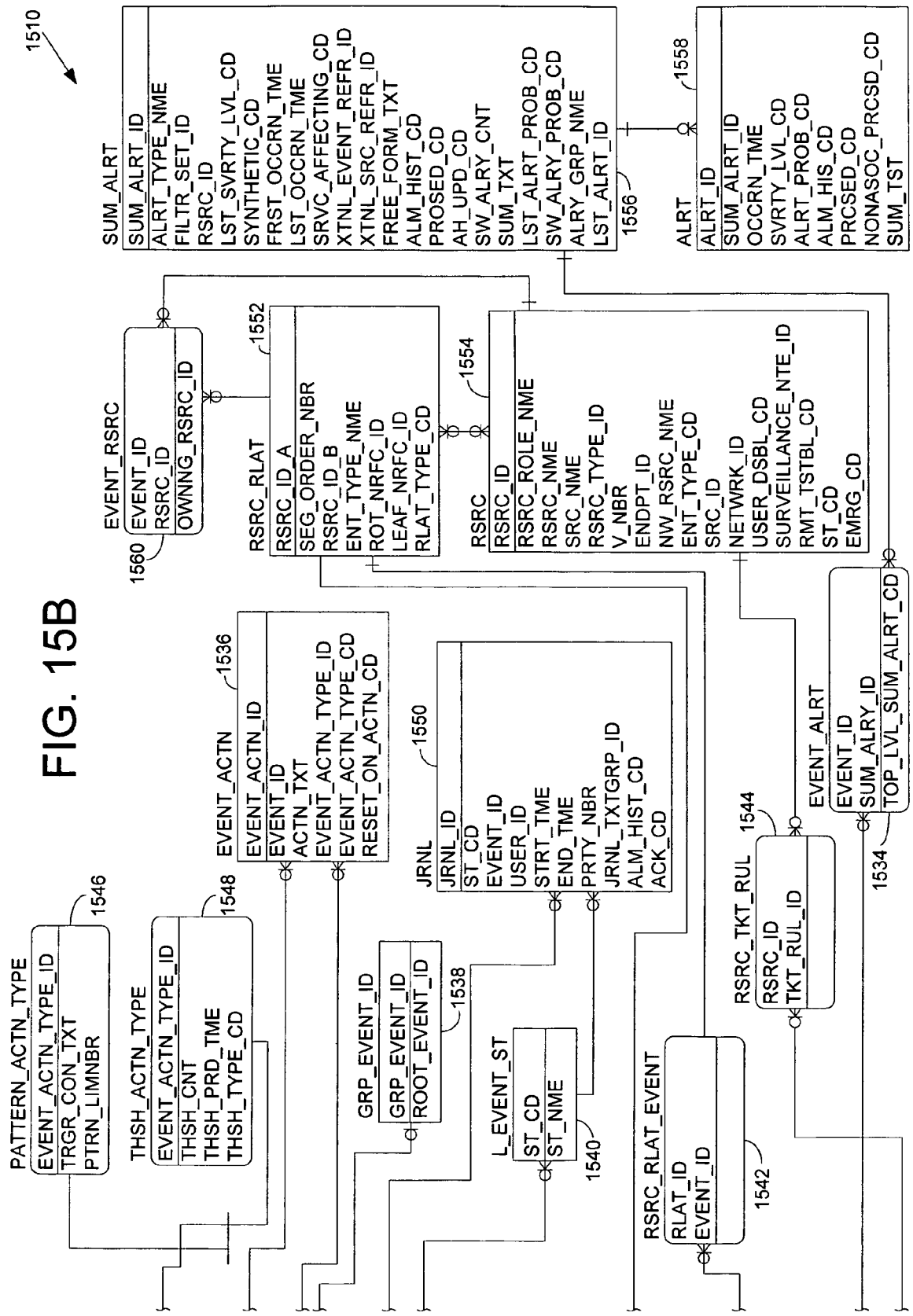

Various functional aspects offered by AEM 526 will be better understood with reference made to a more detailed description of an exemplary database schema used in database 254. Accordingly, FIGS. 15A and 15B provide a more detailed depiction of an illustrative portion of a database schema 1510 suitable for use in an embodiment of the present invention. A person skilled in the art of creating relational databases would understand how to read the various symbols and the formats used in FIGS. 15A and 15B, such as the relationship indications between the various tables.

Illustrative schema 15A includes a filter_attribute table 1512, a filter table 1514, a filter_set table 1516, an event_priority_type table 1518, a filter_set_group table 1520, a filter_set_ticket_rules table 1522, a time_window table 1524, an event_type table 1526, a ticket_rules table 1528, an event_action_type table 1530, an event table 1532, (moving on to FIG. 15B) event_alert table 1534, an event_action table 1536, a group_event_ID table 1538, an L_event_ST table 1540, a resource_relationship_event table 1542, a resource_ticket_rules table 1544, a patterning_action_type table 1546, a threshold_action_type table 1548, a journal table 1550, a resource_relationships table 1552, a resource table 1554, summary_alert table 1556, alert table 1558, and event_resource table 1560. Other tables not shown in database schema 1510 may also be included, and not all tables used in the present invention are shown so as to not obscure the present invention. Although preferred relationships are depicted, the tables are not depicted in any particular order, and any order shown should not be construed as a limitation of the present invention.

Figure 16A:
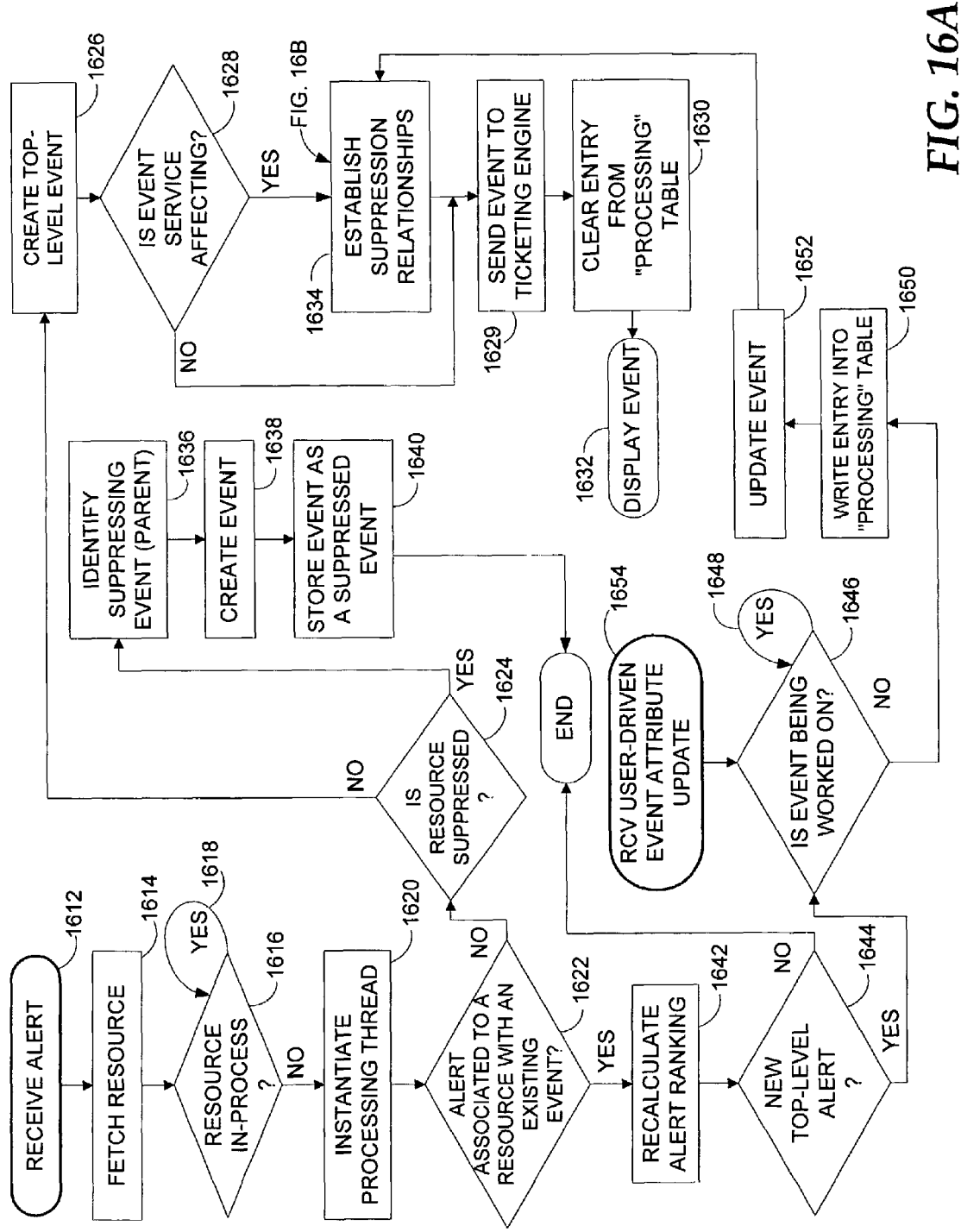
FIGS. 16A & 16B are flow diagrams depicting an exemplary process carried out by associative event manager 526 in accordance with an embodiment of the present invention.

Turning now to FIG. 16A, an exemplary process carried out by associative event manager 526 is depicted in flowchart form. One of the main aspects of AEM 526 is to sift through the various alerts it receives and determine which alerts should be displayed to a user. By virtue of an alert being displayed, a user will know which alerts should be addressed in which order. In contrast, prior-art devices would merely display all alerts without regard to which alerts are responsible for other alerts.

At a step 1612, AEM 526 receives an alert from alert manager 510. Recall that an alert, such as alert 340 (see FIG. 3) represents some form of status indication corresponding to a network element, such as element 325. Thus, the alert received at step 1612 is associated with some resource in the network. A resource may be a physical or logical component or subcomponent in the network. Exemplary resources include switches, cards within switches, ports within cards, logical ports associated with physical ports, etc. A card is a resource, and a port on a card is a resource. Those skilled in the art will appreciate that a network may be composed of several hundreds or even thousands of different resources and resource types. The different resources and resource types are preferably stored in resource table 1554. At a step 1614, AEM 526 fetches the resource associated with the alert received in step 1612. Summary_alert table 1556 includes a resource_ID parameter that allows a resource to be associated with an alert.

At a step 1616, a determination is made as to whether the resource is currently being processed, or worked on by AEM 526. This determination at step 1616 allows for a multi-threaded environment, whereby the steps that follow can each be associated with a single thread, which can be processed in parallel. Thus, in a preferred embodiment, each resource will be allocated at most one thread for processing. By mandating a one-to-one correspondence between resources and processing threads, the present invention can process multiple threads simultaneous, and operate substantially faster than if the alerts were merely queued as they are received from alert manager 510.

An exemplary method for determining whether a resource is the object of a current thread is to maintain a "processing" table of resources that are currently being worked on. This "processing" table can be queried for the resource in question, the resource fetched in step 1614, to determine whether that resource is present. If the resource fetched in step 1614 is not found in the processing table, then AEM 526 knows that the resource is not currently being worked on. If the resource is found in the processing table, then the resource is being worked on by AEM 526. In that case, AEM 526 preferably waits until the thread associated with the resource fetched in step 1614 is complete, which is indicated by loop 1618. If, however, the resource at issue is not currently being worked on by AEM 526, then a new processing thread is instantiated at a step 1620. In a preferred embodiment, instantiating a new processing thread includes writing the resource fetched in step 1614 into the "processing" table.

At a step 1622 a determination is made as to whether the alert received is associated to a resource with an existing event. AEM 526 identified the alert in step 1612, and its corresponding resource in step 1614. This test 1622 determines whether a resource has an existing event. One reason for making this determination 1622 is to determine whether a new event should be created or whether a current event should be updated. If a resource has no events associated with it, then a new event will be created and associated with the instant alert. A preferred method for determining whether the instant alert is associated to a resource with an existing event is to initiate a query on event_resource table 1560 using the resource ID identified in step 1614. If any values are returned, then at least one event is currently associated with the instant resource. But if no records are returned, then there are no events associated with the instant resource. Although multiple events can be associated with a single resource, in a preferred embodiment, only one display event is associated with each resource. An event is indicated as a display event based on the root_event_ID parameter of group_event table 1538 in a preferred embodiment.

If it is determined at step 1622 that the resource identified in step 1614 is not associated with any existing events, then a determination is made at a step 1624 as to whether the instant resource is suppressed. A suppressed resource is a resource that is a child to a suppressing resource. Thus, ports can be suppressed by a card because ports are on a lower topological level than a card. Similarly, cards can be suppressed by an element because cards are on a lower topological level than an element. In a preferred embodiment, suppression data is maintained in resource_relationships table 1552. Exemplary relationships include the following: "A contains B," "A supports B," "A suppresses B."

In a preferred embodiment, each of the different types of relationships are associated with a relationship-type number. In an "A contains B" relationship, the "B" node is a child to the "A" node. In an "A supports B" relationship, the "A" node provides data to and supports node "B." In a final exemplary relationship, "A suppresses B," the "A" node is the most top-level node associated with a furthest child level "B" node that is associated with an alert. As previously mentioned, resource_relationships table 1552 can associate a relationship type to a first and second node, and thereby describe the topology of a communications network. To determine whether the instant resource is suppressed by another resource at step 1624, resource_relationships table 1552 can be referenced and queried for a "suppresses" relationship type and whether the resource is a "B" resource. By referencing the resource_relationships table 1552, AEM 526 can determine whether the resource fetched in step 1614 is suppressed by other resources. If the instant resource, the resource associated with the alert received in step 1612, is not suppressed by one or more other resources, then an event is created and associated with the resource at a step 1626. Because there were not any other events associated with the instant resource, the event created at step 1626 is a top-level event. The event created in step 1626 is associated to the resource and the new alert received in step 1612. There can only be one top-level event per resource. At step 1626, a relationship is also created between the newly created event and the alert. In a preferred embodiment, this is accomplished by entries within event table 1532 and entries in summary_alert table 1556.

In a preferred embodiment, the event is checked at a step 1628 to determine whether it is service-affecting. A service-affecting event indicates that the problem gives rise to the alert associated with the resource is impacting service to customers. This determination 1628 can be made by querying event table 1532 for the service_affecting parameter, which can be populated based on the attributes 304 associated with the instant alert.

If the event is not service affecting, then the event is sent to a ticketing engine 2110 (which will be discussed in greater detail below) to determine whether a ticketing report for this event should be automatically generated. Without having to wait until the ticketing process completes, processing for this thread ends by first clearing its entry from the "processing" table at a step 1630 and then displaying the event at a step 1632 in a preferred embodiment. The event is displayed because it is a top-level event, which is an event not suppressed by any other resources. If, however, the event is service-affecting, then suppression relationships are preferably established at a step 1634 so that if other alerts come in associated with resources subordinate to the instant resource then those will not be displayed.

Figures 16B, 17:
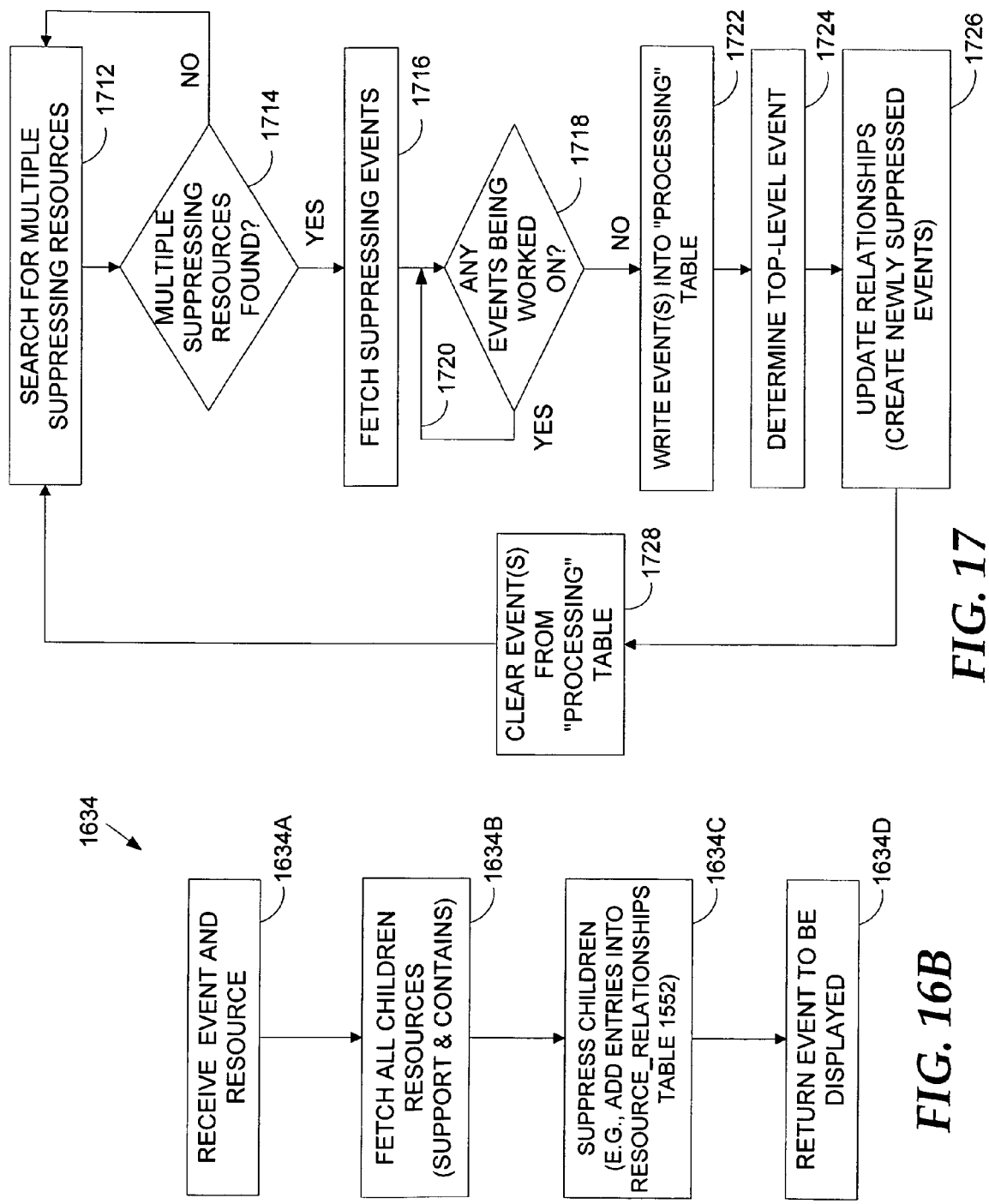
FIG. 17 is a flow diagram depicting an illustrative method according to an embodiment of the present invention for determining which events on a common topological level should be displayed.

Turning briefly away from FIG. 16A to FIG. 16B, a process for establishing the suppression relationships is provided. The resources of a communications network can be arranged in a topological hierarchy. At a step 1634A, the event ID and resource ID are received. In a preferred embodiment, the process of FIG. 16B is carried out by a separate module, such as a suppression module. Delegating suppression functionality to a separate module should not be construed as a limitation of the present invention, but as merely one way of carrying out the steps of FIG. 16B. With the event ID and resource ID, the suppression module fetches all children resources at a step 1634B.

An exemplary method for fetching all children resources is to reference the resource_relationships table 1552 and query for all "supports" and "contains" relationship types. This will return a set of "B" nodes that correspond to children (including grandchildren, etc.) of the instant resource. These children are suppressed by adding entries into resource_relationships table 1552 at a step 1634C. In a preferred embodiment, a first event suppresses other events only if that first event is service-affecting. At a step 1634D, the suppression module returns the event to be displayed. Thus, returning to FIG. 16A, the event returned by the suppression module is displayed at step 1632.

Returning to determination step 1624, if the instant resource is suppressed then AEM 526 identifies the suppressing event at a step 1636. An exemplary method for identifying the suppressing event (the resource's parent) is to query resource_relationships table 552 in search of the instant resource appearing in the "B" column and having a relationship type of "A suppresses B." One skilled in the art will appreciate that our use of "A" and "B" identifiers merely denote parameters within a table and are not limitations of the present invention. An event is created at a step 1638 and associated with the instant alert. The newly created event can be stored as a suppressed event at a step 1640 by inserting a row into resource_relationships table 1552 of relationship type "A suppresses B," where "A" equals the parent identified in step 1636 and "B" equals the resource ID itself. In a preferred embodiment, the suppressing event is the top-most suppressing event in step 1640.

Returning to determination step 1622, if AEM 526 determines that the alert received at step 1612 is already associated to a resource with an existing event, then the alerts associated with that event, including the newly received instant alert, are reranked at a step 1642. As previously mentioned, an event on a resource may be associated with several alerts. For example, consider a card in a network component. The card may have a first alert, such as a memory-fault alert associated with it as well as a communications-error alert associated with it. Thus two alerts are associated with the same resource. These two alerts may give rise to only a single event indicating that a problem exists with the card. Such a scheme is not mandatory but is provided here for explanatory purposes to illustrate an embodiment of the present invention in greater detail.

One of the aspects of the present invention is to display the most important alert from a set of alerts. Other alerts with lower priority or severity will be chronicled and logged; however, with respect to displaying alerts, it is desirous to display the most important alert. In recalculating the alert rankings in step 1642, AEM 526 determines whether the new alert received at step 1612 is more important than the current top-level alert. AEM 526 evaluates the alerts based on whether they are service-affecting, which has the highest priority number, and which alarms are in an "open" state. A "closed" alert no longer presents a problem in the network. All alerts associated with a given event can be retrieved by querying the event_alert table 1534 and/or alert table 1558.

A determination is made at a step 1644 as to whether a new top-level alert was calculated. For example, "is the alert received at step 1612 the most important alert among those associated with the event identified at step 1622?" If the top-level alert did not change, then no further action is taken in a preferred embodiment, and the instantiation of this thread ends. But if a new top-level alert is created, then a determination is made at a step 1646 as to whether the event is currently being worked on. This step is similar to the determination made at step 1618 and helps facilitate a multi-threaded processing environment. If the event is being worked on, then the process waits until the event is no longer being worked on, which is represented by numeral 1648. But if the event is not being worked on, then an entry is made into the same or a different "processing" table to indicate that the instant event is now being worked on at a step 1646.

The instant event is updated at a step 1652. In updating the event at step 1652, the alert received at 1612 is identified as the top-level event if it has not already been so identified. Processing then continues to step 1634, where the suppression relationships associated with the updated event are established. This process was previously described with reference to FIG. 16B. At a step 1630, the processing-table entry made in step 1650 is cleared, and the top-level event is displayed at step 1632.

Also depicted on FIG. 16A by reference numeral 1654 is that AEM 526 can also receive user-driven event-attribute updates. That is, users may update event attributes so that alerts are handled differently according to the updated attributes. For instance, a user may wish to modify the priority level associated with a certain alert, or a user may wish to redefine a priority level associated with various events. These changes will affect the previously described steps. Thus, when a user provides event-attribute updates, a determination is made at step 1646 as to whether the to-be-affected events are being worked on. If they are, the process waits until the event or events are no longer being worked on, and then writes entries into the "processing" table at a step 1650 to indicate that the events are currently being worked on. The respective events are updated at step 1652, and the suppression relationships are reestablished at step 1634. The event-attribute updates provided may change which event gets displayed. The data entry or entries of step 1646 are cleared at step 1630 and the correct top-level event is displayed at step 1632.

The information in database 254 is in a constant state of flux. That is, the data within the tables of database schema 1510 are constantly changing. The present invention includes various database watchers to monitor the status of database 254 and the data within the tables of schema 1510 to look for the happening of certain occurrences. In a preferred embodiment, AEM 526 includes an event-relationship engine that monitors data status for the occurrence of multiple suppressing events to help facilitate horizontal root cause analysis. Thus, as the steps of FIG. 16A are carried out, AEM 526 iteratively performs the steps illustrated in FIG. 17. In a preferred embodiment, the steps illustrated in FIG. 17 are carried out any time a change is made to resource_relationships table 1552.

Turning now to FIG. 17, an illustrative method according to an embodiment of the present invention for determining which events on a common topological level should be displayed is provided. At a step 1712, a search is conducted for multiple suppressing resources. In a preferred embodiment, AEM 526, or one of its subcomponents, monitors resource_relationships table 1552 for the occurrence of multiple suppressing resources. Recall that a suppressing resource is a resource that suppresses alarms underneath it. An exemplary method for searching for multiple suppressing resources is to query resource_relationships table 1552 for resources having a relationship type of "A suppresses B" and receiving back records with multiple occurrences of the "B" parameter.

At a step 1714 a determination is made as to whether multiple suppressing resources were found. If not, the process starts over, or continues to monitor resource_relationships table 1552. But if a certain resource was found that was being suppressed by multiple resources, then each of the suppressing events are identified at a step 1716. This is accomplished by fetching the suppressing events and referencing event table 1532 to determine their respective event_IDs. To facilitate a multithreaded processing environment, a determination is made at a step 1718 as to whether any of the events identified in step 1716 are currently being worked on by the instant process. If so, the current thread waits until none of the events are being worked on, which is identified by step 1720. But if none of the events of step 1716 are currently being worked on, then each of the events are written into a "processing" table to indicate that they are currently being worked on.

At a step 1724, AEM 526 determines the top-level event from among the sibling events identified in step 1716. This determination is made by evaluating the respective priority numbers, service-affecting indicators, and status indicators. In a preferred embodiment, the status indicator trumps all other indicators. That is, an alarm that is closed will never be more important than an alarm that is open. The second-most important attribute in a preferred embodiment of the present invention is the service-affecting parameter. If this parameter is set, then the alert or alerts associated with the event are causing service interruptions, which is bad. The last parameter priority level is also used to determine which event should be a top-level event. For illustrative purposes, a lower-priority number indicates a high-priority alarm. Thus, an alert with a priority of "1" is more important than an alert with a priority number of "5." Thus, if five alarms are received, each are open, and each is service-affecting then the alarm that has the lowest-priority number will become the alert associated with the top-level event. If a tie exists between the three parameters, then the earliest alert will be associated with the top-level event. Assessing the importance of events by using the three parameters just referenced is merely one way of prioritizing alerts and should not be construed as a limitation of the present invention.

Resource relationships are updated at a step 1726. Any newly suppressed events are denoted as such in resource_relationships table 1552. The events written into "processing" table 1722 are cleared at a step 1728, and the process starts over at step 1712.

Various functional aspects offered by AEM 526 may be more fully understood with reference to one or more specific examples. Accordingly, we will now set forth various specific examples with reference to FIGS. 18A, 18B, 18C, and 18D. These diagrams will be better understood with a general overview provided describing the format associated with each figure. Each figure includes a relationship grid, an illustrative instance of resource_relationships table 1552, a network-tree diagram (which is a simplified diagram depicting a topological hierarchy of a communications network), and a partial set of event attributes.

Thus, FIG. 18A includes a relationship grid 1812, a table 1814 (which is a simplified depiction of resource_relationships table 1552 populated with example-specific, non-limiting data), a first network diagram 1816, and a first set of event attributes 1818. The network diagrams depict a hierarchy of resources. For example, first network diagram 1816 depicts element E1 having three child cards C1 C2 C3, where C2 has two child ports P1 and P2. Element E2 has two child cards C4 and C5, which has a single child port P4, which supports a child physical link PL.

First network diagram 1816 also depicts that card C2 is in an alarm state, and that P2 is about to enter into an alarm state by virtue of an incoming alert W. Event-attribute data 1818 depicts that incoming alert W has a priority of "10," is service-affecting, and is in "open" status. Table 1814 depicts relationships between the resources in network diagram 1816. Read in conjunction with grid 1812, the first row of table 1814 indicates that C2 contains P2. That is card C2 physically contains port P2.

The type of "1" is read in connection with the type of "1" depicted in grid 1812, which is "A contains B." All of the "contains" relationships are not depicted in table 1814 for the sake of simplicity. The second row of table 1814 has a type of "2" (A supports B) and indicates that P2 supports physical link PL. This supporting relationship is indicated by the dashed line between port P2 and physical link PL. The third row of table 1814 also has a type of "2," and indicates that port P4 also supports physical link PL. The third row of table 1814 has a type of "3" (A suppresses B), and indicates that card C2 suppresses port P1. Port P1 is suppressed by card C2 by virtue of the parent/child relationship between card C2 and port P1. Similarly, the fifth row of table 1814 indicates that card C2 suppresses port P2.

Thus, alarms that would be associated with ports P1 and/or P2 would be suppressed by any alarms associated with card C2. Finally, the last row of table 1814 indicates that card C2 suppresses port PL. In a preferred embodiment, there will be only one entry in resource_relationships table 1552 of type "suppress" for a given relationship in a vertical tree. That is why there is not an entry shown in table 1814 of port P2 suppressing physical link PL. Rather, port PL is depicted as being suppressed by its highest-level parent, here, card C2. The illustrations in FIGS. 18B, 18C, and 18D follow a similar format to that of 18A.

Beginning with the first example, and with reference to FIG. 18A, an incoming alert W is associated with port P2. As previously mentioned, this incoming alert has a priority of "10" and is service-affecting. The alert is received "step 1612" by AEM 1526 which fetches the resource ID (step 1614). The resource ID is "P2" for this example. AEM determines whether (step 1616) port P2 is the subject of any other work within AEM 526. Assuming it is not, a processing thread is instantiated to process incoming alert W. AEM 526 determines (step 1622) whether resource P2 (to which alert W is associated) is associated with an existing event. Here, it is not. Thus, AEM 526 determines (step 1624) whether resource P2 is suppressed. Resource P2 is currently suppressed by resource C2, which is indicated by the fifth line of table 1814 "C2 suppresses P2." With C2 identified as the suppressing parent (step 1636), an event is created and associated with resource P2 (step 1638). This event is stored as a suppressed event (step 1640), and is not displayed.

Figure 18B:
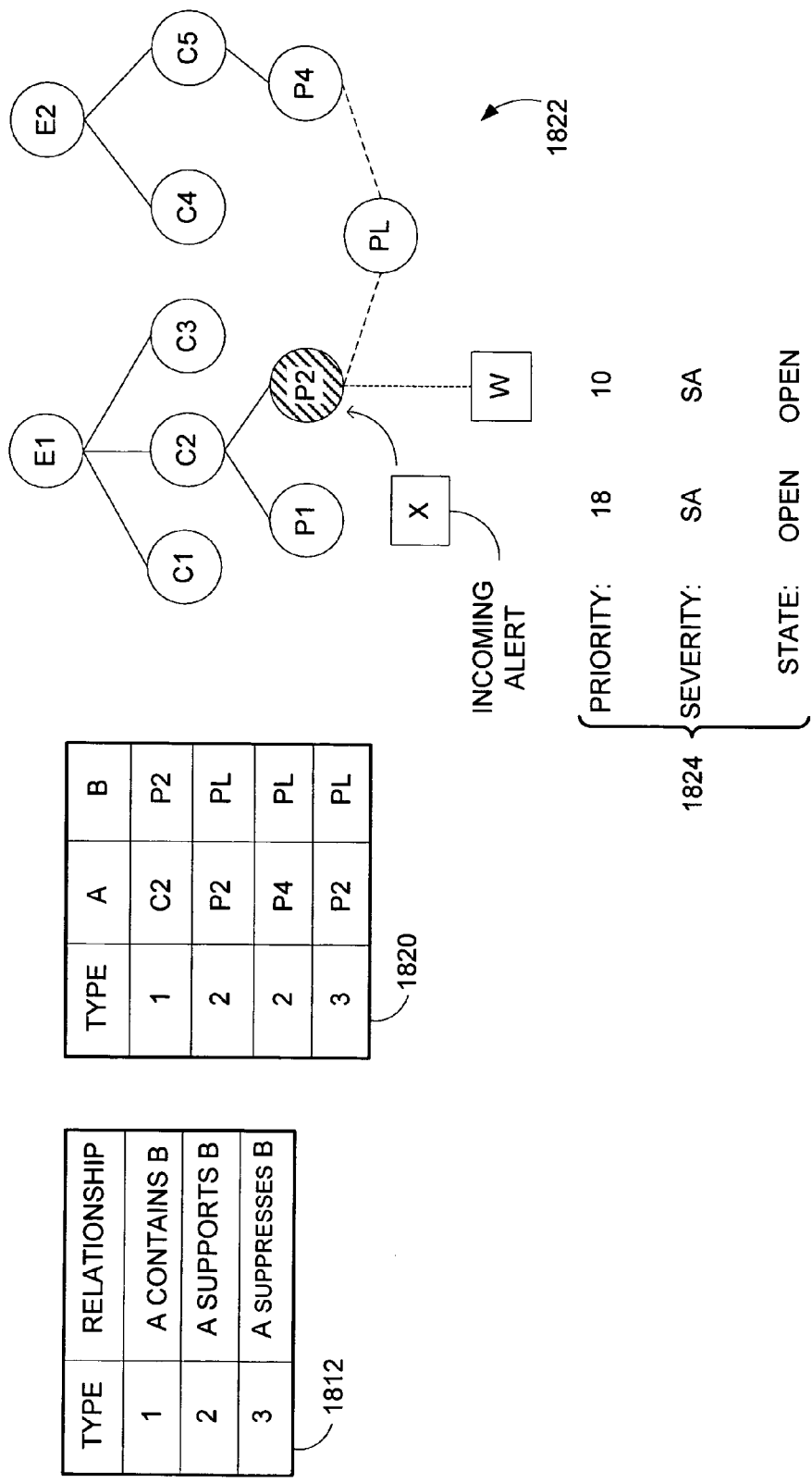

Turning now to FIG. 18B, it is shown that alarms associated with card C2 have been cleared, a second incoming alert X is associated with port P2. The first three rows of a table 1820 are identical to those of table 1814 of FIG. 18A. But because the alerts associated with resource C2 have cleared, the last two rows of table 1814 are replaced with what is shown as the fourth row of table 1820 that illustrates resource P2 suppresses port PL. Previously, PL was depicted as being suppressed by resource C2. But now, the most top-level resource in an alert condition is resource P2 not resource C2.

Network diagram 1822 indicates that P2 is in an alarm state. Incoming alert X has a priority number of "18" is service-affecting, and is in an "open" state, as indicated by event attributes 1824. Incoming alert X is received by AEM 526. Resource P2 is identified as the resource associated with the alert. Assuming resource P2 is not the subject of other processing, a thread is instantiated to process incoming alert X. When AEM 526 checks to determine whether P2 is associated with other existing events, this time the answer will be yes. Accordingly, AEM 526 will recalculate the alert rankings, comparing the attributes of alert X with the attributes of all current alerts (which is currently only alert W). Here, the incoming alert X has a priority level of "18" which is greater than W's priority level of "10." Therefore, there will be no new top-level alert, and no further processing is necessary in a preferred embodiment.

Turning now to FIG. 18C, a situation very similar to that of FIG. 18B is depicted, except that a new alert Y is incoming to resource P2. Incoming alert Y has a priority level of "5," is service-affecting and is in an "open" state. A third tree diagram 1828 is substantially identical to that of 1822 in FIG. 18B. Similarly relationship table 1826 is identical to relationship table 1820 (FIG. 18B) because no new resources are associated with new alarms. AEM 526 will receive alert Y and identify resource P2 as associated with it. A thread will be instantiated to process the reception of alert Y.

When AEM 526 checks to determine whether resource P2 is associated with an existing event, it will again find that it is. Accordingly, AEM 526 will recalculate the rankings of alerts Y, X, and W. But this time, because incoming alert Y has a priority number of "5," which is less than the priority number (that is, a higher priority) of the current top-level alert ("10"), the event associated with resource P2 will be updated to indicate that incoming alert Y is the new top-level alert. Before the event can be displayed, the suppression relationships associated with resource P2 are first checked in a preferred embodiment. In FIG. 18A, resource P2 was suppressed by resource C2. But here, resource P2 is not suppressed by another resource. Accordingly, the event will be displayed and will depict alert Y as the alert that should be addressed first.

Figure 18D:
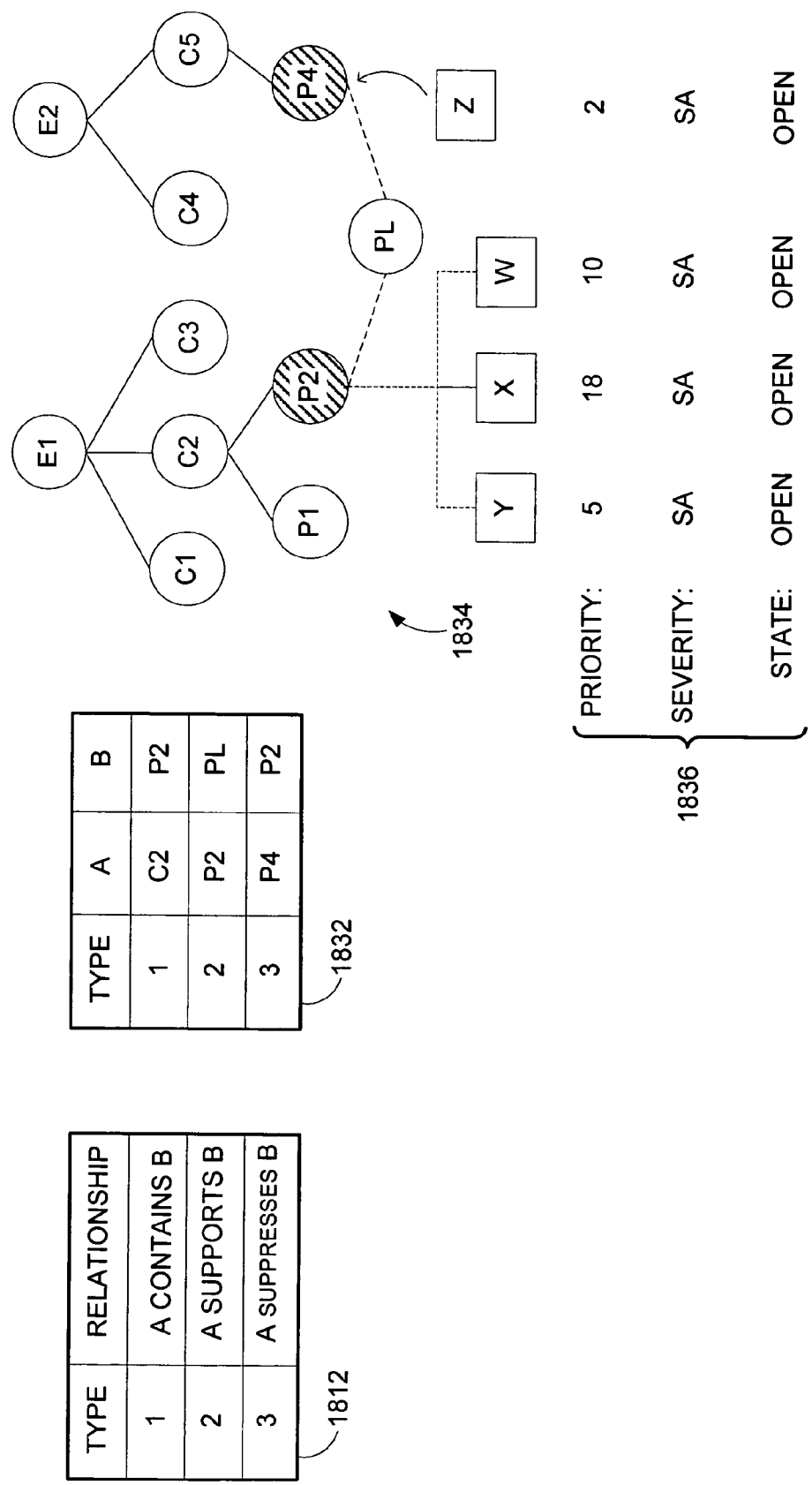

While the processes associated with each of the aforementioned examples are progressing, the resource_relationships table instances (1814, 1820, and 1826) are being monitored by the process of FIG. 17. But so far, no multiple suppressing resources have been found. That is, each resource that has been suppressed, has only been suppressed by a single resource. This will change in FIG. 18D. Turning now to FIG. 18D, a final illustrative example of functionality offered by AEM 526 is depicted. A resource_relationships table instance 1832 has the same first two rows as before, but now has a new third row that depicts resource P4 as suppressing resource PL incident to receiving new alarm Z. Incoming alarm Z has a priority level of "2" is service affecting, and is in an "open" status, as indicated by attributes set 1836. Fourth network diagram 1834 depicts that resource P2 is in an alarm state as well as resource P4.

AEM 526 receives new alert Z, and identifies resource P4 as associated with it. A new thread is instantiated to process the reception of incoming alert Z, and AEM 526 determines whether an existing event is associated with resource P4. Because there is not, resource P4 is checked to determine whether it is suppressed, which it is not. Thus, a top-level event is created and associated with resource P4. Because alert Z is service-affecting, the suppression relationships will be checked. But resource P4 is not currently being suppressed by any other resource. At this point, however, the process of FIG. 17 catches that resource PL is being suppressed by more than one resource. Again, an exemplary way for determining that resource PL is suppressed by multiple resources, is to query table 1832 for type of "3" and return any duplicate entries in column "B." Here, that would return two rows, the second and the third. Those rows would indicate by virtue of column "A" that resources P2 and P4 both suppress resource PL. Accordingly the top-level event is determined to be new alert Z because its priority number of "2" is greater than that of the current highest top-level event ("5"). Thus, when the event is displayed, the attributes associated with alert Z will be displayed.

Display Manager

The present invention includes a display-manager component that permits modified messages to be indicated. The display manager preferably moves events that have completed our RCA processing to display layer 240 (See FIG. 2) for presentation to a user. Presentation to a user may include graphical attributes as well as an audio format. As previously described, the various components of processing layer 230 help determine among hundreds of thousands of alerts, which ones represent the most important network events to be addressed. The display-manager component helps ensure that events created by AEM 526 are displayed to the end user. In a preferred embodiment, a display_events table 258 (See FIG. 2A) resides in first database 250 in display layer 240. Display_events table 258 chronicles which events are to be displayed or otherwise presented to a user. Network events that have been processed by AEM 526 are copied to display_events table 258. After a network event has been created by AEM 526 and copied to display_events table 258, the display manager determines what and how to present the alert or alerts associated with an event to a user, who can decide additional action to take.

Figure 19A:
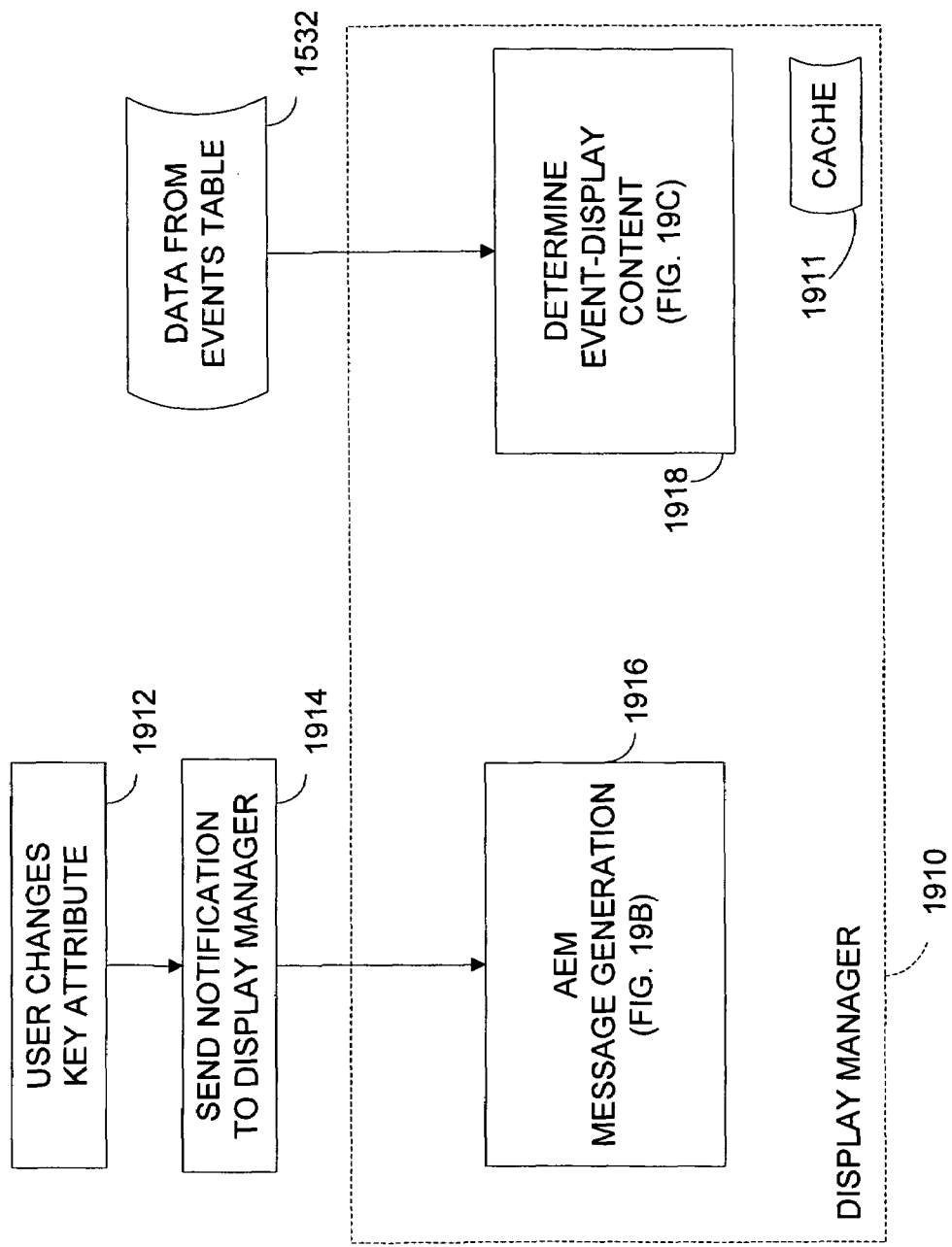
FIGS. 19A-19C are flow diagrams that illustrative an embodiment of a display manager and exemplary attributes of its functionality.

Turning now to FIG. 19A, an illustrative embodiment of a display manager 1910 having a corresponding cache component 1911 is depicted in accordance with an embodiment of the present invention. Display manager 1910 helps control which events to display to users. Several factors may affect whether an event is displayed or not displayed. In some instances, a user may manually change one or more attributes associated with an alert or event (such as alert attribute 312 or event attribute 316). In a preferred embodiment, the changing of certain key attributes will affect whether an event is displayed or continues to remain displayed. For referential purposes, these attributes will be referred to as "key" attributes. Exemplary key attributes include an indication as service affecting, a priority level, and a state. Each of these attributes are parameters with an event table 1532. The process of determining whether to display an event or to continue displaying an event when a key attribute is changed will now be explained.

At a step 1912, a user changes a key attribute. For example, a user may manually manipulate the attributes of an event to indicate that it is no longer service affecting. Although the present invention certainly offers the functionality to be able to make such changes automatically, the ability to manually override automatic settings is desirable. As another example, instead of changing an existing service-affecting indication, a user may determine that a certain alert should be given a different priority level. Thus, a network-operations user may decide that loss-of-signal alerts should receive a higher priority than they are currently associated with. Making such a change may affect the alert ranking and elevate a loss-of-signal alert to top-level status. In such a situation that alert should be displayed.

At a step 1914, display manager 1910 has sent a notification of the attribute change of step 1912. This notification preferably includes a set of parameters that will assist display manager 1910 in determining whether to display an event or what type of message to generate and send to AEM 526. Exemplary parameters include an indication of a user that made the change, the action requested, and any parameters associated with the action. Thus if a first user wishes to change the priority level associated with an event, then the action type may be "change priority level," and an exemplary parameter associated with that action type would be a number corresponding to the new priority level.

Figure 19B:
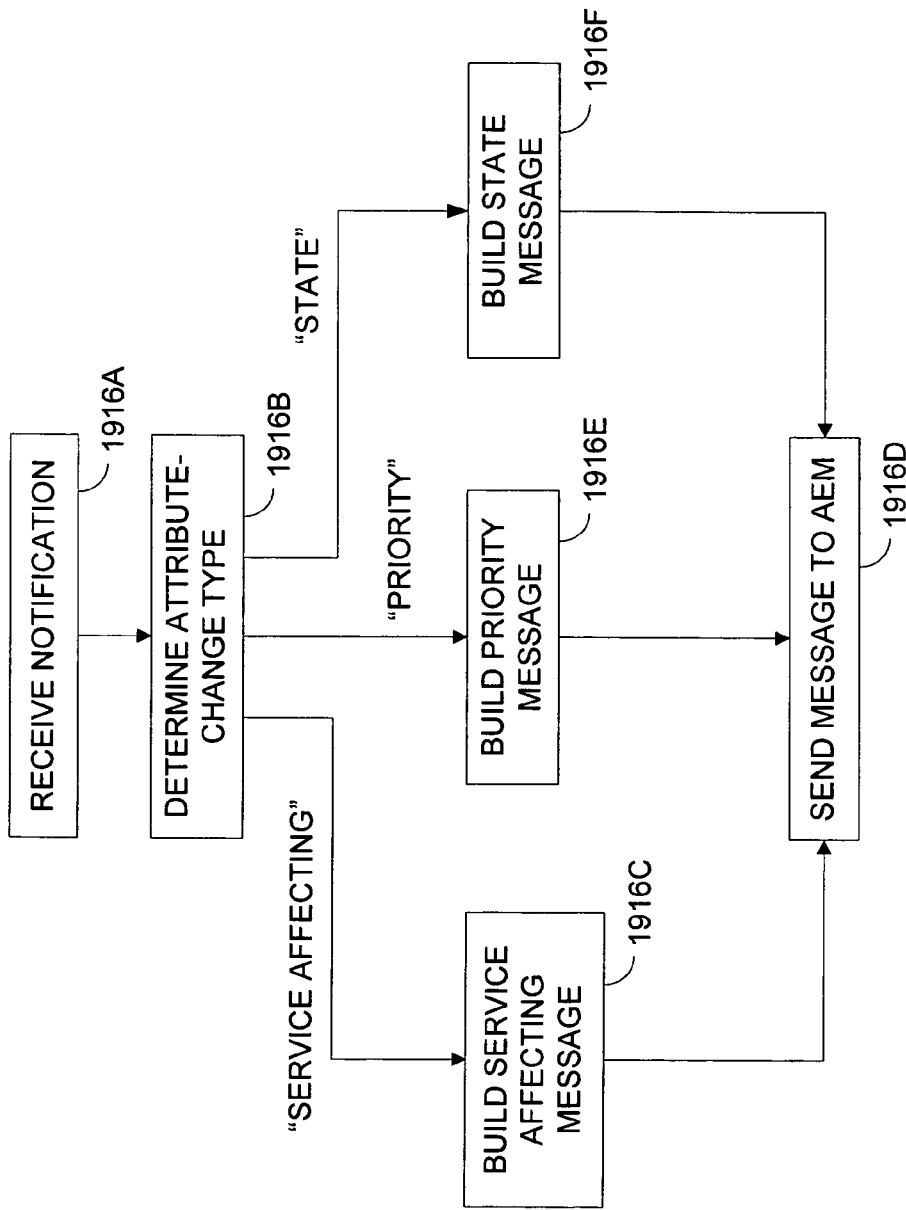

At a step 1916 a message is generated and sent to AEM 526, whereby the system will determine which events to display. Step 1916 of FIG. 19A is explained in greater detail in FIG. 19B. Turning now to FIG. 19B, the portion of this process begins when the notification is received at a step 1916A. This notification preferably includes at least the event ID, a user ID, an action type, and any parameters necessary to carry out the desired action. At a step 1916B, display manager 1910 determines the type of attribute change that the user instantiated in step 1912. For illustrative purposes, we assume three types of attribute changes are possible. One skilled in the art would readily understand that many more types of attribute changes could be facilitated in a manner similar to what is being explained here. But so as not to obscure the present invention, we illustrate a case that can follow three possible paths.

If the attribute-change type is "service affecting," then processing advances to build an attribute-change-notification message at a step 1916C, where a service-affecting message is built. Thus, display manager 1910 provides interface functionality between two components. Here, the two components include a source component and a target component, which is AEM 526. To build a service-affecting message at step 1916C, display manager 1910 orders the event ID, user, action type, and necessary parameters in a message format that AEM 526 understands. If a different target component besides AEM 526 were at issue, then the message would be reconstructed accordingly to conform with a format readable by the desired target component. Any type of message can be broken down and then rebuilt subject to user-defined rules. After the service-affecting message is built, it is sent to AEM 526 at step 1916D.

Returning to step 1916B, if the attribute-change type was "priority," then processing would advance to step 1916E where a "priority" message is built. Here the priority message would include the new priority of the respective event. Thus whereas the service-affecting message would include the event ID, user, an action type of "service-affecting," and a parameter indicating the new service-affecting status, the "priority" message would include the event ID, user ID, an action type of "priority," and a value corresponding to a desired priority level. After constructed, the "priority type" message is sent to AEM 526 at step 1916D.

If at step 1916B, the attribute-change type was "state," then processing would advance to step 1916F, and a message suitable to change the state or status of an event would be built. In a preferred embodiment, an event is associated with at least one of two statuses: "open" or "closed." As previously mentioned, an "open" event is an event that is still pending and has not yet been resolved. Thus a "state" message would be built and include an event ID, user ID, an action type of "state change," and a parameter associated with the new status. After the state message is built at a step 1916 F, it would be sent to AEM 526 at step 1916D. Returning to FIG. 19A, display manager 1910 is depicted as also showing a process to determine event-display content, which is referenced by numeral 1918. When an alert is displayed to a user, all or a portion of the attributes associated with that alert may be displayed. In some situations, only a portion of the attributes associated with an event may be displayed. In other situations, all attributes associated with an event may be displayed. An exemplary method for determining event-display content is depicted in greater detail in FIG. 19C.

Figure 19C:
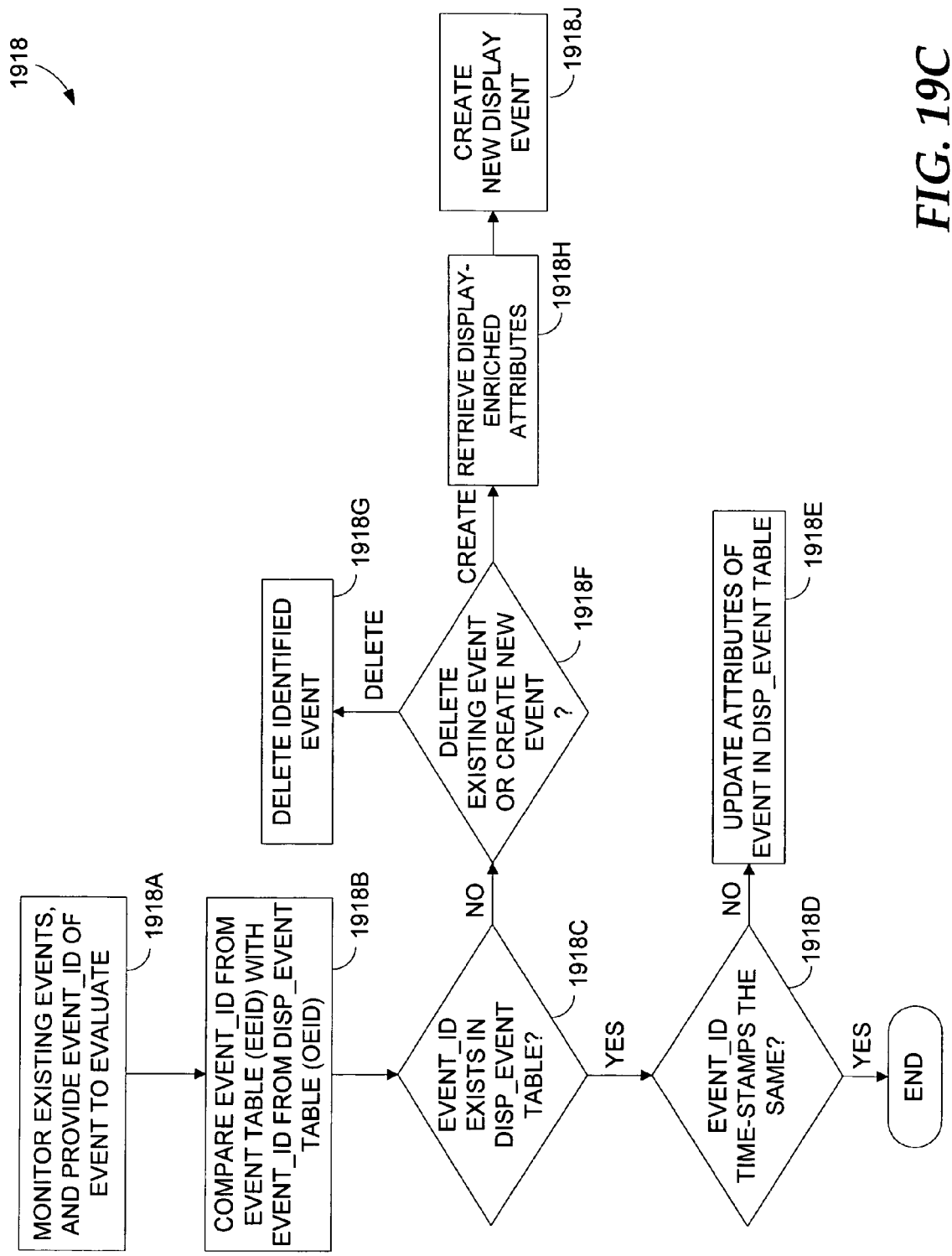

Turning now to FIG. 19C, an illustrative process according to an embodiment of the present invention is depicted for preparing events to be displayed or continuing to be displayed. At a step 1918A, the existing events are monitored, and event Ids are provided to display manager 1910 incident to the monitoring process. An illustrative method for monitoring existing events is to periodically pole event table 1532 and monitor it for changes. When a change is found to an event, the event ID associated with that event is sent to display manager 1910 at step 1918A. Desired event attributes are stored in cache memory component 1911 in a preferred embodiment. Storing attributes associated with the event in cache 1911 enhances system performance and decreases search times. In a preferred embodiment, event table 1532 is poled. When the event ID is provided to display manager 1910 at step 1918A, location parameters of the resources (elements, subcomponents, etc.) are also provided. The location parameters identify the geographic location of the elements that are in a problem status. This way, if technicians need to be dispatched, geographic destinations are already known. These parameters are also stored in cache 1911. Polling of event table 1532 is preferably limited to top-level events rather than all events.

At a step 1918B, the event ID from event table 1532 is searched for and/or compared with a corresponding event ID from display_events table 258. This step 1918B may be accomplished several different ways. An exemplary first way, is to attempt to insert a row into display_events table 258 with a primary key set to the event ID. If the row is not permitted, then it can be inferred that an event ID of that value is already present in display_events table 258. Thus, a determination is made at a step 1918C as to whether a corresponding event ID exists in display_events table 258. If a corresponding event ID does exist in display_events table 258, then the time stamp of the event and display_events table 258 is checked against the corresponding time stamp of the event in event table 1532. If the two time stamps are the same, then this process ends because display_events table 258 is current with event table 1532. But if the time stamps differ, then the attributes in display_events table 258 are updated to coincide with the corresponding attributes in event table 1532 at a step 1918E.

Returning to determination step 1918C, if the display_events table 258 does not have an event ID corresponding to the present event ID of event table 1532, then a determination is made at a step 1918F as to whether a new event should be created or some existing event should be deleted from display_events table 258. For any event in display_events table 258 for which there are no events in event table 1532, then those events are deleted from display_events table 258 at a step 1918G. Otherwise, attributes to enrich event data are retrieved at a step 1918H. As previously mentioned, enrichment data is preferably looked for in cache 1911 first. Any data desired to be displayed is enrichment data. All of the data to be displayed is retrieved from the various tables of the database schema 1510, as well as any other tables necessary, and consolidated into a single table, such as display_events table 258. Thus, a new event is created in display_events table 258 at a step 1918J. By placing all data to be displayed in a single table, displaying the desired attributes is simplified.

An example will now be provided with reference to FIG. 20 to help further explain the aforementioned processes related to display manager 1910. FIG. 20 is substantially identical to FIG. 18D, having a relationship table 2012, a resource-relationships table 2042, a topology diagram 2044, and a listing of several attributes associated with various alerts 2046. The main difference between FIG. 18D and FIG. 20 is that in FIG. 20, the severity level associated with alarm Z 2048 is depicted as changed from service affecting to non-service affecting ("NSA"). This change can be user defined or automatic. In either case, display manager 1910 would receive notification of this change, which would be a change in a key attribute, namely "service affecting." Because alarm "Z" has the highest priority among open alarms, it was the alarm currently being displayed before the change of severity level 2048. If this were a user-generated change, then display manager 1910 would build a "service affecting" message that would include the event ID, a user ID identifying the user that made the change, an action type of "severity change," and a parameter indicating that the new severity indication is to be "NSA." This message would be sent to AEM 526, which would cause alert "Y" to be displayed.

If the severity-level change was automatic, then the process of step 1916 in FIG. 19B could still be followed. Doing so would alternately result in alarm "Z" being removed as a top-level alert and thereby result in its deletion from display_events table 258. But if the change would have been one that did not ultimately result in alert "Z" being subordinate, then only the attributes associated with alert "Z" would be updated and displayed per the steps of FIG. 19C.

Automatic Ticket Generator

The automatic ticket generation component of the present invention receives incoming network trouble alerts (status indications) routed to it by AEM 526 to determine if the alert meets the criteria for automatic generation of a ticketing report. In some situations, network events are critical enough that tickets should be created automatically. In the prior art, users, such as network operations analysts, would visually look at various alerts and then manually attempt to type some sort of ticket memorandum. Such a scheme, however, is prone to human error, lacks uniformity, is difficult to enforce guidelines, and provides no feedback as to whether alerts are assigned. That is, there was no efficient way to determine whether alerts are being worked on by observing the alerts themselves. The present invention solves these problems and allows user-defined rules to determine if a ticket needs to be created automatically, without user intervention. Business rules can differ based on characteristics of various alarms, occurrence of related events, and the degree to which customer service is impacted. If a ticket has already been created for an event, a ticket update will occur.

The present invention includes a well-defined interface to define the process by which new tickets are created and by which updates occur. In a preferred embodiment, a ticket router is opposite this interface and carries out the requested command, because different ticket-generation systems typically require different ticket-generation formats. In addition, ticket-creation requests and updates are enriched with information about the physical configuration of the communications network topology to support downstream ticketing systems.

Generating a ticket automatically allows the alert to be associated with the ticket to be presented squarely in front of an operations-center specialist who can resolve the problem or determine other remedial action. The auto ticket generation component provides a feature-rich approach to managing alerts that require immediate attention by operations-center specialists through the automatic generation of ticketing reports. As previously mentioned, it has several practical applications in the technical arts including reducing the time associated with researching an issue and reducing the time associated with dispatching a technician to resolve a problem. Moreover, the format of ticketing reports can be enforced and human error removed.

Figure 21:
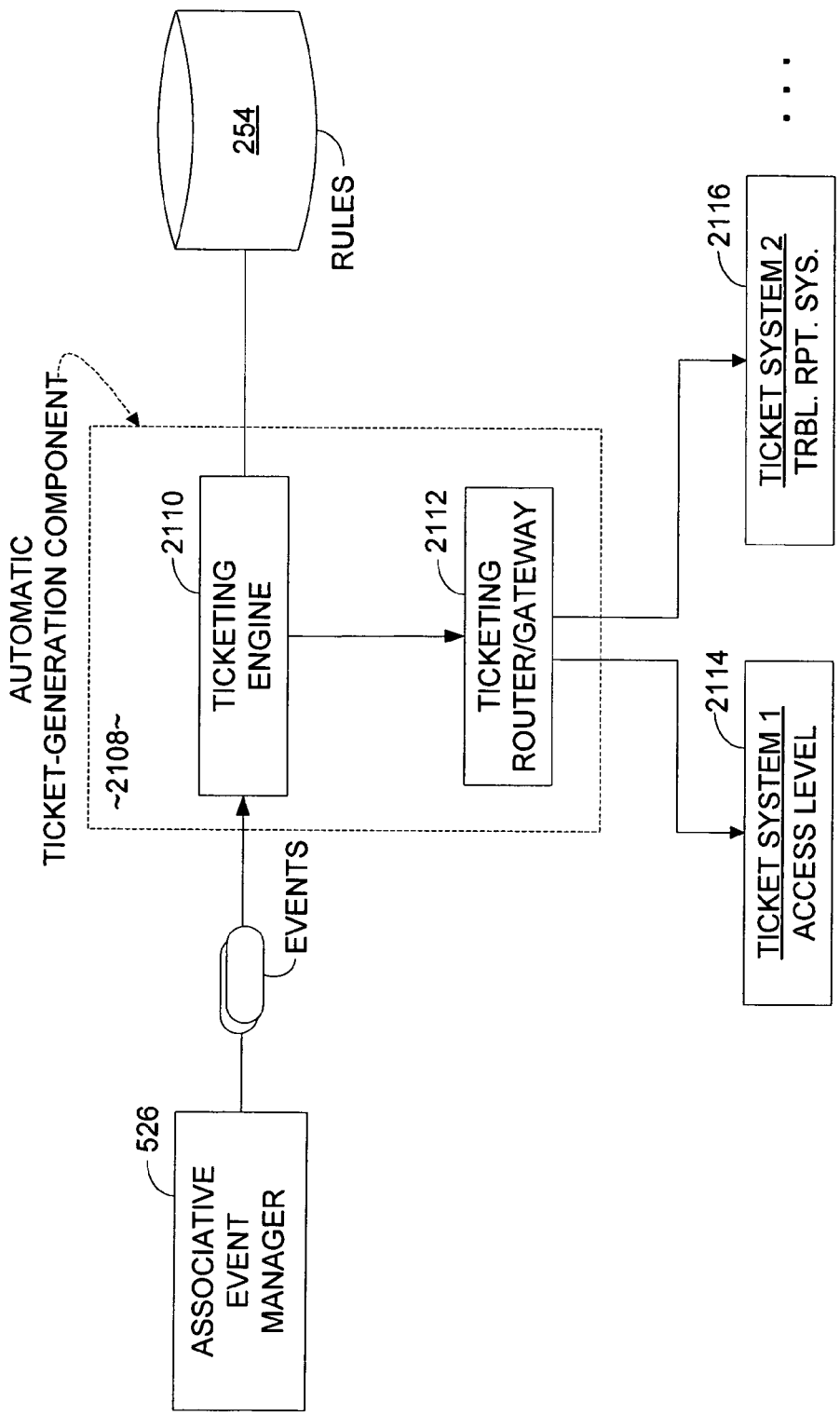
FIG. 21 is a block diagram depicting an exemplary ticket-generation component in accordance with an embodiment of the present invention.

Turning now to FIG. 21, an exemplary ticket-generation component 2108 is depicted as containing a ticketing engine 2110 and ticketing router 2112. As shown, ticket generator 2108 is coupled to associative event manager 526 and database 254 (see FIG. 2A) as well as a plurality of ticketing systems. Ticket generator 2108 can interface with various ticketing systems, such as first exemplary ticketing system 2114 and second exemplary ticketing system 2116. Different operation centers typically use different ticketing systems. Accordingly, ticketing router 2112 routes the data necessary to generate a ticket and the data in the requisite format to a designated target ticketing system.

Figure 22B:
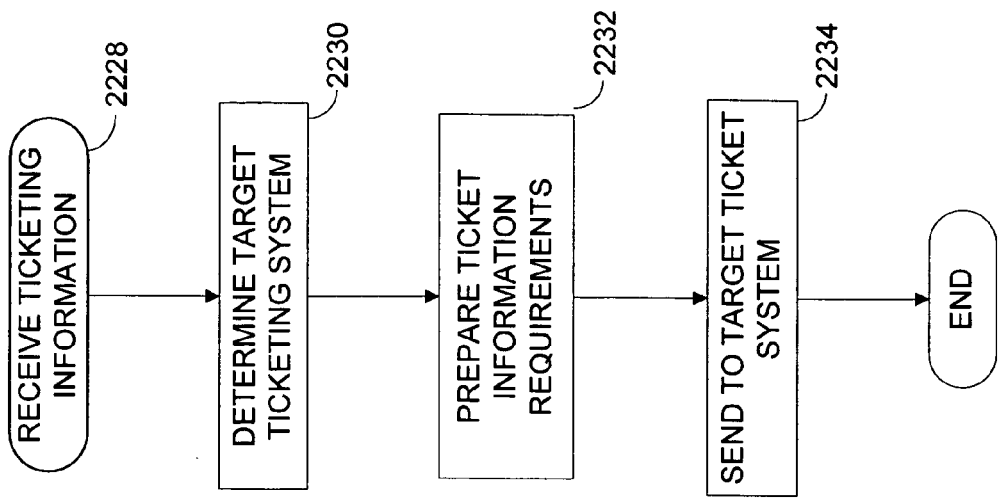
FIGS. 22A-22B depict an illustrative method in accordance with an embodiment of the present invention for determining whether a ticketing report should automatically be generated.
Figure 22A:
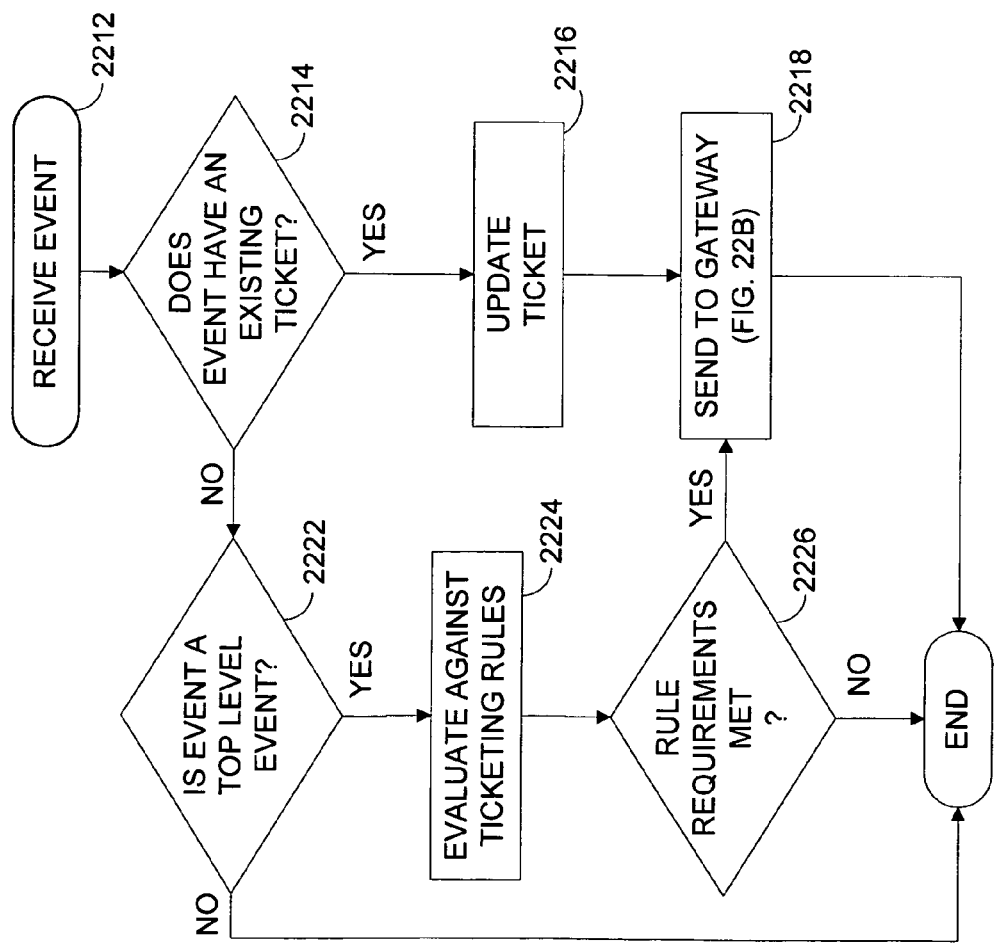

Turning now to FIG. 22A, an illustrative method in accordance with an embodiment of the present invention is shown for determining whether a ticket should automatically be generated. In a preferred embodiment, the steps of FIG. 22A are carried out by ticketing engine 2110. At a step 2212, an event is received from AEM 526. Receiving an event can include receiving the events corresponding event ID. This event ID is passed to ticketing engine 2110 at step 2212. At a step 2214, a determination is made as to whether the received event is currently associated with an existing ticket. This determination can be made by querying a trouble_ticket_events table on the event ID. Although not shown, the trouble_ticket_events table can also be stored in database 254 (see FIG. 2A). For example, if a query submitted on the trouble_ticket_events table for an event having an event ID that was received in step 2212 does not return a null value, then a determination can be made that an existing ticket is currently associated with the event. In such a case, processing advances to step 2216 where the respective ticket record is retrieved and updated.

After updating the ticket associated with the event received, ticket details are sent from ticket engine 2110 to ticketing router and gateway (ticketing router) 2112. As previously mentioned, ticketing router 2112 determines the destination ticketing system for the ticketing data and formats it accordingly. Thus, when ticketing engine 2110 communicates ticketing data to ticketing router 2112 at step 2218, it preferably includes data that identifies the instant event, a user assigned to the ticket, and a target ticketing system. This data can be retrieved from the trouble_ticket_events table, which is populated based on the type of event associated with the ticketing report. We will return to step 2218 and discuss in greater detail the functionality offered by ticketing router 2112 with reference to FIG. 22B. But now, we revert to determination step 2214 and consider the path followed if ticketing engine 2110 determines that no current ticket is associated with the event received in step 2212. If not, processing advances to determination step 2222, where ticketing engine 2112 determines whether the event received is a top-level event. If the event received at step 2212 is not a top-level event, then no ticket will be generated, and the process ends in a preferred embodiment. But if the instant event is a top-level event, then processing advances to step 2224 where ticketing engine 2110 evaluates the event received against a set of ticketing rules.

The ticketing rules are a set of criteria that define when a ticket should be generated based on various parameters. For example, a first rule may dictate that a ticket should be automatically generated if an alert has a priority level at least as high as "ten." A second exemplary rule may dictate that a ticket should be automatically generated on a parent device if 75% of its children devices are in an alarm condition. A third exemplary rule may dictate that a ticket should be automatically generated if an alarm is of type "loss of signal," is service affecting, and has a priority level of at least "seven." A fourth exemplary rule may dictate that a ticketing report should be automatically generated if a door is open longer than ten minutes after normal business operating hours.

The number, types, and complexity of ticketing rules is limitless. One skilled in the art will appreciate upon reading this disclosure that a ticketing rule for virtually any situation can be configured and implemented according to the methods described herein. The four exemplary rules previously mentioned were done for illustrative purposes only to provide examples of the myriad of different types of rules that can be created, and should not be construed as a limitation of the present invention. The ticketing rules may be programmed in a variety of ways, such as utilizing "case" statements, or a series of "if then else" statements.

Accordingly, a determination is made at a step 2226 as to whether the instant event meets the rules requirements of step 2224. If not, the process ends. But if the criteria set forth in the ticketing rules is met, then the ticketing data is sent to ticketing router 2112 at step 2218. The functionality offered by ticketing router need not be separated into a separate component, such as ticketing router 2112. Even though such functionality is separated in a preferred embodiment, automatic ticket generation component 2108 represents a single whole composed of at least two parts.

Turning now to FIG. 22B, we pick up where we left off in 22A by receiving ticketing information at a step 2228. As previously mentioned, the ticketing information includes the event ID, a target ticketing system ID, a user name, and a target ticketing system identifier that designates the ultimate ticketing system that will print a ticketing report. In electronic form, all the data necessary to generate a ticket is gathered and packaged for delivery to one or more target ticketing systems. The reason a user name is preferably included in the ticketing details is so that if a user requests that a ticket be automatically generated, then the ticketing request can be tracked to the user that issued the request. This would be beneficial later in time as the matter is resolved. But an alarm does not need to be personally acknowledged by a user for the automatic ticket generation component 2108 to work. In such a case, the user name would be the name of the system that automatically made the request to generate a ticket. Thus the process can be completely automatic with no user intervention whatsoever. Recall also that the ticketing-system name can be provided by the ticketing rules. For example, if an event satisfies a rule that requires a ticket to be automatically generated if a priority level above "five" is received, and the resource associated with the alarm is of a certain type, then the rules will dictate that not only should a ticket be generated, but will perform a lookup to determine the appropriate ticketing system that should be used to generate the ticketing report.

In other embodiments, the ticketing information received at step 2228 may simply be an event ID. The additional ticketing information can be retrieved by the various relationships established through the database schema and the relationships established between the various tables of the schema. The database schema can also be used to determine the appropriate target ticketing system in such an embodiment. At a step 2232, ticketing router 2112 prepares the ticket information requirements. Thus, based on the target ticketing-system name, ticketing router 2112 formats the ticketing data to be received by the specific target ticketing system. For example, as shown in FIG. 21, a first ticketing system 2114 relates to access level. A second ticketing system 2116 is a trouble reporting system. First ticketing system 2114 may receive data in a different format than that of second ticketing system 2116. Ticketing router 2112 accommodates such disparate formats by outputting data correctly formatted for the recipient ticketing system. At a step 2234, the properly formatted ticketing information is sent to the desired target ticketing system. The ticketing system can then physically print or otherwise communicate (e-mail, pager, etc.) the ticket details to one or more users.

In a preferred embodiment, the ticket ID, an identifier relating the ticket created to the event received in step 2212, is returned to ticketing gateway 2112. Thus a relationship is established between the event received in step 2212 and the ticket ultimately generated to service that event. This relationship overcomes the shortcoming in the prior art that did not allow for any correlation between events and tickets. In contrast, the present invention allows a user to readily determine what events are associated with what tickets, as well as what tickets are associated with what events. Tickets can be updated and cleared as the status of alerts changes.

Prophetic Example

We will now provide a prophetic example, which will further help to explain the aforementioned aspects of the present invention. The prophetic example provided should not be construed as a limitation of the present invention but is provided for illustrative purposes only. The example will be discussed with reference to FIGS. 23 and 24. FIG. 23 depicts an exemplary network element, and FIG. 24 depicts a portion of an illustrative alarm-presentation interface. So as to not obscure the present invention, this example will be relatively simple in nature and will trace the paths of two alarms being generated that are associated with cards of a switch. Generating the first alarm will cause a first change in the alarm-presentation interface. When the third alarm is generated, corresponding to the third of four cards in a switch, a pattern will be observed on the parent component, which will be depicted on the user interface. To touch on every aspect of the aforementioned technologies would be impractical at this point. Accordingly, the absence of discussion of processes in this prophetic example should not be construed as an absence of the possibility of the processes in question. This example is merely provided to provide more of a birds-eye view of how various aspects of the present invention function in accordance with an embodiment.

Turning now to FIG. 23, a topology diagram 2310 depicts a switch 2312 that has four child components: cards 2314, 2316, 2318, and 2320. Card 2320 is depicted as having three child subcomponents: port 2322, 2324, and 2326. Switch 2312 is associated with patterning criteria whereby if more than 60% of its children enter into an alarm condition, then an alarm should be generated on the switch itself. Card 2314 is currently in an alarm condition. The priority associated with the alarm on card 2314 is "26." A physical depiction 2327 provides another view of topology diagram 2310. Switch 2312 is shown having its four cards, and card 2320 is shown with its three ports. Switch 2312 would be one illustrative element among several thousands in a communications network 2332 or other network 2334. Switch 2312 may be coupled to other network elements such as element 2328 or element 2330, both of which are members of the same or a different communications network. Only first and second probes 330 and 336 (see FIG. 3) are shown so as to not obscure the drawing. The current status of topology diagram 2310 is reflected in the illustrative user interface of FIG. 24.

Turning now to FIG. 24, three instances of an alarm-presentation interface 2412 are shown. For this simplistic example, grid 2412 includes only six columns: Resource ID, Resource Type, Resource Location, Alarm priority, Description, and Ticket. Three instances of Table 2412 are shown so as to depict the evolution of one row of data as various alert happenings occur in the network. Grid 2412 would be presented on a user interface for a user to view.

The first instance of grid 2412 depicts a row 2414, which is composed of cells 2414A-2414F. Consistent with topology diagram 2310, row 2414 depicts a resource ID of "2314," a resource type of "card," a resource location of "KC," an alarm priority level of "26," an abbreviated description for transmission error "T.E.," and an indication that a ticket has not been generated for this alarm. The second instance of Table 2412, which will be discussed in greater detail below, a row 2416 having cells 2416A-2416F. Similarly, the third instance of Table 2412 depicts what was once row 2414, then row 2416 turns into row 2418, which is composed of cells 2418A through 2418F.

The example begins with card 2314 in an alarm condition. The attributes associated with the event are shown in row 2414 of grid 2412. Now assume card 2316 loses signal. First and second status indications 334 and 328 would be respectively sent to first and second probes 330 and 336. The status indications are sent to multiple probes for redundancy considerations. Because redundancy is desired, but duplicate status indications is not, the first and second status indications will be de-duplicated according to the process of FIG. 3. Both status indications will be received at input Table 318, and will trigger first and second keys 348 and 358 to be generated. Only the first triggered key will be entered into hash table 320 and the attempt to enter the second key will cause the first alert trigger to be deleted from hast table 320.

The status indication inputted into summary Alert Table 1556 will be recognized as a new alert by alert manager 510. The status indication's FSID 340D will indicate that the status indication is of a type "loss of signal." Any time constraints will be considered at this point to determine whether additional status indications should be generated, or whether no alarm should ripen from the instant status indication based on the time that it was generated. In a preferred embodiment, the alert will be routed to thresholding engine 522 to determine whether any threshold limits are met, to patterning engine 525 to evaluate whether patterning criteria has been met, and to associative event manager 526. For this example, no thresholding or patterning criteria is at issue.

Associative event manager 526 will receive the status indication and fetch the resource identifier ("2316") associated with the status indication. A check will be made as to whether card 2316 is the subject of any other processing to facilitate a multithreaded event-processing scheme. A check will also be made as to whether the alert on card 2316 is associated with an existing event. For purposes of this example, it will be assumed that the alert on card 2316 is associated with an event common to the alert associated with card 2314. Thus, because the status indication is associated with an existing event, then the alert rankings will be recalculated. A determination will be made as to whether a new top-level alert was created, which in this case it is because the priority of the new alert "15" is more important than the priority of the previous alert "26." Another check will be made to ensure that the event can be updated to facilitate the multithreaded working environment. The event associated with the alert of card 2314 will be retrieved and updated to indicate a new top-level alert, the alert associated with card 2316. The topology associated with card 2316 will be evaluated to determine whether card 2316 is suppressed by another resource. In this case, it is not.

The event ID will be passed to ticketing engine 2110 to determine whether a ticket should automatically be generated. In this example, assume that a set of business rules in database 254 dictates that a ticket should be automatically generated for "loss of signal" alarms with priority numbers below twenty. Ticketing engine 2112 will receive the event from associative event manager 526 and determine whether an existing ticket is associated with the event. In this case, no existing ticket is associated with the event. A check will then be made as to whether the event is a top-level event, which it is. The event attributes will be evaluated against the ticketing rules, which will be met in this example, and result in the event being passed to ticketing router/gateway 2112. Ticketing router 2112 will receive the ticketing information which includes an indication of the target ticketing system. Ticketing router 2112 will format a ticketing message that can be read by the target ticketing system. Ticketing router 2112 will forward the ticket-generation request to the intended targeting system.

Meanwhile, the updated event will be displayed. Row 2414 will be replaced with row 2416. Thus, the resource ID "2314" will be replaced with the resource ID of card 2316, as indicated by cell 2416A. The resource type and location are the same, but the priority level will be updated to indicate the new priority number of "15," as indicated by cell 2416D. Similarly, the description will be updated to "loss of signal." And because the ticketing criteria was met, an indication appears in cell 2416F identifying an automatically generated a ticketing report that is associated with the status indication of card 2316.

Now assume that card 2318 enters into an alarm condition of type "power continuity," which has a priority level of "5." However, many redundant status indications that maybe generated incident to recognizing the problem associated with card 2318 will be de-duplicated per the steps of FIG. 3. When the status indication is received by alert manager 510, its directed FSID will be evaluated to determine to which of the routing targets it should generate. As previously mentioned, a status indication can be routed to multiple target components, which will be the case here. This time, patterning engine 525 will identify switch 2312 as card 2318's parent and then search for other child components to determine whether patterning criteria associated with switch 2312 is met. Switch 2312 will identify cards 2314, 2316, 2318, and 2320 as child components. Still further, patterning engine 525 will determine that 75% of its children are in an alarm condition, which meets the patterning criteria of 60% for this example. Accordingly, a synthetic status indication will be generated and associated with switch 2312. This synthetic status indication will be reintroduced into alert manager 510. In some embodiments, the status indication associated with card 2318 will continue to progress through the system, resulting in the brief occurrence of a replacement row indicating card 2318 as a top-level alert because its priority level of "5" is greater than the then-current priority level of "15." In this embodiment, the synthetic status indication associated with switch 2312 will be close on the heels of the status indication associated with card 2318.

When the synthetic status indication of switch 2312 is received by alert manager 510, it will eventually be sent to associative event manager 526. AEM 526 will fetch the resource ID "2312" associated with the status indication and instantiate a new processing thread. The status indication of switch 2312 is not associated with a resource with an existing event, therefore, a determination will be made as to whether switch 2312 is suppressed by another resource. Because it is not, a top-level event will be created and associated with switch 2312. Assuming that the power-continuity problem is service affecting, suppression relationships will be established per the process of FIG. 16B. In this process, the alert associated with child cards 2314, 2316, and 2318 will be suppressed to the alert associated with switch 2312. Thus, without any user interaction, the status indication of switch 2312 will bubble to the top and ultimately be presented to a user who can interpret such indication as the potential root cause of many other alerts, namely those associated with cards 2314, 2316, and 2318. Assuming that a ticket should be automatically generated, one will be so generated according to the processes in FIGS. 22A and 22B, thereby producing row 2418 of FIG. 24. Row 2418 replaces rows 2414 and 2416 to indicate switch ID "2312" in cell 2418A, which is a resource type of "switch," has a priority number of "2," and a ticket ID of "T_414," as indicated in cell 2418F.

Although row 2418 replaces rows 2414 and 2416, a user may still access increasing levels of information by clicking on various cells that make up row 2418. For instance clicking in cell 2418 will allow a user to drill down and view the alert associated with child cards 2314, 2316, and 2318. As another example, a user may click in cell 2418F to view the ticketing information associated with the status indication of switch 2312. The location information of cell 2418C may also be summary in fashion, whereby following a link in cell 2418C can provide more descriptive geographic-location information. Again, this prophetic example should not be construed as limiting in nature, but was provided to help illustrate selected technological processes of the present invention. No longer would a user chase the potential rabbit trails associated with child cards 2314-2318. Rather, a user may quickly be presented with data indicating that switch 2312 is the real culprit and can dispatch a technician or institute other remedial measures quickly to address all the problems associated with a faulty switch. Those skilled in the art will readily appreciate the vast uses for the methods described herein, but not detailed by the letter for the sake of feasibility.

Moreover, many different arrangements of the various components depicted, as well as components not shown, are possible without departing from the spirit and scope of the present invention. Those skilled in the art will appreciate the litany of additional network components that can be used in connection with the present invention. The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention Certain features and subcombinations are of utility and may be employed without reference to other features and subcombinations and are contemplated within the scope of the claims. Not all steps listed in the various figures need be carried out in the specific order described. Not all steps of the aforementioned flow diagrams are necessary steps.

The invention claimed is:

1. A method for presenting an alert in a communications network that includes a plurality of network components that enable connection of devices on the network, the method comprising:

receiving an alert associated with a network component;

identifying all alerts associated with the network component, wherein the network component is identified by querying a first data structure associating network components with alert identifiers and a second data structure that stores alerts and associates the alerts with network components based on the identified network component;

determining which of the all alerts relate to problems that currently affect customer service versus those that require attention of a user but that do not currently affect customer service, thereby defining a set of customer-service-affecting (CSA) alerts and non-customer-service-affecting alerts;

assigning a priority level to each CSA alert within the set of customer-service-affecting alerts based on one or more predetermined criteria;

ranking the alerts based on priority level to determine a most important alert; and automatically presenting the most important alert to the user without user intervention.

2. The method of claim 1, wherein the alert includes a status indication indicating the status of a network component and wherein the status indication includes a message and/or an alert.

3. The method of claim 2, wherein the network component includes a subcomponent of the network component.

4. The method of claim 3, wherein automatically presenting the most important alert to a user comprises:
depicting the alert in a visual format; and/or
depicting the alert in an audio format.

5. One or more computer-readable media have computer-useable instructions embodied thereon for performing a method determining whether to present an indication of a status of a component that enables connection of devices on a communications network, the method comprising:
receiving the status indication;
identifying a component associated with the status indication;
determining through the use of a first data structure whether the component is subordinate to a second component, which is associated with at least a second status indication;
if the component is not subordinate to a second component, then evaluating the status indication to determine if the status indication relates to a problem that currently affects customer service or does not currently affect customer service;
classifying the status indication as one in a set of customer-service affecting indications or one in a set of non-customer-service affecting indications;
if the status indication is customer-service affecting, determining if it should be presented to a user; and
if so, then automatically presenting the status indication to the user without user intervention.

6. The media of claim 5, wherein the status indication is a message, warning, alert, or alarm.

7. The media of claim 6, wherein the component is a subcomponent of the component.

8. The media of claim 7, wherein determining whether the component is subordinate to a second component includes:
referencing a topology data structure that stores hierarchal-relationship information, wherein the hierarchal-relationship information describes one or more of the following types of component relations:
(1) parents and children, including their progeny; and
(2) siblings.

9. The media of claim 8, wherein evaluating the status indication to determine if it should be presented to a user further comprises determining whether the status indication is a most important status indication among a set of customer-service-affecting status indications.

10. The media of claim 9, wherein determining whether the status indication is a most important status indication among a set of customer-service-affecting status indications further comprises:
ordering the set of customer-service-affecting status indications according to a priority level; and
selecting the status indication from the ordered set that is the highest priority.

11. The media of claim 9, wherein automatically presenting the status indication to the user includes displaying the status indication on a display device.

12. The media of claim 9, wherein automatically presenting the status indication to the user further includes providing an audio notification of the status indication.

13. A method of presenting an alert in a communications networking environment, the method comprising:
storing in a first data structure a plurality of records related to network components in an alert condition, wherein the network components enable connection of devices on a network;
querying the data structure to determine whether a first component is subordinate to at least a second component and a third component, wherein the second and third components are in an alert condition;
determining if the second and third network components in alert condition are in alert condition because of a current customer-service-affecting alert;
if in alert condition because of a customer-service affecting alert, evaluating the at least second and third component to determine a most important customer-service affecting alert; and
automatically displaying the determined most important customer-service affecting alert to a user without user intervention, but not displaying other alerts associated with the other components unless a request to present the other alerts is received.

14. The method of claim 13, wherein the alert condition includes a component that provides one or more of the following:
a message;
a warning;
an alert; and/or
an alarm.

15. The method of claim 14, wherein querying the data structure includes:
retrieving hierarchal information that identifies relationships between network components, and wherein the relationships include one or more of,
(1) parents and children, including their progeny; and
(2) siblings.

16. The method of claim 15, wherein evaluating the at least second and third component to determine a most important customer-service affecting alert, comprises:
ordering the set of status indications according to a priority level; and
selecting the status indication from the ordered set that is the highest priority.

17. The method of claim 16, wherein automatically displaying the determined most important customer-service affecting alert comprises:
depicting on a display device the most important alert in a format that enables a user to view additional alerts related to the most important alert incident to providing a mouse click or keyboard stroke.

* * * * *

UNITED STATES PATENT AND TRADEMARK OFFICE
CERTIFICATE OF CORRECTION

PATENT NO. : 7,636,424 B1
APPLICATION NO. : 11/116778
DATED : December 22, 2009
INVENTOR(S) : Halikhedkar et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 864 days.

Signed and Sealed this

Ninth Day of November, 2010

David J. Kappos
*Director of the United States Patent and Trademark Office*